(12) United States Patent
Allauzen et al.

(10) Patent No.: US 7,783,485 B2
(45) Date of Patent: *Aug. 24, 2010

(54) SYSTEMS AND METHODS FOR DETERMINING THE DETERMINIZABILITY OF FINITE-STATE AUTOMATA AND TRANSDUCERS

(75) Inventors: Cyril Allauzen, New York, NY (US); Mehryar Mohri, New York, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 475 days.

This patent is subject to a terminal disclaimer.

(21) Appl. No.: 11/771,471

(22) Filed: Jun. 29, 2007

(65) Prior Publication Data

US 2007/0299668 A1    Dec. 27, 2007

Related U.S. Application Data

(63) Continuation of application No. 10/176,465, filed on Jun. 20, 2002, now Pat. No. 7,240,004.

(60) Provisional application No. 60/361,274, filed on Mar. 4, 2002.

(51) Int. Cl.
G10L 15/00     (2006.01)
G06F 17/20     (2006.01)
(52) U.S. Cl. .......................................... 704/255; 704/1
(58) Field of Classification Search ....................... None
See application file for complete search history.

(56) References Cited

U.S. PATENT DOCUMENTS 5,625,554 A * 4/1997 Cutting et al. .............. 707/100

| 6,073,098 | A | 6/2000 | Buchsbaum et al. |
| 6,243,679 | B1 | 6/2001 | Mohri et al. |
| 6,456,971 | B1 * | 9/2002 | Mohri et al. .............. 704/256.4 |
| 2002/0046017 | A1 * | 4/2002 | Kempe .......................... 704/1 |
| 2003/0046055 | A1 | 3/2003 | Kempe |

OTHER PUBLICATIONS

A. Weber, et al., "Economy of Description for Single-Valued Transducers," Information and Computation, 118 (2):327-340, 1995).

M. Beal, et al., "Squaring Transducers: An Efficient Procedure for Deciding Functionality and Sequentiality of Transducers," Proceedings of Latin '2000, lecture Notes in Computer Science, V.1776, 2000.

A. Buchsbaum et al., "on the Determinization of Weighted Finite Automata," SIAM Journal of Computing, 30(5):1502-1531, 2000.

M. Mohri, "Finite-State Transducers in Language and Speech Processing," Computational Linguistics, 23(2) 1997.

* cited by examiner

*Primary Examiner*—Matthew J Sked

(57) ABSTRACT

Finite-state transducers and weighted finite-state automata may not be determinizable. The twins property can be used to characterize the determinizability of such devices. For a weighted finite-state automaton or transducer, that weighted finite-state automaton or transducer and its inverse are intersected or composed, respectively. The resulting device is checked to determine if it has the cycle-identity property. If not, the original weighted finite-state automaton or transducer is not determinizable. For a weighted or unweighted finite-state transducer, that device is checked to determine if it is functional. If not, that device is not determinizable. That device is then composed with its inverse. The composed device is checked to determine if every edge in the composed device having a cycle-accessible end state meets at least one of a number of conditions. If so, the original device has the twins property. If the original device has the twins property, then it is determinizable.

70 Claims, 42 Drawing Sheets

SYSTEMS AND METHODS FOR DETERMINING THE DETERMINIZABILITY OF FINITE-STATE AUTOMATA AND TRANSDUCERS

This application is a continuation of U.S. patent application Ser. No. 10/176,465 filed Jun. 20, 2002 (will issue as U.S. Pat. No. 7,240,004), which claims priority to U.S. Provisional Application No. 60/361,274, filed Mar. 4, 2002, the contents of which are incorporated herein by reference.

BACKGROUND OF THE INVENTION

1. Field of Invention

This invention is directed to systems and methods for determining if a finite-state automaton or a finite-state transducer is determinizable.

2. Description of Related Art

Finite-state automata and finite-state transducers, whether weighted or unweighted, are used in many fields to represent complex systems. For example, weighted finite-state transducers are used in many recognition applications, such as speech recognition, gesture recognition and multimodal recognition.

Finite-state transducers are also used in speech-to-text and text-to-speech systems to represent various aspects of the recognition and/or conversion process. Finite-state automata and finite-state transducers are classical computational devices that can be used in a large variety of locations. A weighted finite-state automaton is a finite-state automaton in which each transition between two states is labeled with some weight in addition to the usual input symbol. Finite-state transducers are finite-state automata whose transitions are labeled with both input labels and output labels. Thus, weighted finite-state transducers include input labels, output labels and weights. Weighted finite-state automata and weighted finite-state transducers can be used in text processing, speech processing and image processing to account for the variability within the input data and to rank various hypotheses for the correct processing of the data.

Weighted finite-state automata and finite-state transducers are used to provide a common representation for each component of a complex system in many applications. Such weighted finite-state automata and finite-state transducers can use generalized methods for simplifying and/or combining components, such as the composition of two weighted finite-state automata or transducers. A finite-state automaton or transducer is deterministic if that finite-state automaton or transducer has a unique initial state and if no two transitions of the finite-state automaton or transducer leaving the same state have the same input label. The time efficiency of such finite-state automata or transducers is substantially increased when the finite-state automata or transducers that are implemented are deterministic. Additionally, the size, in number of states and/or the number of transitions between states, can be reduced for such deterministic finite-state automata or transducers using generalized minimization methods.

U.S. Pat. No. 6,243,679 to Mohri et al., which is incorporated herein by reference in its entirety, discloses systems and methods for both determinizing and minimizing a finite-state automaton or transducer. That is, the incorporated 679 patent discloses systems for converting a non-deterministic weighted finite-state automaton, such as that shown in FIG. 1, into a deterministic weighted finite-state automaton, such as that shown in FIG. 2. The incorporated 679 patent also discloses systems and methods for minimizing weighted finite-state automata and transducers.

However, unlike unweighted finite-state automata, weighted finite-state automata and finite-state transducers, whether weighted or unweighted, may not be determinizable. While the determinizability of many trivial weighted finite-state automata and finite-state transducers can be determined by inspection or using known techniques for determining the determinizability of such weighted finite-state automata or finite-state transducers, such methods cannot be used with the finite-state transducers or weighted finite-state automata used to represent components of any reasonable complexity.

In particular, the known methods for determining the determinizability of finite-state transducers and weighted finite-state automata have a complexity that is on the order of the sixth power of the number of states within the finite-state transducer or the weighted finite-state automata. Such conventional methods for determining the determinizability of a particular finite-state transducer or weighted finite-state automaton are not guaranteed to return an answer in a reasonable period of time and, for very large finite-state transducers used in speech, gesture, and/or multimodal recognition systems, which may have millions of states, would not have been guaranteed to complete within the current age of the universe.

As a result, rather than attempting to determine if a particular finite-state transducer or weighted finite-state automaton is determinizable, current practice is to attempt to determinize that finite-state transducer or weighted finite-state automaton. Then, if the determinization method does not halt within a reasonable period of time, the non-deterministic finite-state transducer or weighted finite-state automaton being determinized is assumed to be undeterminizable. However, this causes both waste of computer resources expended in attempting to determinize a non-determinizable non-deterministic finite-state transducer or weighted finite-state automaton, as well as unnecessarily abandoning attempts to determinize determinizable non-deterministic finite-state transducers or finite-state automata who nonetheless have not terminated within the reasonable period of time.

In particular, A. Weber et al., "Economy of Description for Single-Valued Transducers," (*Information and Computation*, 118(2):327-340, 1995), M-P Beal, et al., "Squaring Transducers: An Efficient Procedure for Deciding Functionality and Sequentiality," in (*Proceedings of LATIN'2000*, Lecture Notes in Computer Science, v. 1776, 2000), and A. L. Buchsbaum, et al., "On the Determinization of Weighted Finite Automata," (*SIAM, Journal of Computing*, 30(5):1502-1531, 2000), each incorporated herein by reference in its entirety, disclose the various methods that are usable to determine the determinizability of a finite-state transducer or a weighted finite-state automaton. However, all of these methods suffer from the drawbacks outlined above.

SUMMARY OF THE INVENTION

As outlined above, due to the extremely high complexity of these known methods for determining whether a finite-state transducer or a weighted finite-state automaton is determinizable, these methods are not particularly useful. Rather than determining if a particular finite-state transducer or weighted finite-state automaton is determinizable, it is common in the art to merely begin attempting to determinize the finite-state transducer or weighted finite-state automaton without first determining whether that finite-state transducer or weighted finite-state automaton is actually determinizable. Rather, if the determinization method finishes within a reasonable period of time, the finite-state transducer or weighted finite-state automaton is evidently determinizable. However, if the determinization method does not halt within a reasonable period of time, the finite-state transducer or weighted finite-state automaton is treated as non-determinizable.

However, it is possible to characterize the determinizability of finite-state transducers and unambiguous weighted finite-state automata based on the twins property. If a finite-state transducer or a weighted finite-state automaton of high, or even moderate, complexity could be analyzed to assess its determinizability in a reasonable amount of time, then it would be possible to know in advance whether to attempt to determinize the finite-state transducer or that weighted finite-state automaton or that a particular determinizable transducer or weighted finite-state automaton that is being determinized will eventually complete.

This invention provides systems and methods for determining whether a given unambiguous weighted finite-state automaton is determinizable.

This invention separately provides systems and methods for determining if an unweighted finite-state transducer is determinizable.

This invention separately provides systems and methods for determining whether a weighted finite-state transducer is determinizable.

This invention separately provides systems and methods for determining the determinizability of an unambiguous weighted finite-state automaton that have a complexity that is on the order of the square of the number of states and/or of the square of the number of transitions.

This invention separately provides systems and methods for determining the determinizability of a finite-state transducer that have a complexity on the order of the fourth power of the number of states.

This invention separately provides systems and methods for determining the determinizability of unambiguous weighted finite-state automata and transducers based on the weights assigned to states within cycles within an intersection weighted finite-state automaton based on intersecting a weighted automaton with its inverse weighted finite-state automaton or within a composed weighted finite-state transducer based on composing a weighted finite-state transducer with its inverse weighted finite-state transducer.

This invention separately provides systems and methods for determining the functionality of a finite-state transducer based on residues of coaccessible states within a composed transducer formed by composing the finite-state transducer with its inverse finite-state transducer.

This invention separately provides systems and methods for determining the determinizability of a finite-state transducer based on residues of cycle-accessible states of the composed transducer.

In various exemplary embodiments of the systems and methods according to this invention, the determinizability of unambiguous finite-state automata and transducers is determined. First, the weighted finite-state automaton or transducer is checked to determine if it is a trim, cycle-unambiguous weighted finite-state automaton or transducer. If it is not trim, the determinizability of this weighted finite-state automaton or transducer cannot be determined using the systems and methods according to this invention as is. Thus, this weighted finite-state automaton or transducer can be preprocessed to obtain an equivalent trim weighted finite-state automaton or transducer. Once the weighted finite-state automaton or transducer is determined to be trim, that trim weighted finite-state automaton or transducer can be intersected with the corresponding inverse finite-state automaton or transducer to form an intersection transducer.

However, if the weighted finite-state automaton or transducer is not cycle-unambiguous, the systems and methods according to this invention can produce a false negative. That is, if the systems and methods of this invention are used with a trim, cycle-ambiguous weighted finite-state automaton or transducer, the systems and methods according to this invention may falsely indicate that the trim, cycle-ambiguous weighted finite-state automaton or transducer does not have the cycle-identity property, and thus does not have the twins property, and thus is not determinizable. However, in fact, this trim, cycle-ambiguous weighted finite-state automaton or transducer may have the cycle-identity property, and thus may have the twins property, and thus may be determinizable.

In this case, in various exemplary embodiments, if the systems and methods according to this invention determine that the weighted finite-state automaton or transducer is not cycle-unambiguous, the systems and methods according to this invention halt. In various other exemplary embodiments, if the systems and methods according to this invention determine that the weighted finite-state automaton or transducer is not cycle-unambiguous, the systems and methods according to this invention nevertheless fully analyze this weighted finite-state automaton or transducer as outlined below. If the weighted finite-state automaton or transducer is determined not to have the twins property, then an indication is output that this result may be a false negative.

This intersection automaton or composed transducer is then analyzed to identify all strongly connected components occurring within the intersection transducer. For each transition in such a strongly connected component, the weight of the end state of that transition is determined as the $\otimes$-product of the weight of the beginning state of that edge of the strongly connected component and the weight of that edge of the strongly connected component. Then, once the cycle has been fully traversed, the weight of the end state at that time is compared to the $\otimes$-product of the weight on the beginning state of that transition and the weight of that transition. If, for any cycle, those values are not equal or the weight of that cycle is not the identity value for the multiplicative operator ($\otimes$), that weighted finite-state automaton or transducer does not have the twins property.

For unambiguous weighted finite-state automata, the weight of any cycle in the composed transducer being equal to the multiplicative operator ($\otimes$) identity value is both a necessary and sufficient condition to establish that that unambiguous weighted finite-state automaton has the twins property. However, while this is a necessary condition for weighted finite-state transducers, this is not a sufficient condition.

In various exemplary embodiments, to determine if a finite-state transducer has the twins property, that finite-state transducer is first composed with its inverse finite-state transducer to form a composed transducer. Then, the composed transducer is analyzed to determine all coaccessible states.

If, for any edge whose end state is coaccessible, if the residue of the end state of that edge is not equal to the residue of the beginning state of that edge and that edge, or if the end state of that edge is a final state and the residue of that end state is not the empty string, then that finite-state transducer is not functional. Otherwise, if these conditions hold for all edges having coaccessible end states, then the finite-state transducer is functional. It should be appreciated that functionality is a necessary, but not sufficient, property for a finite-state transducer.

Accordingly, once the finite-state transducer is found to be functional, the residues of the composed transducer are analyzed to ensure that one of a set of conditions over those residues is true for any edge in the composed transducer that has a cycle-accessible end state. If every edge in the composed transducer having a cycle-accessible end state meets one of the conditions, and the transducer is functional, then the finite-state transducer has the twins property. However, if any edge having a cycle-accessible end state does not meet any of the conditions, then the finite-state transducer does not have the twins property and thus is not determinizable.

For weighted finite-state transducers, a weighted finite-state transducer will be determinizable if it meets the conditions for both unambiguous weighted finite-state automata and the conditions for finite-state transducers.

These and other features and advantages of this invention are described in or are apparent from the following detailed description of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
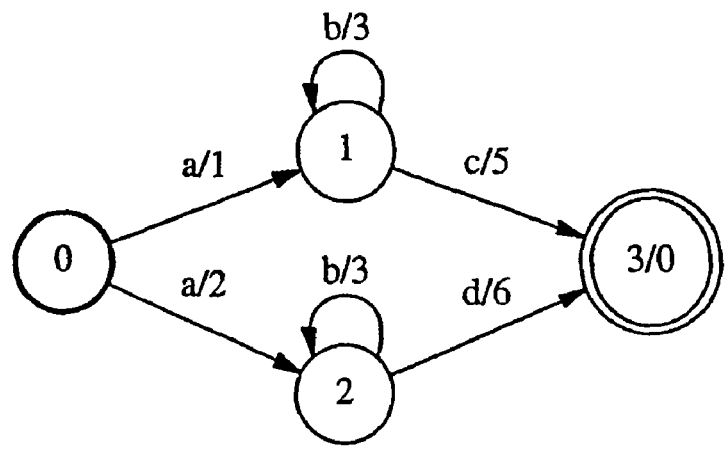
FIG. 1 illustrates an exemplary embodiment of a weighted finite-state automaton that has the twins property.

Finite-state automata are classical computational devices used in a variety of large-scale applications, such as text processing, speech processing and recognition, image processing and the like. Some applications in text, speech and image processing and recognition require weighted finite-state automata, which are more general devices, to account for the variability of the data and to rank various hypotheses generated during the processing or recognition process. A weighted finite-state automaton is a finite-state automaton in which each transition or edge between two states is labeled with some weight, in addition to the usual input symbol. Finite-state transducers are finite-state automata whose transitions or edges are additionally provided with an output label.

Weighted finite-state automata and transducers provide a common representation for the various components of a complex system in many applications. Weighted finite-state automata and transducers admit general methods or techniques, such as composition, which can be used to combine these components. A weighted finite-state automaton or transducer is deterministic if that automaton or transducer has a unique initial state and if no two transitions leaving the same state have the same input label. The time efficiency of the processes implemented with such weighted finite-state automata and transducers, and the systems that contain them, is substantially increased when deterministic weighted finite-state automata and transducers are used. Additionally, the size of such automata or transducers can be further reduced using general minimization techniques. The incorporated 679 patent describes exemplary embodiments of such determinization and minimization techniques or processes.

As indicated above, the incorporated 679 patent discloses a general determinization process for weighted finite-state automata and transducers. When the method disclosed in the incorporated 679 patent is applied to a non-deterministic weighted finite-state transducer or automaton, a deterministic machine equivalent to the input weighted finite-state automaton or transducer is output. However, in contrast to unweighted finite-state automata, not all finite-state transducers, and not all weighted finite-state automata, can be determinized using the method outlined in the incorporated 679 patent. In fact, some such finite-state transducers or weighted finite-state automata have no equivalent deterministic finite-state transducer or weighted finite-state automaton.

Thus, it would be desirable to be able to identify those weighted finite-state automata or those finite-state transducers that cannot be determinized before attempting to determinize a finite-state transducer or a weighted finite-state automaton. It has been known since the late 1970s that the "twins property" can be used to characterize determinizable finite-state transducers. It has also been known since the late 1970s that the twins property is decidable.

The incorporated Weber paper discloses a polynomial-time method for deciding the twins property for functional finite-state transducers. In particular, the inventors have determined, based on the inventors' most favorable estimates of the complexity of this algorithm, that the time complexity of this method is $O(|Q|^4(|Q|^2+|E|^2)|\Delta|)$, where Q is the set of states of the finite-state transducer to be analyzed, E is the set of transitions in that transducer, and $\Delta$ is the output alphabet. However, it should be appreciated that the Weber paper does not give a precise analysis of the complexity of this technique.

More recently, the incorporated Beal paper proposed a similar polynomial-time method for deciding the twins property for functional finite-state transducers. In particular, the time complexity of the Beal algorithm is $O(|Q|^4(|Q|^2+|E|^2))$. Thus, the time-complexity of the Beal method differs from the time-complexity of the Weber method only in that the time complexity of the Beal method does not depend on the size of the output alphabet.

Mohri, "Finite-State Transducers in Language and Speech Processing," (*Computational Linguistics*, 23(2) 1997), incorporated herein by reference in its entirety, discloses using a similar twins property to characterize the determinizability of unambiguous weighted finite-state automata over a commutative semiring. Mohri also disclosed a method for determining whether the twins property is present for unambiguous weighted finite-state automata. The complexity of the best existing algorithm implementing Mohri's method to test for the twins property is $O(|E|^2|Q|^6)$, as disclosed in the incorporated Buchsbaum paper.

Unfortunately, while the above-outlined algorithms accurately identify whether the twins property holds or does not hold for a particular weighted finite-state automaton or a particular finite-state transducer, the time-complexity of these algorithms is such that, for a weighted finite-state automaton or a finite-state transducer of even moderate complexity, these algorithms are not guaranteed to complete in a reasonable time. For weighted finite-state transducers used in text, speech and image processing, which can have well more than one million states, the time complexity of these known methods for million-state transducers is on the order of $O(|E|^2 10^{36})$ to $O(10^{36}+|E|^2 10^{24})$.

This invention provides systems and methods for determining the determinizability of a weighted finite-state automaton or a weighted or unweighted finite-state transducer that implement a conceptually much simpler and computationally much more efficient method for testing for the twins property for such weighted finite-state automata and weighted or unweighted finite-state transducers. In general, the time complexity of the determinizability determining systems and methods according to this invention is $O(|Q|^2(|Q|^2+|E|^2))$.

Weighted finite-state automata are finite-state automata in which the transitions or edges between states are labeled with weights in addition to the usual alphabet symbols. For various operations to be well-defined, the weight set needs to have the algebraic structure of a semiring or a left semiring. Given a transition e that is a member of the set E of all transitions of the transducer, that is, e∈E, the input label for that transition or edge is i[e], and the origin, previous or beginning state for that transition or edge is p[e], and the destination, next or end state for that transition or edge is n[e]. The weight for these weighted finite-state automata and transducers is w[e], while the output label for weighted or unweighted finite-state transducers is o[e].

For any given state q that is a member of the set of states Q in the finite-state automaton or transducer, that is, q∈Q, the set of transitions leaving q is E[q]. A path $\pi$ comprising transitions or edges $e_1 \ldots e_k$ in the finite-state transducer or automaton A is an element of the set of edges E* with consecutive transitions. That is, for transitions $e_{i-1}$ and $e_i$, the destination, next or final state of the $e_{i-1}$ transition or edge, $n[e_{i-1}]$, is the origin, previous or beginning state $p[e_i]$ for the $e_i$ transition or edge. Thus, the origin, previous or beginning state $p[\pi]$ of the path π is the origin, previous or beginning state p[$e_1$] of the first transition of the path π. Similarly, the destination, next or end state n[π] of the path π is the destination, next or end state n[$e_k$] of the last transition $e_k$ of the path π.

For any two states q and q', the set of paths π from q to q' is P(q, q'). Furthermore, the set of paths from q to q' having the input label string "x" is P(q, x, q'). In this case, the input label string "x" must be a string in the set of strings Σ* for the finite input alphabet Σ of the finite-state automata or transducer A, that is, x∈Σ*. The input and output labeling functions i[ ] and o[ ] can also be extended to paths by defining the label of a path π as the concatenation of the labels of the constituent transitions $e_1 \ldots e_k$ of that path π. Similarly, the weight function w[ ] can be extended to paths by defining the weight of a path π as the ⊗-product of the weights of its constituent transitions.

A finite-state transducer is "functional" or "single-valued" if that finite-state transducer associates at most one string to any input string "x". In particular, as set forth in the incorporated Mohri paper, functional transducers can be viewed as weighted finite-state automata over the string semiring. A successful path in a weighted finite-state automaton or a weighted or unweighted finite-state transducer is a path from an initial state i of that weighted finite-state automaton or that finite-state transducer to a final state f of that weighted finite-state automaton or that finite-state transducer. A state q of that weighted finite-state automaton or that finite-state transducer is "accessible" if that state q can be reached from one of the initial states I. That state q is "coaccessible" if one of the final states F of that weighted finite-state automaton or that finite-state transducer can be reached from the state q.

A weighted finite-state automaton or transducer is "trim" if there is no transition in that weighted finite-state automaton or transducer that is weighted with the identity value $\overline{0}$ for the additive operator (⊕), and if all states of that weighted finite-state automaton or transducer are both accessible and coaccessible. The weighted finite-state automaton or transducer is "cycle-unambiguous" if, for any state q and any string x, there is at most one cycle labeled with the string x that contains the state q. The weighted finite-state automaton or transducer is "unambiguous" if, for any string x that is a member of Σ*, that is, x∈Σ*, there is at most one successful path, i.e., a path from one of the initial states I to one of the final states F of that weighted finite-state automaton or transducer, that is labeled with the string x. Thus, by definition, an unambiguous transducer is functional.

A weighted finite-state automaton or a weighted or unweighted finite-state transducer M is deterministic if that weighted finite-state automaton or weighted or unweighted finite-state transducer M has a deterministic input. That is, that weighted finite-state automaton or that weighted or unweighted finite-state transducer M is deterministic if it has a unique initial state and if no two edges or transitions leaving the same state share the same input label. In the following discussion, an assumption is made that the weighted finite-state automata and finite-state transducers discussed are all such that for any string x that is a member of Σ*, that is, x∈Σ*, the weight of the path from the initial state to a state q having the input string x is not equal to the identity value of the additive operator (⊕). That is, x∈Σ*, W[P(I, x, q)]≠$\overline{0}$.

This condition is always verified with trim weighted finite-state automata or weighted or unweighted finite-state transducers over the tropical semiring, the string semiring, or any other zero-sum free semiring. As set forth in the incorporated 679 patent, a general method exists that takes as an input a weighted finite-state automaton and outputs an equivalent deterministic weighted finite-state automaton. The method disclosed in the 679 patent works with any divisible semiring. In particular, it applies to finite-state transducers, since the string semiring is divisible.

Figure 2:
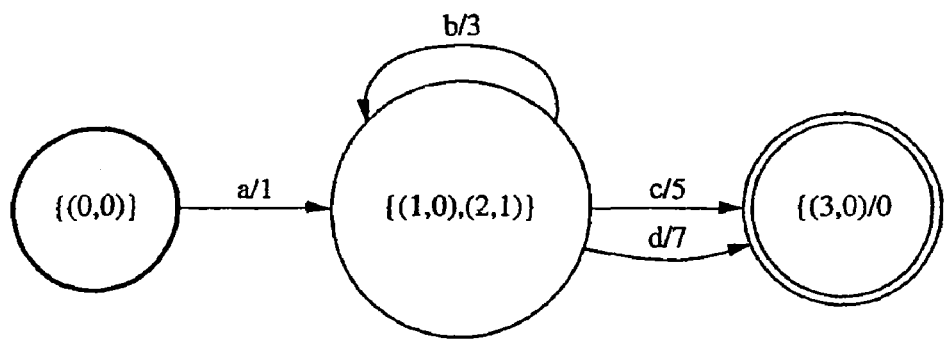
FIG. 2 illustrates one exemplary embodiment of the weighted finite-state automaton of FIG. 1 after determinization.
Figure 5:
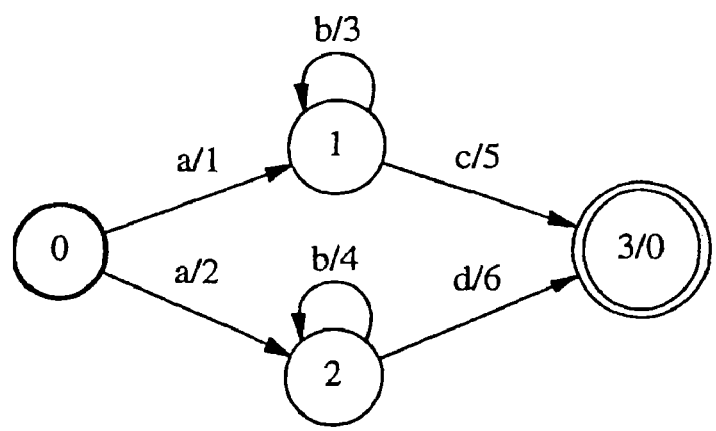
FIG. 5 illustrates one exemplary embodiment of a weighted finite-state automaton that does not have the twins property.

However, in some instances, this method does not halt. A weighted finite-state automaton or a weighted or unweighted finite-state transducer M will be determinizable if this method halts for the input weighted finite-state automaton or weighted or unweighted finite-state transducer M. FIG. 1 illustrates a weighted automaton over the tropical semiring. FIG. 2 illustrates the equivalent determinized weighted finite-state automaton over the tropical semiring. FIG. 5 illustrates one exemplary embodiment of a non-determinizable weighted finite-state automaton.

The "twins property" is a necessary and sufficient condition for weighted finite-state automata and weighted or unweighted finite-state transducers to be determinizable. In general, the twins property applies to a weighted finite-state automaton A or weighted or unweighted finite-state transducer T that is defined over a divisible semiring K. Two states q and q' of the weighted finite-state automaton A or weighted or unweighted finite-state transducer T are siblings if there exist two strings x and y in Σ* such that both q and q' can be reached from an initial state i over paths π labeled with the string y and there is a cycle c at both q and q' that is each labeled with the string x. Then, two siblings q and q' are twins if $$(W[P(I, y, q)] \oplus W[P(I, y, q')])^{-1} \otimes W[P(I, y, q')] = \qquad (1)$$
$$((W[P(I, y, q)] \otimes W[P(q; x, q)]) \oplus (W[P(I, y, q')] \otimes W[P(q; x, q')]))^{-1}$$
$$\otimes W[P(I, y, q')] \otimes W[P(q; x, q')]$$

Then, the weighted finite-state automaton A or the weighted or unweighted finite-state transducer T will have the twins property so long as every two siblings in that weighted finite-state automaton or that weighted or unweighted finite-state transducer are twins.

Figure 3:
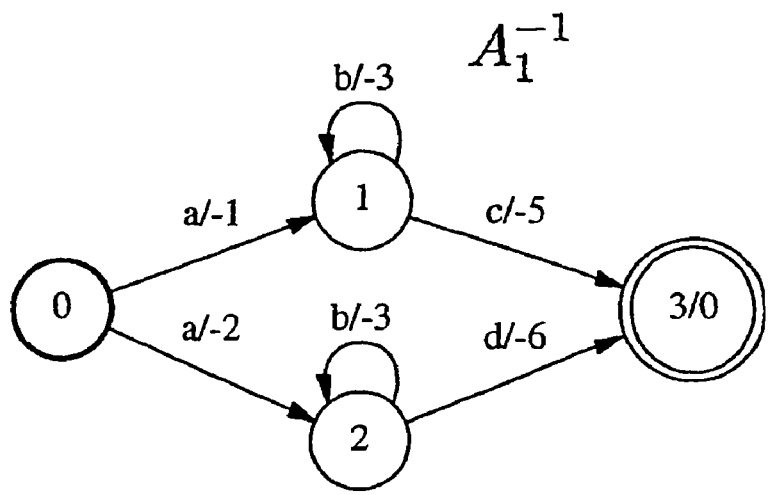
FIG. 3 illustrates one exemplary embodiment of the inverse weighted finite-state automaton for the weighted finite-state automaton shown in FIG. 1.

According to this invention, the systems and methods for determining whether a given weighted finite-state automaton A or a weighted or unweighted finite-state transducer T is determinizable is based on intersecting that weighted finite-state automaton A with its inverse automaton $A^{-1}$ or composing that weighted or unweighted finite-state transducer T with its inverse transducer $T^{-1}$ to form an intersection automaton or composed transducer, respectively. For the weighted finite-state automaton $A_1$ shown in FIG. 1, the inverse weighted finite-state automaton $A_1^{-1}$ is shown in FIG. 3. In general, when the weighted finite-state automaton is over the tropical semiring, to generate the inverse weighted finite-state automaton $A_1^{-1}$ from a weighted finite-state automaton $A_1$, the input labels are left unchanged, while the values of the weights are negated. That is, for the tropical semiring, the inverse is the negation.

It should be appreciated that, when the semiring K over which the weighted finite-state automaton or finite-state transducer is defined is commutative, then the general definition of the twins property set forth in Eq. (1) can be simplified. In particular, Eq. (1) reduces to:

$$W[P(q, x, q)]=W[P(q; x, q')]. \qquad (2)$$

That is, Eq. (2) states that, for a pair of sibling states q and q', a weighted finite-state automaton or transducer will or may, respectively, have the twins property when the weight of the cycle from state q back to state q over the string x is equal to the weight of the cycle from state q' back to state q' over the same string x. It should be appreciated that, for a weighted finite-state transducer, this is a necessary but insufficient condition.

For example, in the weighted finite-state automaton $A_1$ shown in FIG. 1, states 1 and 2 are sibling states. In this case, the string x is "b" and the cycles over q and q' are states 1-1 and states 2-2, respectively. Because the weight of the cycle over q is 3, and the weight of the cycle over q' is also 3, the weights are equal and these siblings are twins. Because these siblings are the only siblings in the weighted automaton $A_1$, and these siblings are twins, this weighted automaton $A_1$ has the twins property.

It should also be appreciated that the weighted automaton $A_1$ shown in FIG. 1 is extremely simple. In practice, especially for the very large weighted finite-state automata and transducers used in speech processing, text processing and image processing, identifying the sibling states and determining the weights of the cycles over those states is non-trivial.

However, according to the systems and methods of this invention, for a given weighted finite-state automaton A or weighted or unweighted finite-state transducer T, that weighted finite-state automaton A or weighted or unweighted finite-state transducer T can be more efficiently tested for twins property based on the intersection of that weighted finite-state automaton A or the composition of that weighted or unweighted finite-state transducer T with its inverse weighted finite-state automaton $A^{-1}$ or weighted or unweighted finite-state transducer $T^{-1}$. In particular, the systems and methods according to this invention assume that the multiplicative operation of the semiring over which the weighted finite-state automaton or transducer is defined admits an inverse, where the inverse weighted finite-state automaton or transducer is defined as the weighted finite-state automaton or transducer obtained from the initial weighted finite-state automaton or transducer by replacing each weight that is not equal to the identify value $\overline{0}$ of the additive operator ($\oplus$) by the inverse of that weight. It should also be appreciated that the inverse will be defined by the particular semiring over which the weighted finite-state automaton or transducer is defined.

In particular, for any trim cycle-unambiguous weighted finite-state automaton or transducer that is defined over the semiring K, that trim cycle-unambiguous weighted finite-state automaton or transducer will have the twins property if and only if the weight of any cycle in the intersection of that weighted finite-state automaton or transducer with its inverse is equal to the identity value $\overline{1}$ for the multiplicative operator ($\otimes$) of that semiring K. This condition is referred to as the "cycle-identity" condition. The cycle-identity is a necessary condition for weighted finite-state transducers to be determinizable and is a necessary and sufficient condition for weighted finite-state automata to be determinizable. It should also be appreciated that checking that the weight of each cycle of a weighted automaton or transducer equals the identity value $\overline{1}$ of the multiplicative operator ($\otimes$) can be done in linear time.

Figure 4:
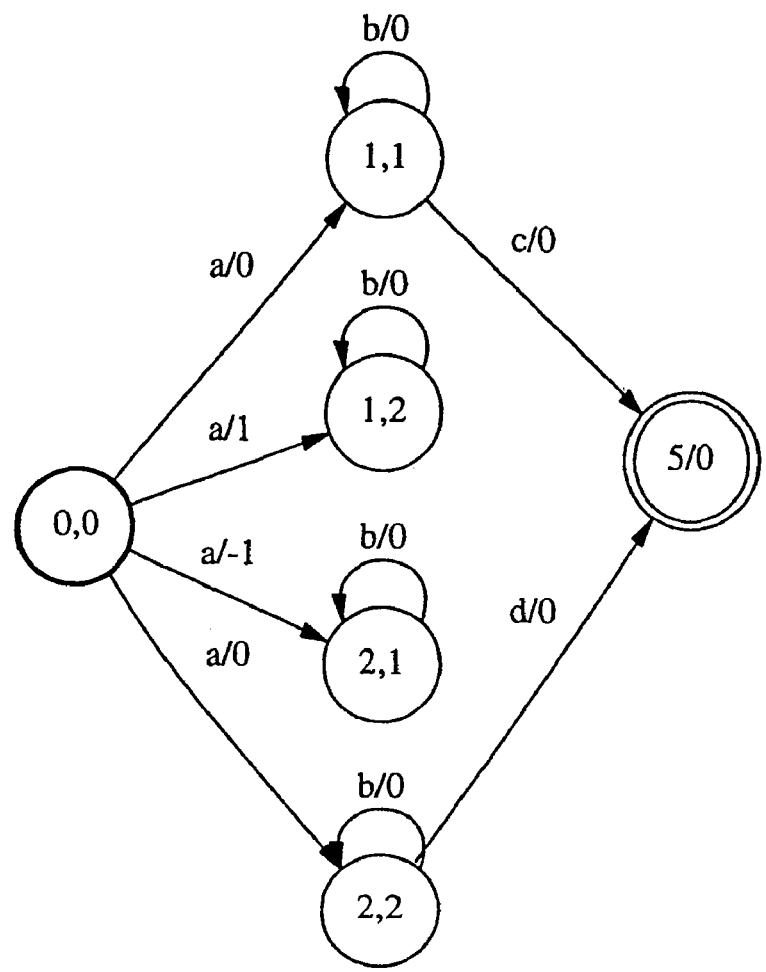
FIG. 4 illustrates one exemplary embodiment of a weighted finite-state automaton obtained by intersecting the weighted finite-state automata shown in FIGS. 1 and 3.

FIG. 4 illustrates the weighted finite-state automaton $A_{f1}$ obtained by intersecting the weighted finite-state automaton $A_1$ shown in FIG. 1 with its inverse weighted finite-state automaton $A_1^{-1}$ shown in FIG. 3. In particular, upon inspecting the weighted finite-state automaton $A_{f1}$, which is shown in FIG. 4, it is clear that each of the cycles, i.e., the cycles shown extending from state 1,1 back to state 1,1, extending from state 1,2 back to state 1,2, extending from state 2,1 back to state 2,1 and extending from state 2,2 back to state 2,2, has a weight of zero. Since the weighted finite-state automaton $A_1$ is defined over the tropical semiring, which uses the addition function (+) as the multiplicative operator ($\otimes$) and where the addition function has the value zero as its identity value, each of the cycles in the weighted finite-state automaton shown in FIG. 4 has as its weight the identity value of the multiplicative operator ($\otimes$) of the tropical semiring over which the weighted finite-state automaton $A_1$ is defined. Thus, as was already explained, the weighted finite-state automaton $A_1$ has the twins property. However, by using the automaton shown in FIG. 4, it was not necessary to compare the weights of two sibling states to each other. Rather, it was merely necessary to independently inspect the weights on each cycle.

Figure 6:
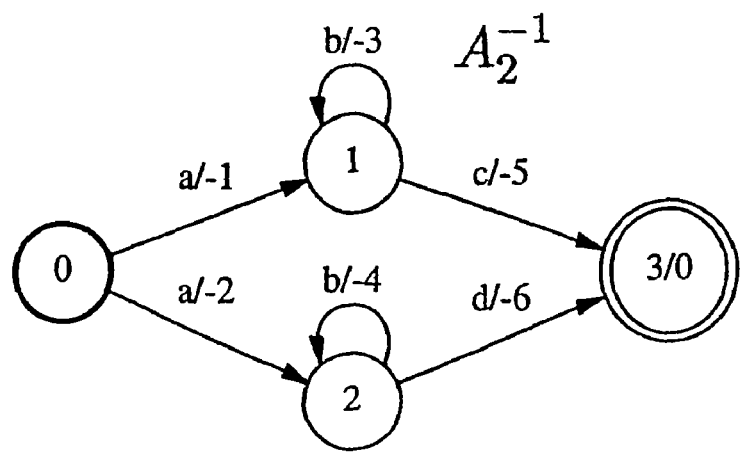
FIG. 6 illustrates one exemplary embodiment of the inverse weighted finite-state automaton obtained by inverting the weighted finite-state automaton shown in FIG. 5.
Figure 7:
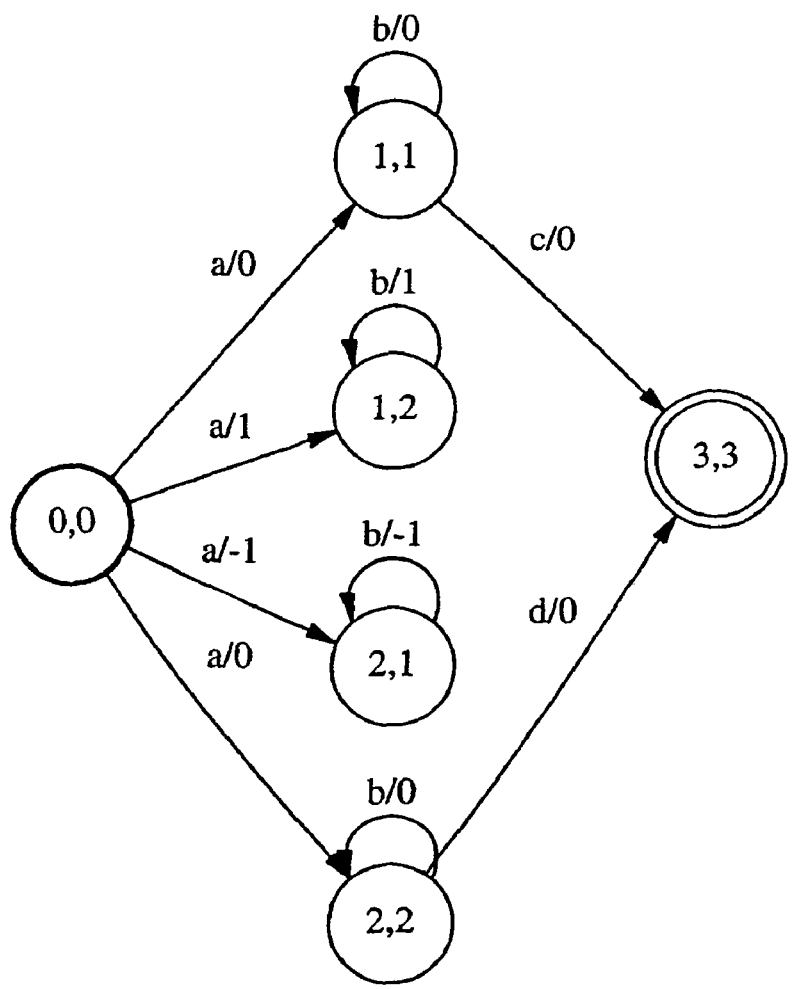
FIG. 7 illustrates one exemplary embodiment of a weighted finite-state automaton obtained by intersecting the weighted finite-state automata shown in FIGS. 5 and 6.

FIGS. 5-8 illustrate the analysis for a second weighted finite-state automaton $A_2$ that does not have the twins property. In particular, the second weighted finite-state automaton $A_2$ is also defined over the tropical semiring. FIG. 6 shows the inverse automaton $A_2^{-1}$ for the second weighted finite-state automaton $A_2$. FIG. 7 shows the weighted finite-state automaton $A_{f2}$ that is obtained when the weighted finite-state automatons $A_2$ and $A_2^{-1}$ are intersected with each other.

Figure 8:
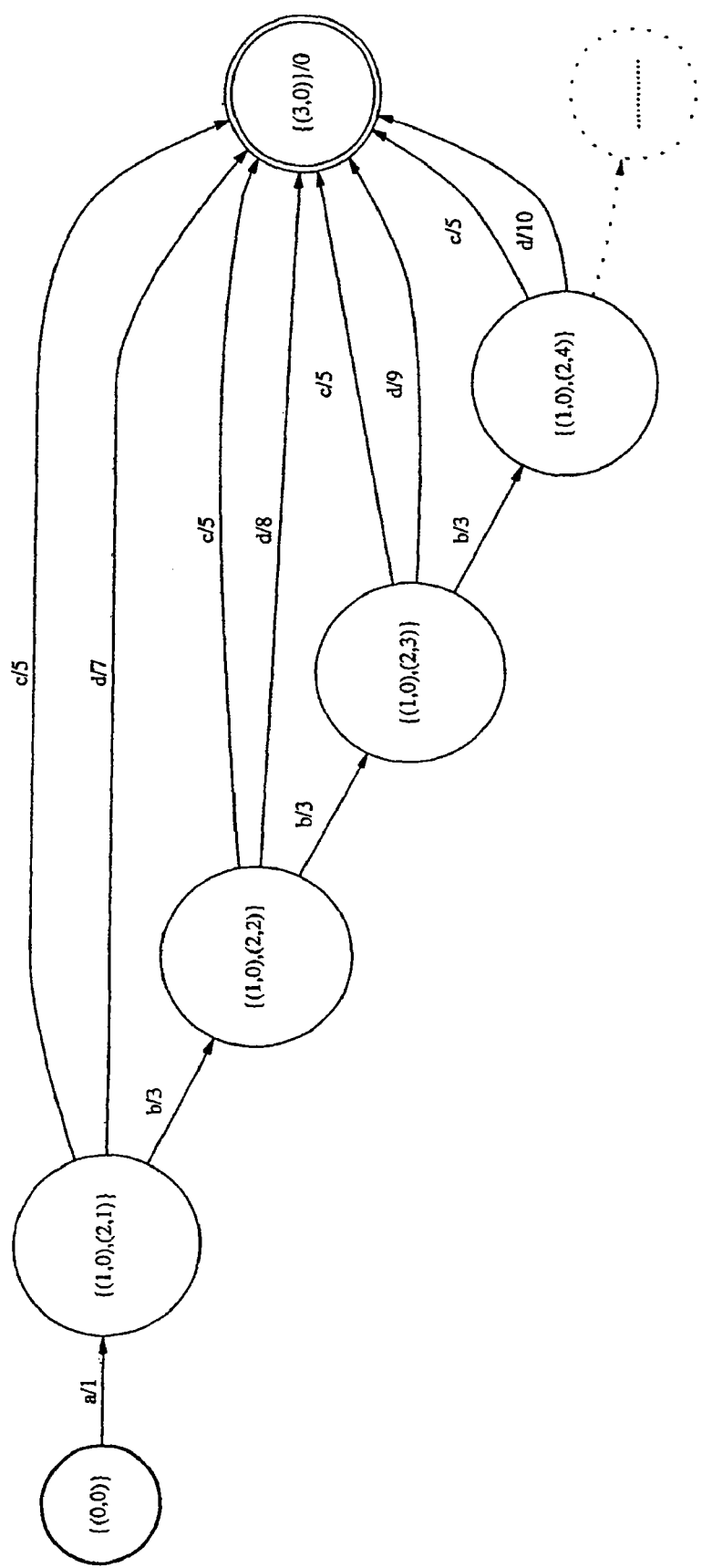
FIG. 8 illustrates the results of one exemplary attempt to determinize the weighted finite-state automaton shown in FIG. 5.

In particular, as shown in FIG. 7, at least one of the cycles in the resulting automaton shown in FIG. 7 has non-zero weights. Since, as described above, zero is the identity value for the multiplicative operator ($\otimes$) of the tropical semiring, at least one cycle in the resulting weighted finite-state automaton shown in FIG. 7 does not meet the first condition, that is, the cycle-identity condition, outlined above. Thus, the second weighted finite-state automaton $A_2$ does not have the twins property and is therefore not determinizable. Not surprisingly, as shown in FIG. 8, when an attempt is made to determinize the second weighted finite-state automaton $A_2$ using the method outlined in the incorporated 679 patent, an infinite series of steps is created and the determinization method disclosed in the 679 patent never halts.

It should be appreciated that this first, or "cycle-identity", condition is both necessary and sufficient for weighted finite-state automata. However, as further outlined below, for weighted finite-state transducers, this first, or "cycle-identity", condition is necessary, but is not sufficient. Moreover, for unweighted finite-state transducers, this first, or "cycle-identity", condition is neither necessary nor sufficient.

Rather, according to this invention, for unweighted finite-state transducers, the systems and methods of this invention test for the twins property based on composing an unweighted finite-state transducer T with its inverse unweighted finite-state transducer $T^{-1}$, as well as a characterization of the twins property in terms of combinatorics of words. More particularly, this characterization is based on the properties of the "residue" of two strings, that is, the "residue" of paths.

It should be appreciated that the classical concept of combinatorics on words refers to the relationships between two strings. For example, for two strings x and y in $\Sigma^*$, y is a "prefix" or a "suffix" of x if there exists another string z that is a member of $\Sigma^*$ such that x=yz or x=zy, respectively.

For two strings x and y of the free group $\Sigma(*)$, i.e., the free group generated by $\Sigma$, the "residue" of the string x by the string y is defined as "$y^{-1}x$". A residue is said to be "pure" if that residue is in the set of $\Sigma \cup (\Sigma^{-1})^*$.

It should be appreciated that, when x and y are strings, the residue $y^{-1}x$ is pure if y is a prefix of x m or x is a prefix of y. An element x that is a member of the free group $\Sigma(*)$ generated by $\Sigma$ is said to be "primitive" if that element x cannot be written as $x=y^n$, where n is a natural number and y is not equal to x. Moreover, for an element x that is a member of the free group $\Sigma(*)$, a unique primitive element y exists in the free group $\Sigma(*)$ such that x is equal to $y^n$, where n is a natural number. In this case, y is called the primitive root of x. It should also be appreciated that the elements x and y will commute if xy=yx. When x and y commute, this can be written as x≡y.

For two elements x and y of the free group $\Sigma(*)$, except for the empty string $\epsilon$, x and y will commute if and only if the primitive root of x is the primitive root of y or its inverse. Thus, for any string u that is a member of $\Sigma^*$, x and y will commute if and only if $u^{-1} xu \equiv u^{-1} yu$, that is, the strings "$u^{-1} xu$" and "$u^{-1}yu$" commute.

For a path $\pi$ in an unweighted finite-state transducer T, the residue of $\pi$ in the unweighted finite-state transducer T is defined as the residue of its input and output labels. That is, the residue $<\pi> = i[\pi]^{-1} o[\pi]$. The definition of purity can be extended to paths by saying that a path $\pi$ is pure when its residue $<\pi>$ is pure.

Take, for example, an unweighted finite-state transducer T that has four paths $\pi_1, \pi_2, \pi_3$, and $\pi$ such that the end state n[ ] of each of the paths $\pi_1 \pi_2$ and $\pi_3$ is the initial or beginning state p[ ] of the path $\pi$, that is, $n[\pi_1]=n[\pi_2]=n[\pi_3]=p[\pi]$. If this is true, then four conditions over these four paths of this transducer T can be defined. First, the residue of the path $\pi_1$ is equal to the residue of the path $\pi_2$ if and only if the residue of the extended path $\pi_1\pi$ is equal to the residue of the extended path $\pi_2\pi$. That is, $<\pi_1>=<\pi_2>$ iff $<\pi_1\pi>=<\pi_2\pi>$.

Second, the residue of the residue of $\pi_1$ by the residue of $\pi_3$ commutes with the residue of the residue of $\pi_1$ by the residue of $\pi_2$ if and only if the residue of the residue of the extended path $\pi_1\pi$ by the residue of the extended path $\pi_3\pi$ commutes with the residue of the residue of the extended path $\pi_1\pi$ by the residue of the extended path $\pi_2\pi$. That is, $<\pi_1>^{-1}<\pi_3>\equiv<\pi_1>^{-1}<\pi_2>$ iff $<\pi_1\pi>^{-1}<\pi_3\pi>\equiv<\pi_1\pi>^{-1}<\pi_2\pi>$. Third, if the path $\pi_1$ is not pure, then the extended path $\pi_1\pi$ is also not pure. Fourth and finally, if the path $\pi_1$ is not pure and the residue of the extended path $\pi_1\pi$ is equal to the residue of the path $\pi_1$, then the input string of the path $\pi$ is equal to the output string of the path $\pi$ and both are equal to the empty string. That is, if $\pi_1$ is not pure and $<\pi_1\pi>=<\pi_1>\equiv o[\pi]=\epsilon$.

In particular, according to this invention, the systems and methods of this invention test the functionality of a finite-state transducer using a composed finite-state transducer obtained by composing the finite-state transducer with its inverse finite-state transducer. In particular, a given finite-state transducer T is functional if and only if the composed finite-state transducer is equal to the identity function over the domain of that composed finite-state transducer. That is, the finite-state transducer T is functional if $[T \circ T^{-1}] = Id_{DOM(T \circ T^{-1})}$. It should be appreciated that "Id" is the identity function, and $Id_x$ is the restriction of the identity function to a subset X, where $X \in \Sigma^*$.

It should be appreciated that, according to this invention, checking that a particular finite-state transducer T is equivalent to the identity function over its domain of definition can be done in linear time in the size of that finite-state transducer T. It should also be appreciated that T being equivalent to the identity function over its domain of definition is equivalent to the input string of the path $\pi$ being equal to the output string of the path $\pi$, that is, $i[\pi]=o[\pi]$ for any successful path $\pi$. This itself is further equivalent to, and thus defines a second condition, that the residue for any successful path is the empty spring, that is, $<\pi>=\epsilon$ for any successful path $\pi$. Thus, the functionality of any finite-state transducer T can be determined by verifying that this second condition holds for all successful paths in the composed finite-state transducer $T_C$.

It should further be appreciated that, if a given finite-state transducer is equivalent to the identity function over its domain of definition, that is, $[T]=Id_{DOM(T)}$, then, for any two paths $\pi$ and $\pi'$ from one of the initial states to a particular coaccessible state q, the residue of $\pi$ is equivalent to the residue of $\pi'$. That is, for $\pi \in P(I, q)$ and $\pi' \in P(I, q)$ and $\pi \neq \pi'$, $<\pi>=<\pi'>$. Thus, the residue of any path from the initial state i to such a coaccessible state q is $R[q]$.

As outlined above, functional finite-state transducers can be viewed as weighted finite-state automata over the string semiring, which is a divisible semiring. Accordingly, Eq. (1) can be simplified for the string semiring and, for any paths $\pi_1$, $\pi_2, \pi'_1$, and $\pi'_2$, can be rewritten as:

$$i[\pi_1]^{-1} o[\pi'_1] = (i[\pi_1] i[\pi_2])^{-1} o[\pi'_1] o[\pi'_2], \qquad (3)$$

where $\pi_1 \in P(I, y, q), \pi_2 \in P(q, x, q), \pi'_1 \in P(I, y, q')$, and $\pi'_2 \in P(q', x, q')$.

As indicated above, the twins property is a characterization of the determinizability of functional transducers. Thus, if a given finite-state transducer T is a functional transducer, then that functional finite-state transducer T is determinizable if and only if that functional finite-state transducer T has the twins property.

Moreover, as outlined above, the twins property can be reformulated in terms of residues of paths in the composed finite-state transducer $T_C$ obtained by composing that functional finite-state transducer T with its inverse finite-state transducer $T^{-1}$. Thus, a given finite-state transducer T will have the twins property if and only if, for any path $\pi$ from an initial state i to a cycle c in the composed finite-state transducer $T_C$ obtained by composing that finite-state transducer T with its inverse, $<\pi>=<\pi c>$, that is, if the residue $<\pi>$ of the path $\pi$ is equal to the residue $<\pi c>$ of the concatenated path $\pi c$. Thus, according to this invention, the systems and methods of this invention determine whether a given functional finite-state transducer T has the twins property by determining whether this third condition of the composed finite-state transducer $T_C$ is true for all paths $\pi$ in the composed finite-state transducer $T_C$ that extend from an initial state to a cycle.

However, according to this invention, two properties of residues can be used to avoid redundant determinations of residues. First, as outlined above, when two paths $\pi_1$ and $\pi_2$ share the same suffix $\pi$, then, $<\pi_1>=<\pi_2>$ iff $<\pi_1\pi>=<\pi_2\pi>$. That is, if these two paths share the same suffix, the residue of one path will be equal to the residue of the other path if and only if the residue of the first path and its suffix is equal to the residue of the second path and its suffix. The second property is that it is only necessary to determine at most two distinct path residues $R_1$ and $R_2$ for any state q. The reasons for this will be discussed below.

In particular, the condition $<\pi>=<\pi c>$ outlined above implies that $|i[c]|=|o[c]|$, that is, the length of the input string of the cycle c is equal to the length of the output string of the cycle c, for any cycle c. Thus, for any cycle c, this further implies that $i[c]=\epsilon$ if $o[c]=\epsilon$. That is, this implies that the input string of the cycle is equal to the empty string if and only if the output string of the cycle is also equal to the empty string. Thus, when $i[c]=o[c]=\epsilon$, that is, both the input and output strings of the cycle are the empty string, the condition $<\pi>=<\pi c>$ holds for any path $\pi$. It should be appreciated that a cycle c is a non-empty-string cycle c (non-$\epsilon$ cycle c) if ($i[c]\neq\epsilon$ or $o[c]\neq\epsilon$), that is, if either the input string or the output string is not the empty string.

As outlined above, a state q of a finite-state transducer T is "cycle-accessible" if there exists a path in that finite-state transducer T from that state q to a non-$\epsilon$ cycle c. Moreover, if a given functional finite-state transducer has the twins property, then the residue of any path $\pi_1$ in the composed finite-state transducer $T_C$, obtained by composing that functional finite-state transducer T with its inverse finite-state transducer $T^{-1}$, from the initial state i to a cycle-accessible state q is pure.

For example, take a finite-state transducer T that has two paths $\pi_1$ and $\pi_2$ that lead from the initial state i to the same non-ε cycle c. Then, if $<\pi_1>=<\pi_1 c>$, that is, the residue of the path $\pi_1$ is equal to the residue of the path $\pi_1$ concatenated with the cycle c, then $<\pi_2>=<\pi_2 c>$ iff $<\pi_1>^{-1}<\pi_2>\equiv o[c]$. That is, if the residue of the path $\pi_1$ is equal to the residue of the path $\pi_1$ concatenated with the cycle c, then the residue of the path $\pi_2$ is equal to the residue of the path $\pi_2$ concatenated with the cycle c if and only if the residue of the residue of path $\pi_1$ and the residue of the path $\pi_2$ commutes with the output string of the cycle c. It should be appreciated that the condition $<\pi_1>^{-1}<\pi_2>\equiv o[c]$, that is, that the residue of the residue of path $\pi_1$ and the residue of path $\pi_2$ commutes with the output string of the cycle c, implies that $<\pi_1>^{-1}<\pi_2>$ is pure, that is, the residue of the residue of the path $\pi_1$ and the residue of the path $\pi_2$ is pure, since o[c], that is, the output string of the cycle c, is in $\Sigma^*$.

Then, take, for example, a finite-state transducer T having three paths $\pi_1$, $\pi_2$ and $\pi$ having distinct residues and each leading from the initial state i to the same non-ε cycle c. Then, if $<\pi_1>=<\pi_1 c>$ and $<\pi_2>=<\pi_2 c>$, then $<\pi>=<\pi c> \Leftrightarrow <\pi_1>^{-1}<\pi>\equiv<\pi_1>^{-1}<\pi_2>$. That is, if the residue of the path $\pi_1$ is equal to the residue of the path $\pi_1$ concatenated with the cycle c, and the residue of the path $\pi_2$ is equal to the residue of the path $\pi_2$ concatenated with the cycle c, then the residue of the path $\pi$ is equal to the residue of the path $\pi$ concatenated with the cycle c if and only if the residue of the residue of path $\pi_1$ and the residue of the path $\pi$ commutes with the residue of the residue of the path $\pi_1$ and the residue of the path $\pi_2$.

Next, take, for example, a composed transducer $T_C$, which was obtained by composing a functional finite-state transducer T with its inverse functional finite-state transducer $T^{-1}$, that has three paths $\pi_1$, $\pi_2$, and $\pi_3$ in that composed finite-state transducer $T_C$ that lead to the same cycle-accessible state q. A fourth condition can then be defined as $<\pi_1>^{-1}<\pi_2>\equiv<\pi_1>^{-1}<\pi_3>$. That is, the fourth condition requires that the residue of the residue of the path $\pi_1$ and the residue of the path $\pi_2$ commute with the residue of the residue of the path $\pi_1$ and the residue of the path $\pi_3$. Then, if the functional finite-state transducer T has the twins property, then this condition will hold for the composed transducer $T_C$ obtained by composing the functional finite-state transducer T with its inverse functional finite-state transducer $T^{-1}$.

Next, take, for example, the composed transducer $T_C$ obtained by composing a functional finite-state transducer T with its inverse functional finite-state transducer $T^{-1}$, where the composed finite-state transducer $T_C$ has two spanning trees $U_1$ and $U_2$. Then, for each state q in the composed finite-state transducer $T_C$, the paths in the two spanning trees $U_1$ and $U_2$ from the initial state i to that state q are $\Pi_1[q]$ and $\Pi_2[q]$, respectively. The two spanning trees $U_1$ and $U_2$ are "consistent" if, for any cycle-accessible state q, the paths $\Pi_1[q]$ and $\Pi_2[q]$ are pure; and if the cycle-accessible state q can be reached by two paths with distinct residues, then $\Pi_1[q]$ and $\Pi_2[q]$ have distinct residues, i.e., $<\Pi_1[q]> \neq <\Pi_2[q]>$. In particular, the residues $<\Pi_1[q]>$ and $<\Pi_2[q]>$ can be denoted as $R_1[q]$ and $R_2[q]$, respectively. Additionally, a strongly connected component that contains a state q of the composed transducer $T_C$ can be denoted as "scc[q]".

Then, for a composed transducer $T_C$ obtained by composing a functional finite-state transducer T with its inverse functional finite-state transducer $T^{-1}$ that has two consistent spanning trees $U_1$ and $U_2$, two residue conditions can be defined corresponding to the third and fourth conditions. First, if scc[n[e]]=scc[p[e]], then $R_k[n[e]]=i[e]^{-1}R_k[p[e]]o[e]$ for k=1 or 2. That is, the first residue condition is that, for an edge e in the composed transducer $T_C$, if a strongly connected component scc[n[e]] that contains the end state n[e] of that edge e is equal to the strongly connected component scc[p[e]] that contains the beginning state p[e] of that edge e, then the residue $R_k[n[e]]$ of the end state n[e] for the first or second spanning tree $U_1$ and $U_2$ is equal to the residue $i[e]^{-1}R_k[p[e]]$ o[e] of the beginning state p[e] of that edge concatenated with that edge e, for the first or second spanning trees $U_1$ and $U_2$, respectively.

The second residue condition is that, for an edge e in the composed finite-state transducer $T_C$, for any residue R[n[e]] of a path from the initial state i to the end state n[e] of that edge e, $R_1[n[e]]^{-1} R_2[n[e]] \equiv R_1[n[e]]^{-1} R[n[e]]$. It should be appreciated that this is merely the fourth condition rewritten using R[ ] instead of $<\pi_i>$. That is, for such a path, the residue of the first residue $R_1[n[e]]$ of the end state n[e] of that edge e and the second residue $R_2[n[e]]$ of that end state n[e] commutes with the residue of the first residue $R_1[n[e]]$ of that end state n[e] and the residue R[n[e]]. Then, the functional finite-state transducer T will have the twins property if and only if one of these two residue conditions holds for the composed transducer $T_C$ for any edge e that has an end state n[e] that is cycle-accessible.

Figure 9:
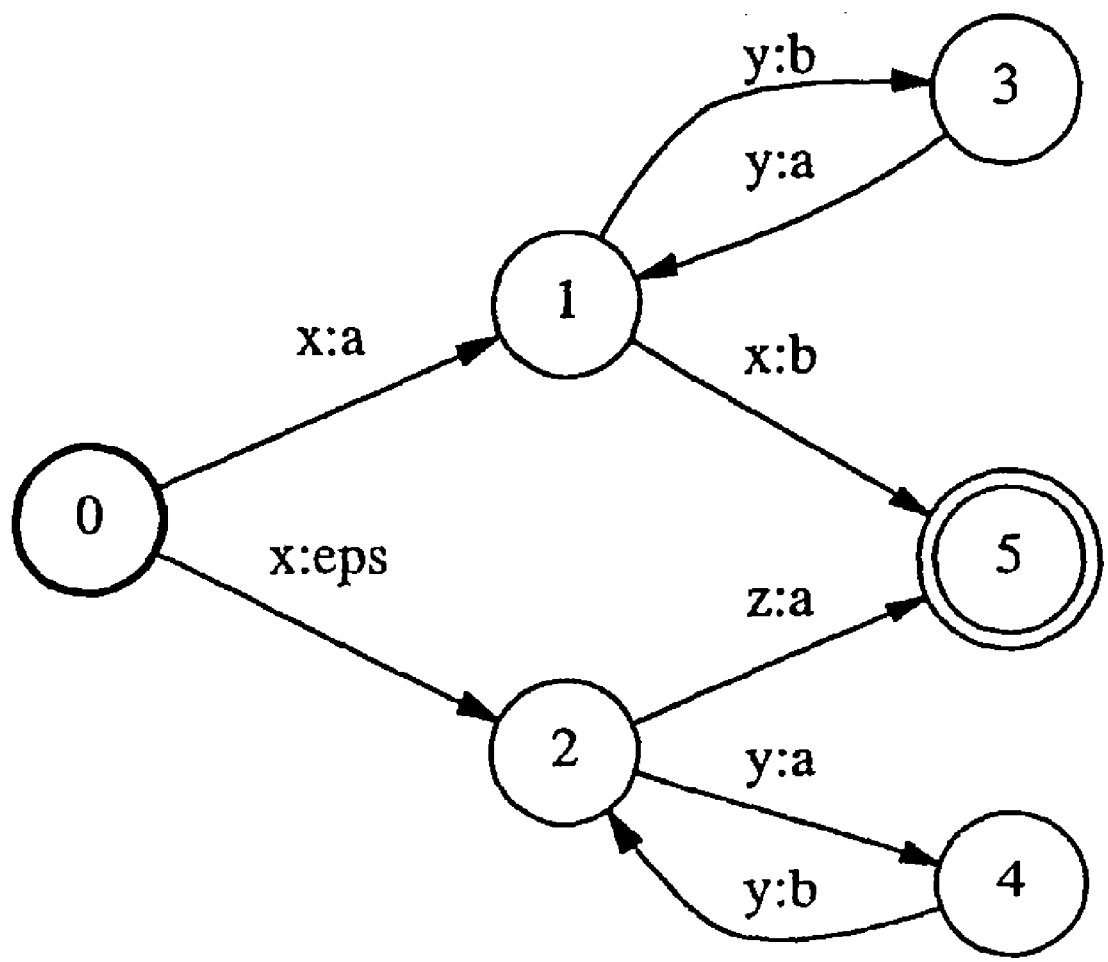
FIG. 9 illustrates one exemplary embodiment of a finite-state transducer that has the twins property.
Figure 10:
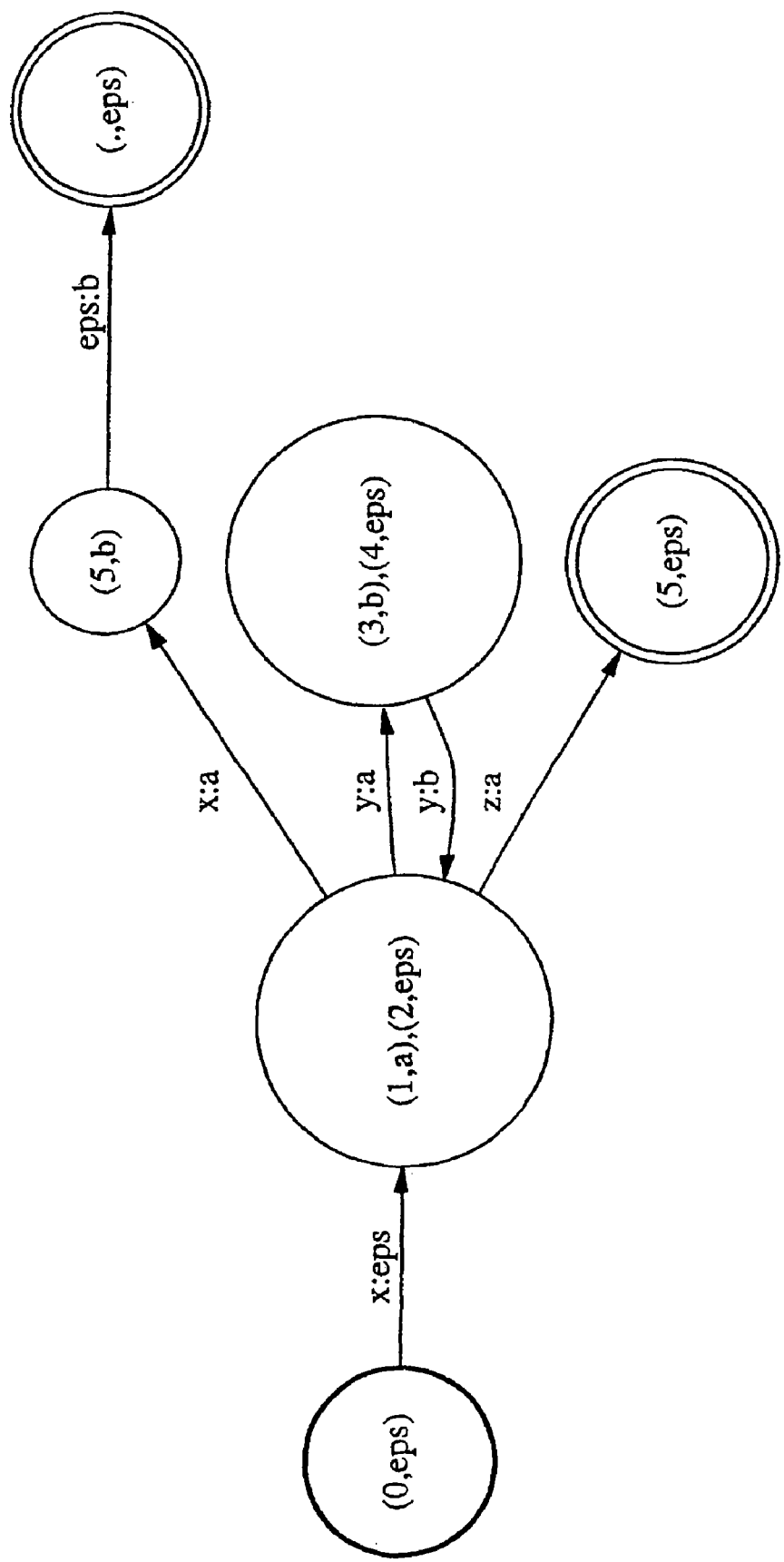
FIG. 10 illustrates one exemplary embodiment of the finite-state transducer shown in FIG. 5 after determinization.
Figure 11:
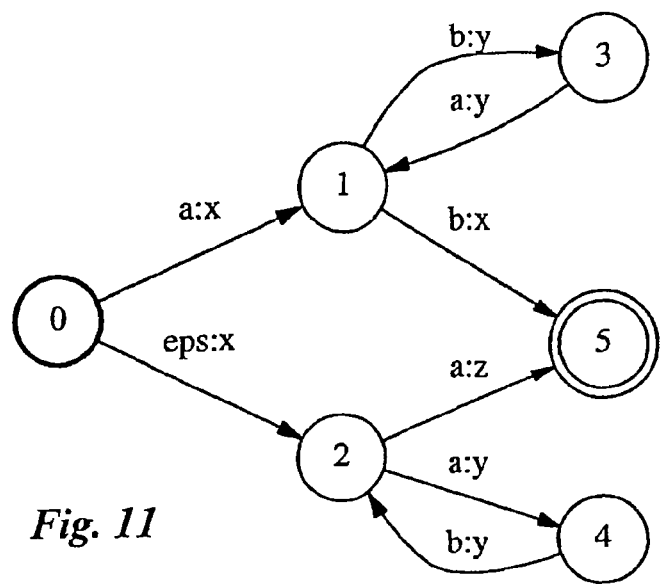
FIG. 11 illustrates one exemplary embodiment of the inverse finite-state transducer obtained by taking the inverse of the finite-state transducer shown in FIG. 9.
Figure 12:
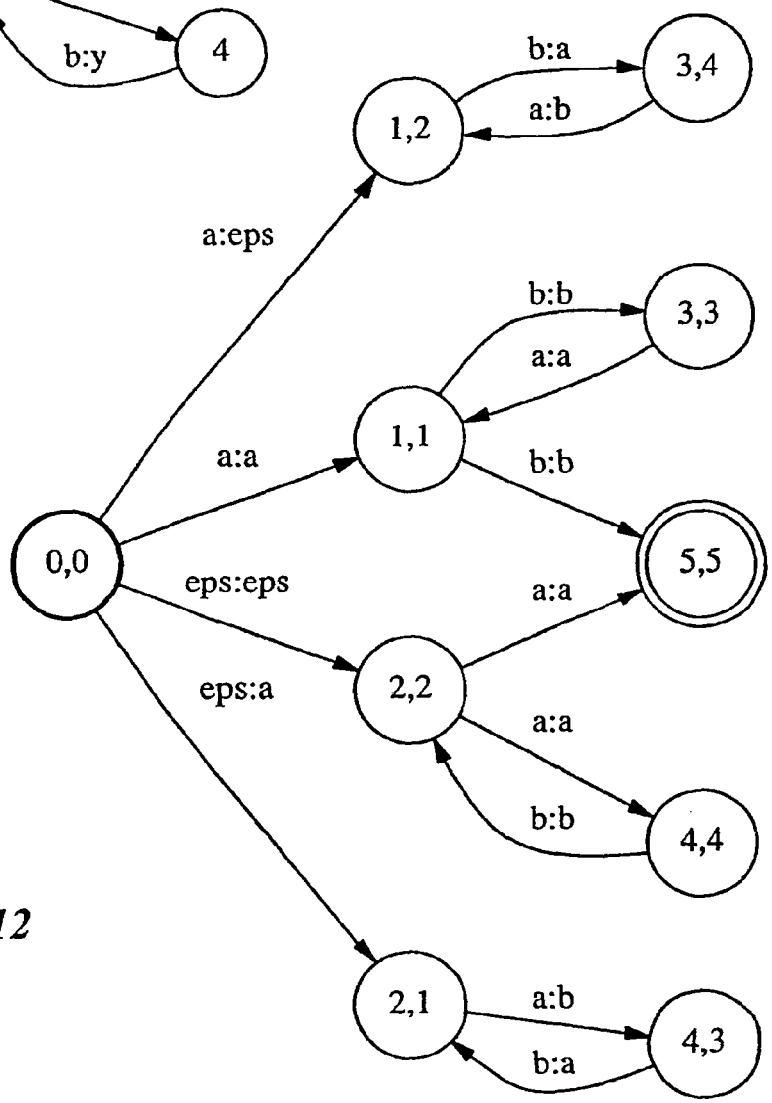
FIG. 12 illustrates one exemplary embodiment of a composed finite-state transducer obtained by composing the finite-state transducers shown in FIGS. 9 and 11.
Figure 13:
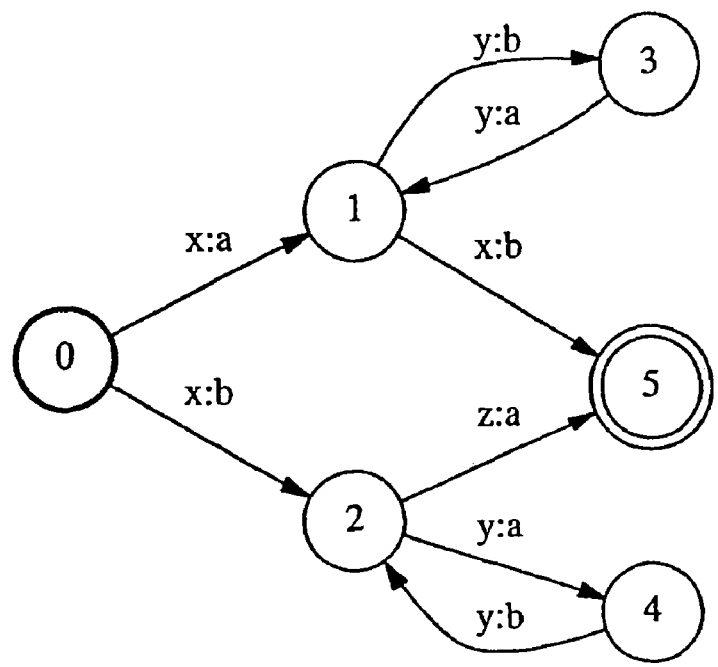
FIG. 13 illustrates one exemplary embodiment of a finite-state transducer that does not have the twins property.

FIGS. 9-16 illustrate two finite-state transducers $T_1$ and $T_2$ for which this first residue condition does and for which it does not hold, respectively. In particular, FIG. 9 is a functional finite-state transducer $T_1$ that does have the twins property. FIG. 10 illustrates that the functional finite-state transducer $T_1$ can be determinized using the method set forth in the 679 patent and therefore must have the twins property. FIG. 11 illustrates one exemplary embodiment of the inverse finite-state transducer $T_1^{-1}$. FIG. 12 shows the composed transducer $T_{c1}$ that is obtained by composing the transducers $T^1$ and $T_1^{-1}$ shown in the FIGS. 9 and 11.

In particular, in FIG. 12, there are four cycles. The first cycle comprises states 1,2 and 3,4. The second cycle comprises states 1,1 and 3,3. The third cycle comprises states 2,2 and 4,4. The fourth cycle comprises states 2,1 and 4,3. The path from state 0,0 to state 1,2 is path $\pi_1$, while the paths from state 0,0 to states 1,1, 2,2 and 2,1, respectively, are paths $\pi_2$, $\pi_3$, and $\pi_4$, respectively. Thus, according this condition, for the functional finite-state transducer $T_1$ to have the twins property, for the composed transducer $T_{C1}$, for any path $\pi$ from the initial state 0,0 to one of the cycles $c_1$-$c_4$, the residue of that path, $<\pi>$, must be equal to the residue of that path concatenated with that cycle, $<\pi c>$, that is, $<n>=<\pi c>$. As outlined above, the residue $<\pi>$ of a path $\pi$ is equal to the inverse of the input string for that path concatenated with the output string for that path, that is, $<\pi>=i[n]^{-1}o[\pi]$.

Thus, for the first path $\pi_1$ and the first cycle $c_1$, the residue $<\pi_1>$ is $a^{-1}$. Similarly, the residue $<\pi_1 c_1>$ of the path $\pi_1$ concatenated with the cycle $c_1$ is $(aba)^{-1}(\epsilon ab)$. The string $(aba)^{-1}$ is equal to $a^{-1}b^{-1}b^{-1}$, while the string (Feb) is equal to ab. This occurs because the empty string or element ε is canceled out of the composed string. Thus, the string $(aba)^{-1}$ (εab) is equal to $a^{-1}b^{-1}a^{-1}$ab, which simplifies to $a^{-1}$.

In particular, when an element of the set of symbols is adjacent to its inverse element, such as shown above for the residue $<\pi_1 c_1>$, those two elements cancel out from the string. Thus, the residue $<\pi_1 c_1>=a^{-1}b^{-1}a^{-1}$ab reduces to $a^{-1}b^{-1}$b, and similarly further reduces to $a^{-1}$, which is also the residue $<\pi_1>$. Thus, the condition holds for the path $\pi_1$.

Next, it is necessary to check the residue of paths $\pi_2$ and $\pi_2 c_2$. In particular, the residue $<\pi_2>=a^{-1}a$, which reduces to the empty string. Similarly, the residue $<\pi_2 c_2>=(aba)^{-1}$ (aba).

Since the element aba is adjacent to its inverse, this immediately reduces to the empty string as well. Thus, the condition holds for the path $\pi_2$.

Next, the residues for the paths $\pi_3$ and $\pi_3 c_3$ must be checked. The residue $<\pi_3>$ is the empty string, as both its input and output labels are the empty string. The residue $<\pi_3 c_3>$ is $(\epsilon ab)^{-1}(\epsilon ab)$. For the same reasons as outlined above with respect to the path $\pi_2 c_2$, this immediately reduces to the empty string and the condition holds for path $\pi_3$.

Finally, it is necessary to check the residues for the paths $\pi_4$ and $\pi_4 c_4$. The residue $<\pi_4>$ is a, while the residue $<\pi_4 c_4>$ is $(\epsilon ab)^{-1}(aba)$. This reduces to $b^{-1}a^{-1}aba$. As outlined above, this reduces first to $b^{-1}ba$ and then to a. Thus, the residues for the paths $\pi_4$ and $\pi_4 c_4$ are equivalent. Because the condition holds for all paths $\pi_1$-$\pi_4$ of the composed finite-state transducer $T_C$, the functional finite-state transducer T has the twins property.

Figure 14:
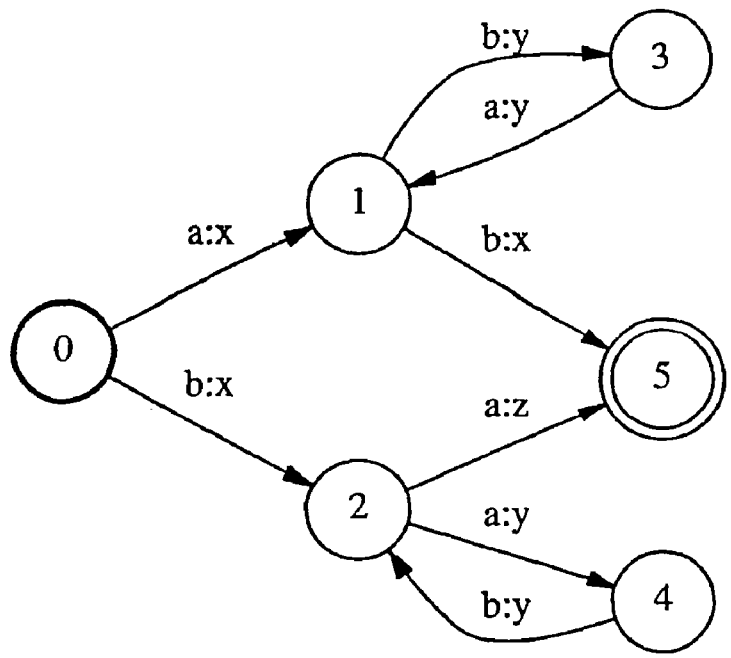
FIG. 14 illustrates one exemplary embodiment of a finite-state transducer obtained by inverting the finite-state transducer shown in FIG. 13.
Figure 15:
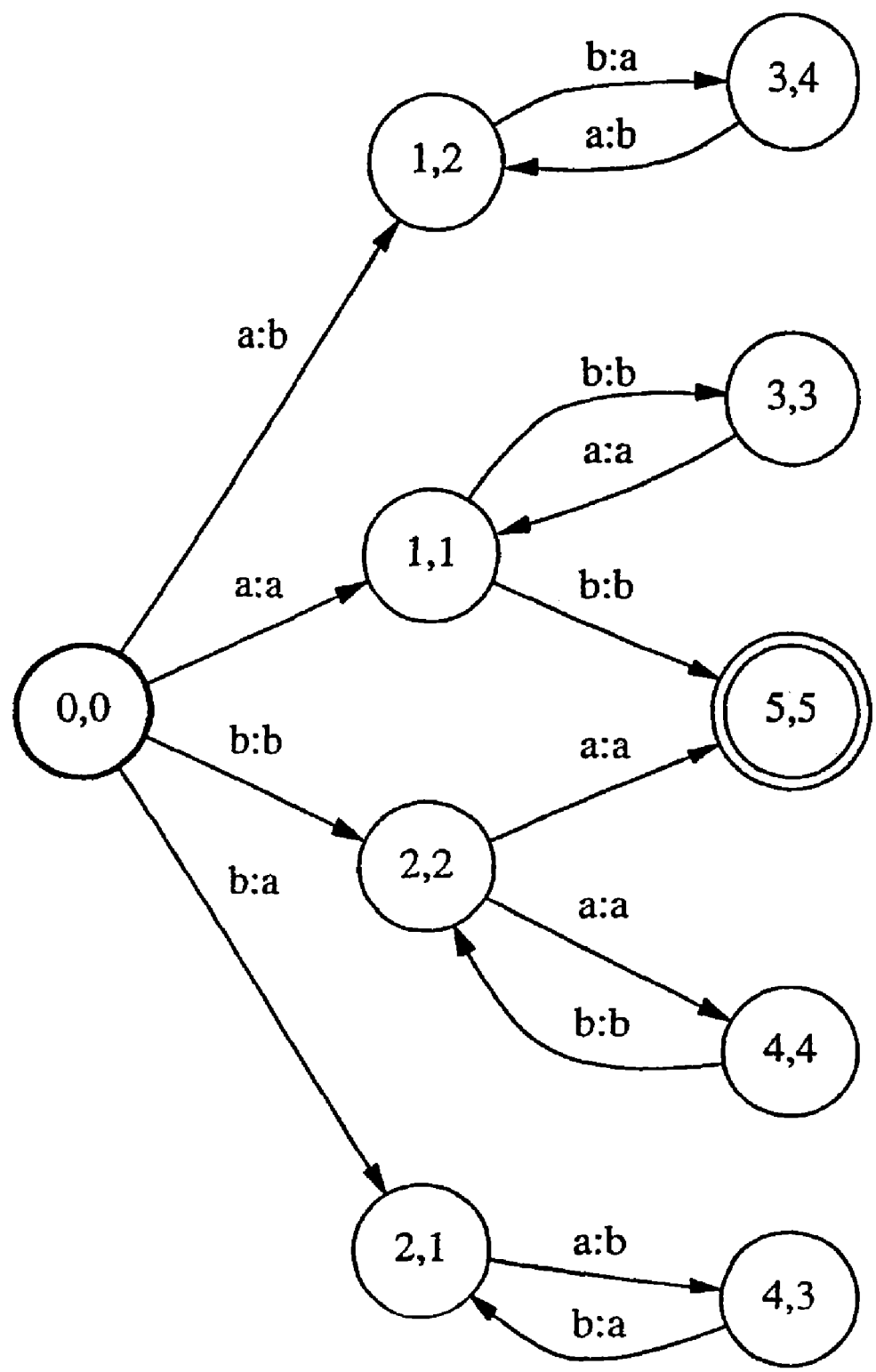
FIG. 15 illustrates one exemplary embodiment of a composed finite-state transducer obtained by composing the finite-state transducers shown in FIGS. 13 and 14.

FIGS. 13-16 illustrate a second functional finite-state transducer $T_2$ that does not have the twins property. FIG. 14 shows the inverse finite-state transducer $T_2^{-1}$ of the functional finite-state transducer $T_2$ shown in FIG. 13. FIG. 15 shows one exemplary embodiment of the composed transducer $T_{C2}$ that can be obtained by composing the finite-state transducers $T_2$ and $T_2^{-1}$. The condition outlined above can then be applied for each path that leads to a cycle in this composed transducer $T_{C2}$. In particular, like the composed transducer shown in FIG. 12, the composed transducer $T_{C2}$ shown in FIG. 15 has four cycles $c_1$-$c_4$, comprising, respectively, states 1,2 and 3,4, states 1,1 and 3,3, states 2,2 and 4,4 and states 2,1 and 4,3. Similarly, there are four paths $\pi_1$-$\pi_4$, comprising, respectively, paths 0,0-1,2, 0,0-1,1, 0,0-2,2, and 0,0-2,1, that respectively lead from the initial state 0,0 to the four cycles $c_1$-$c_4$.

Thus, taking the first path $\pi_1$ for analysis, it is necessary to check the residues of the paths $\pi_1$ and $\pi_1 c_1$. In particular, the residue $<\pi_1>$ is $a^{-1}b$, while the residue $<\pi_1 c_1>$ is $(aba)^{-1}(bab)$. This reduces to $a^{-1}b^{-1}a^{-1}bab$. In particular, because none of the elements of the residue of $<\pi_1 c_1>$ are adjacent to its inverse element, it is not possible to reduce this residue. Furthermore, because this residue contains both regular elements and inverse elements, it is not pure. As outlined above, a residue is pure only if all of its symbols are regular symbols or are all inverted symbols. Because the residue $<\pi_1 c_1>$ contains a mixture of regular and inverted elements, this residue is not pure.

Figure 16:
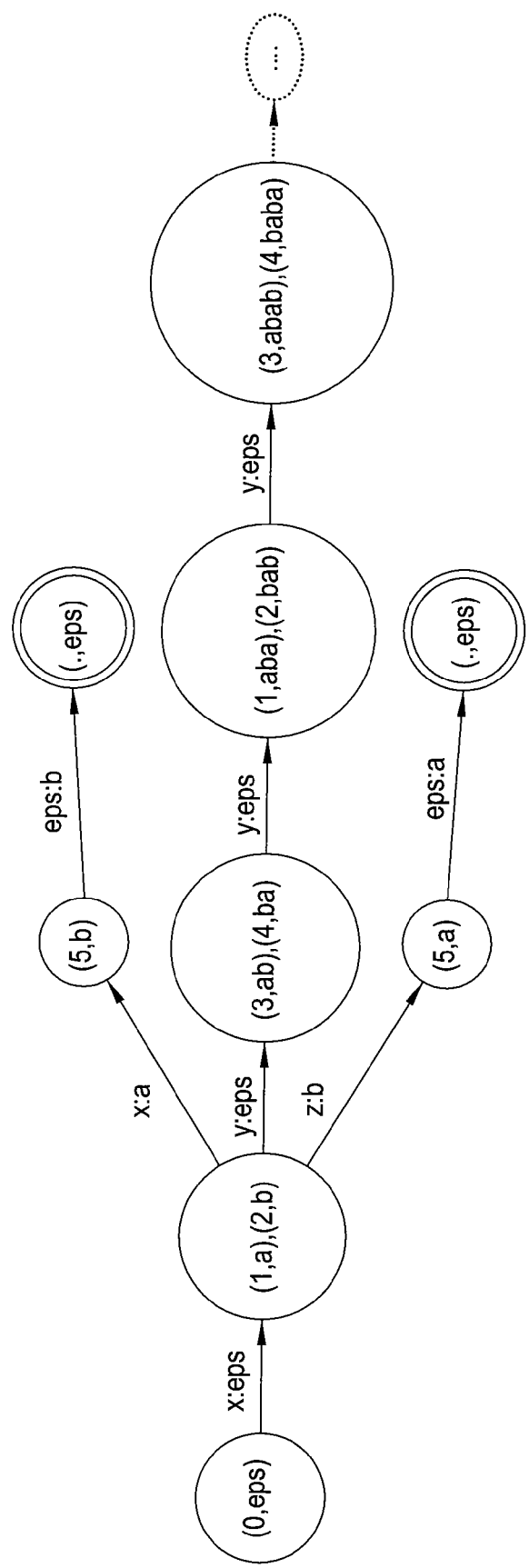
FIG. 16 illustrates one exemplary attempt to determinize the finite-state transducer shown in FIG. 13.

If the residue is not pure, the corresponding path is not pure. Because the path is not pure, the condition cannot hold. Because the condition does not hold for at least one of the paths $\pi_1$-$\pi_4$, namely path $\pi_1$, of the composed transducer $T_{C2}$, the second functional finite-state transducer $T_2$ does not have the twins property. Therefore, the second functional finite-state transducer $T_2$ is not determinizable. This is confirmed by attempting to determinize this second functional finite-state transducer $T_2$ using the method disclosed in the 679 patent. The results of this attempt to determinize the second functional finite-state transducer $T_2$ is shown in FIG. 16. As shown in FIG. 16, an infinite series of states is formed. Thus, the method outlined in the 679 patent will not halt when used in an attempt to determinize the second functional finite-state transducer $T_2$.

As outlined above, weighted finite-state automata must meet the first condition, that is, the cycle-identity condition, outlined above with respect to FIGS. 1-8. In contrast, unweighted finite-state transducers must meet the second condition and one of the third or fourth conditions, that is, the functional condition and one of the two residue conditions. It should be appreciated that weighted finite-state transducers must meet the conditions for both weighted finite-state automata and unweighted finite-state transducers. That is, weighted finite-state transducers must meet the first and second conditions as well as one of the third or fourth conditions.

FIGS. 17-28 illustrate three weighted finite-state transducers. In particular, FIGS. 17-20 illustrate a first weighted finite-state transducer $W_1$ that has the twins property. In contrast, FIGS. 21-24 illustrate a second weighted finite-state transducer $W_2$ that does not have the twins property, as it violates the first condition, i.e., the cycle-identity condition. FIGS. 25-28 illustrate a third weighted finite-state transducer $W_3$ that does not have the twins property, as it violates the third condition.

In particular, the third condition is used when there are only one or two distinct paths through the composed finite-state transducer to a cycle-accessible state and for the first two paths when there are more than two distinct paths. In contrast, the fourth condition can be used only when there are three or more distinct paths to the same cycle-accessible state and only for the third and subsequent paths. In this case, the third condition is used to test both of the first and second paths to that cycle-accessible state, while the fourth condition is used to test the third and subsequent paths to that same cycle-accessible state.

Figure 17:
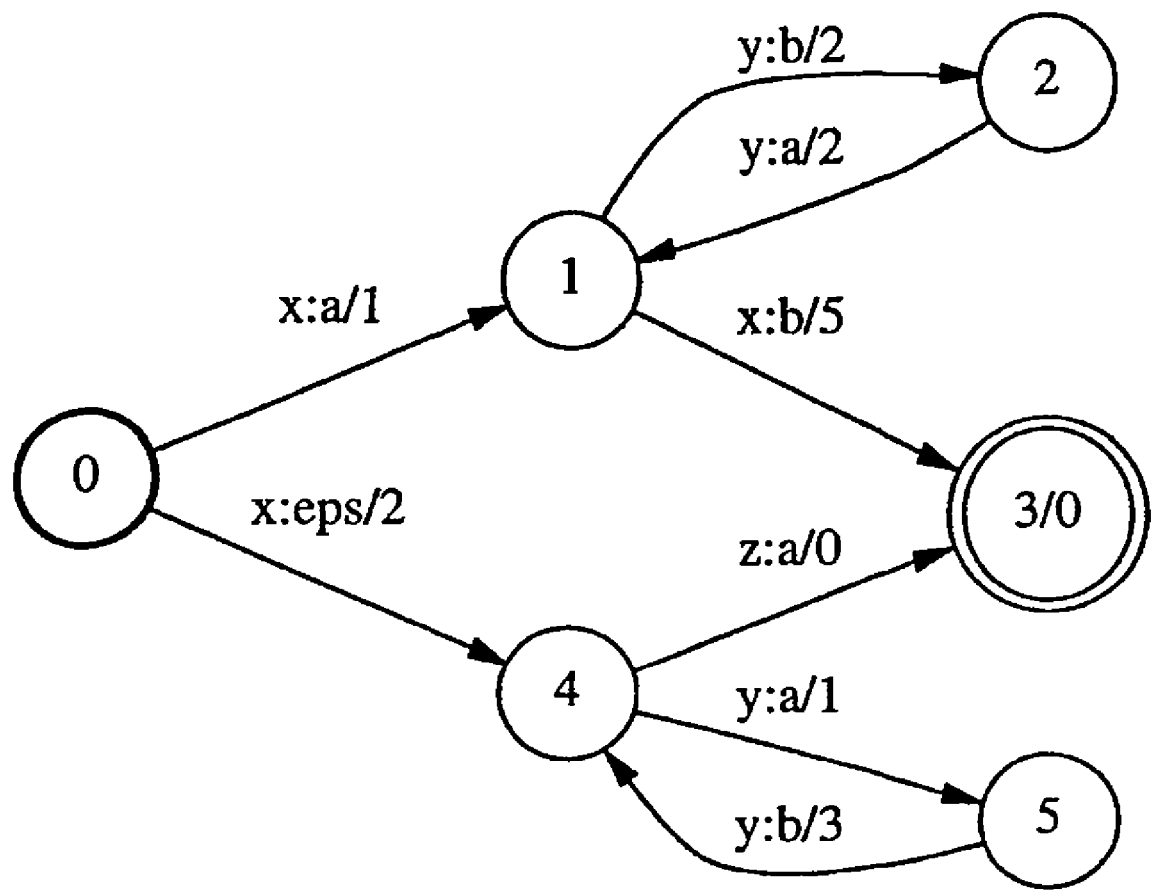
FIG. 17 illustrates one exemplary embodiment of a weighted finite-state transducer that has the twins property.
Figure 18:
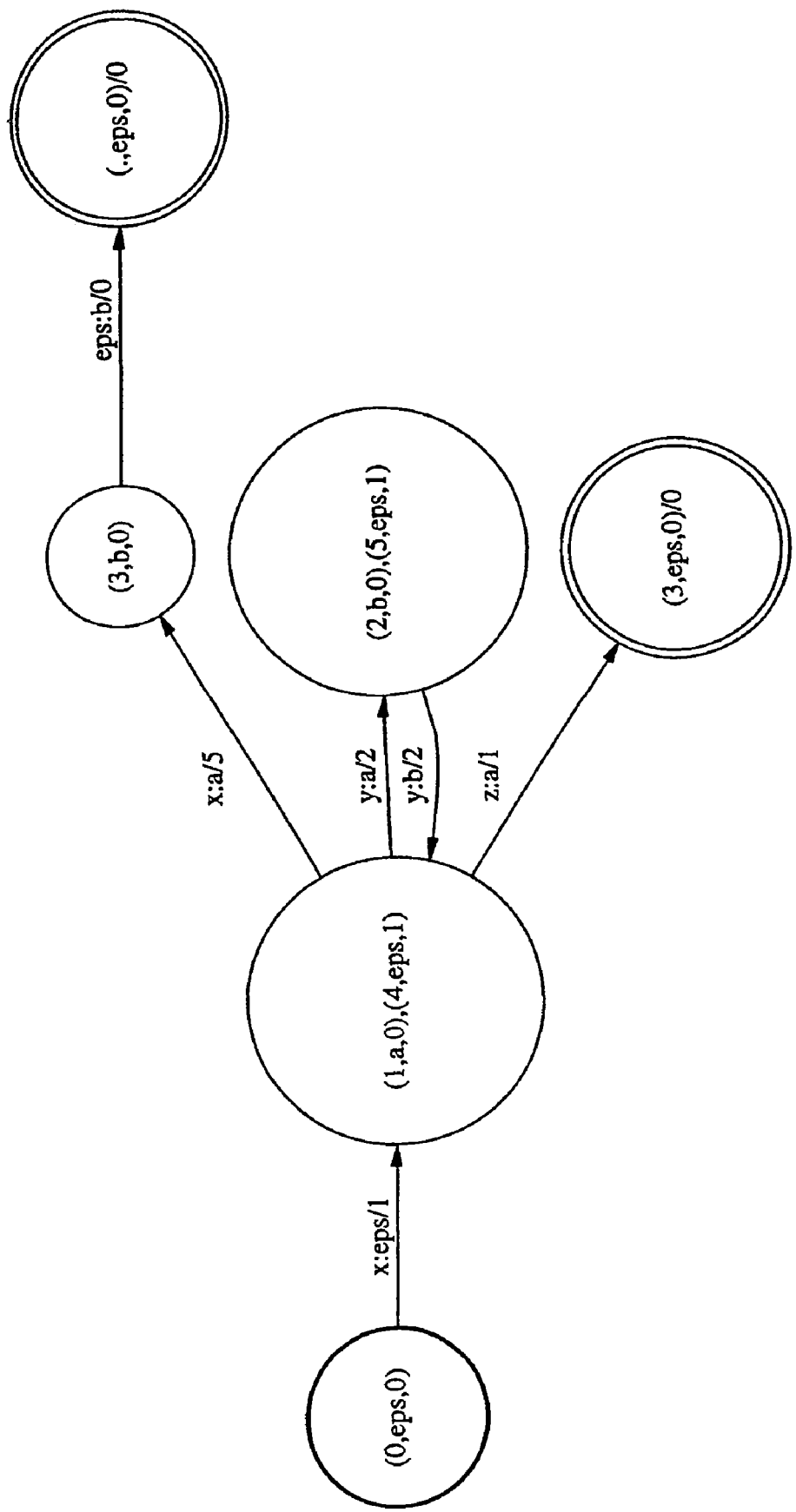
FIG. 18 illustrates the weighted finite-state transducer of FIG. 17 after determinization.

In particular, FIG. 17 shows the first weighted finite-state transducer $W_1$, while FIG. 18 shows an equivalent determinized weighted finite-state transducer $W_1'$ obtained by using the method outlined in the 679 patent to determinize the first weighted finite-state transducer $W_1$. As shown in FIG. 18, the first weighted finite-state transducer $W_1$ can be determinized and thus has the twins property.

Figure 19:
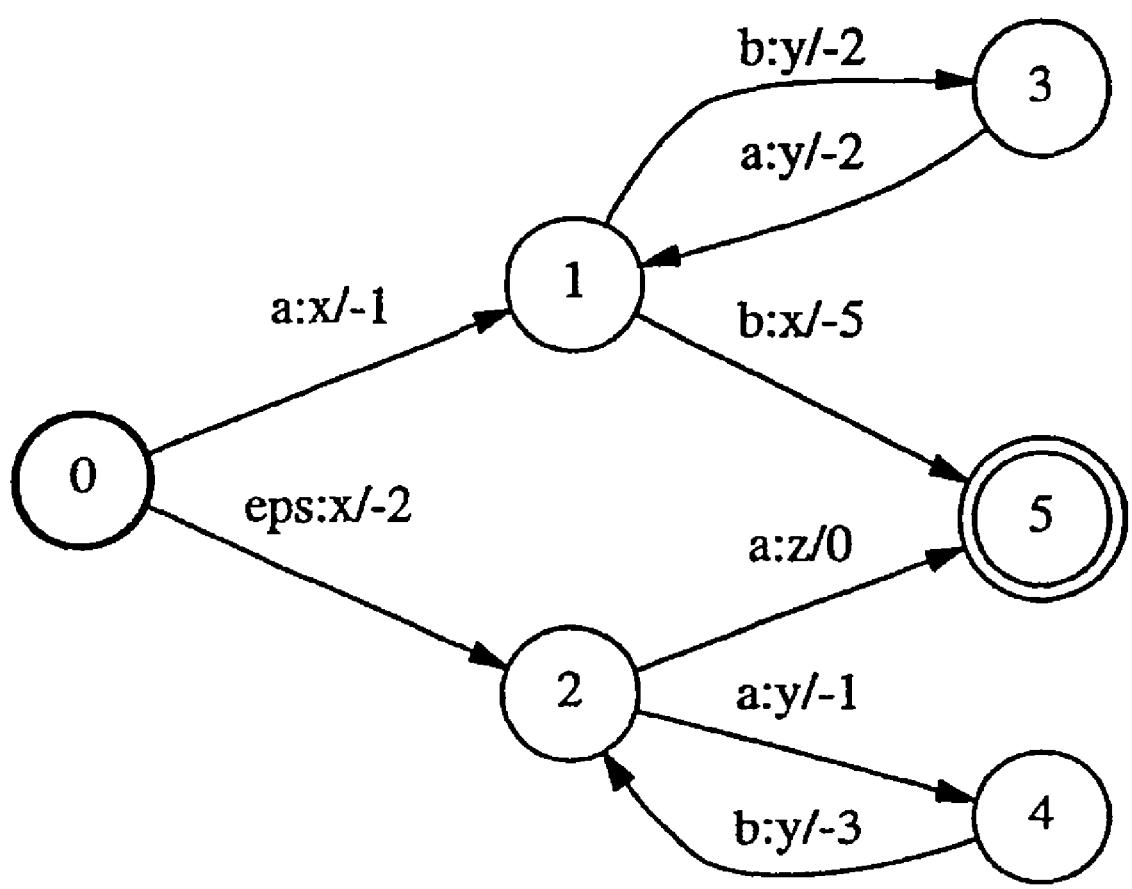
FIG. 19 illustrates one exemplary embodiment of an inverse weighted finite-state transducer obtained by inverting the weighted finite-state transducer shown in FIG. 17.
Figure 20:
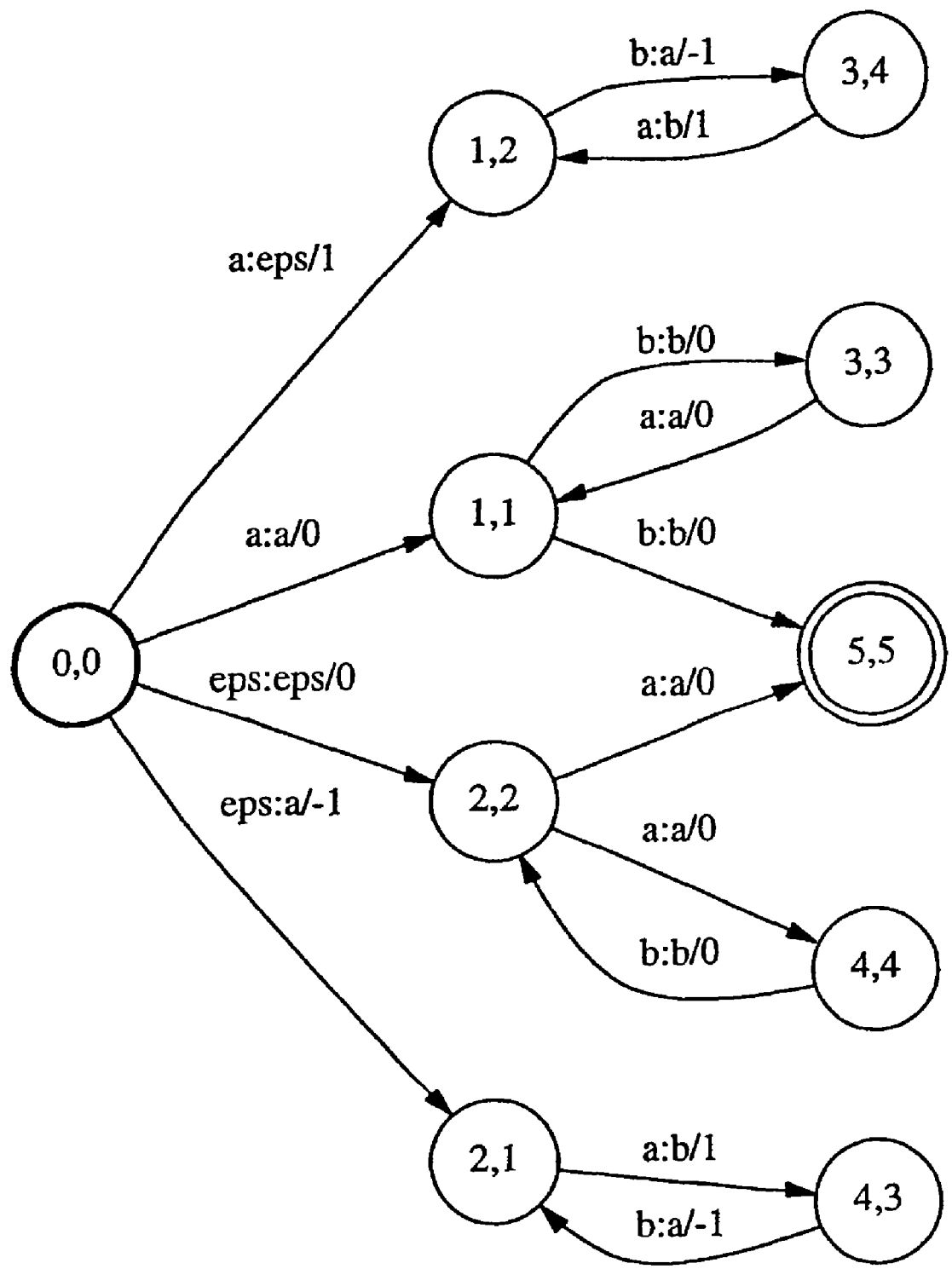
FIG. 20 illustrates one exemplary embodiment of a composed weighted finite-state transducer obtained by composing the weighted finite-state transducers shown in FIGS. 17 and 19.

FIG. 19 shows one exemplary embodiment of the inverse weighted finite-state transducer $W_1^{-1}$ that is the inverse of the first weighted finite-state transducer $W_1$. FIG. 20 shows the first composed transducer $W_{C1}$ obtained by composing the weighted finite-state transducers $W_1$ and $W_1^{-1}$. A cursory inspection of the first composed transducer $W_{C1}$ verifies that the cycle-identity condition holds for each of the four cycles present in the first composed transducer $W_{C1}$. Likewise, since the first composed transducer $W_{C1}$ has the same input and output labels on each of the various edges as in the composed transducer shown in FIG. 12, each of the cycle-accessible paths in this first composed weighted transducer $W_{C1}$ also meets the third condition. Without explanation, the first weighted finite-state transducer $W_1$ is functional. Thus, since all of the first through third conditions are met, the first weighted finite-state transducer $W_1$ has the twins property and is therefore determinizable, as demonstrated in FIG. 18.

Figure 21:
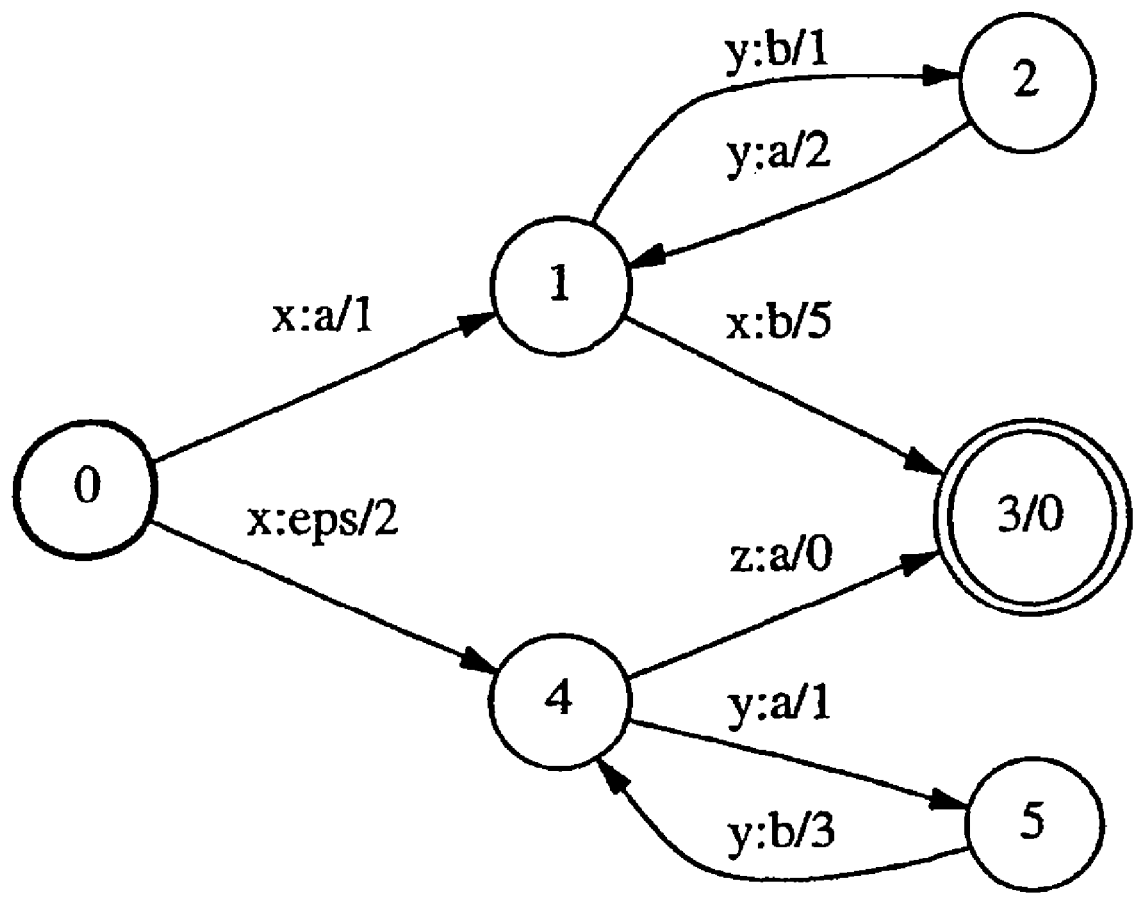
FIG. 21 illustrates a first exemplary embodiment of a weighted finite-state transducer that does not have the twins property.
Figure 22:
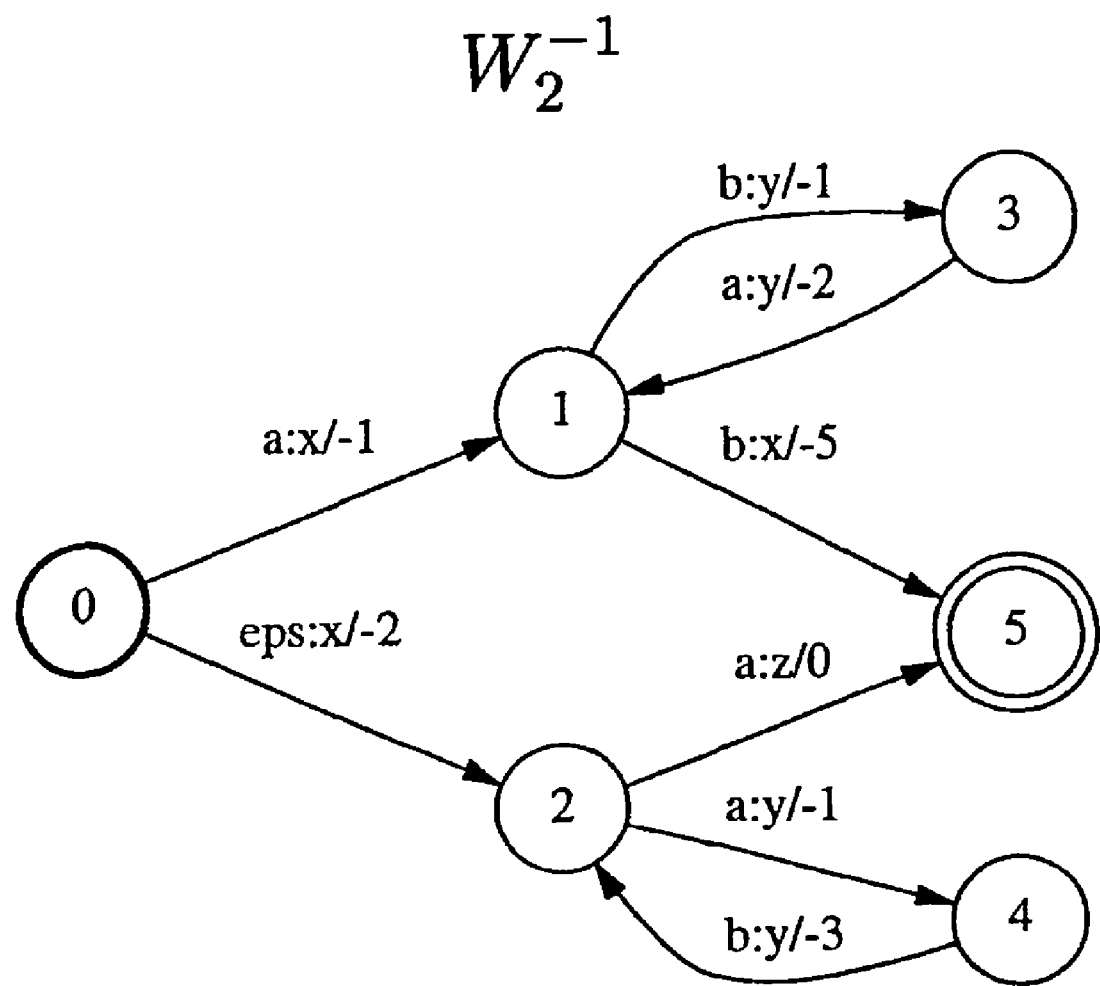
FIG. 22 illustrates one exemplary embodiment of an inverse weighted finite-state transducer obtained by inverting the weighted finite-state transducer shown in FIG. 21.
Figure 23:
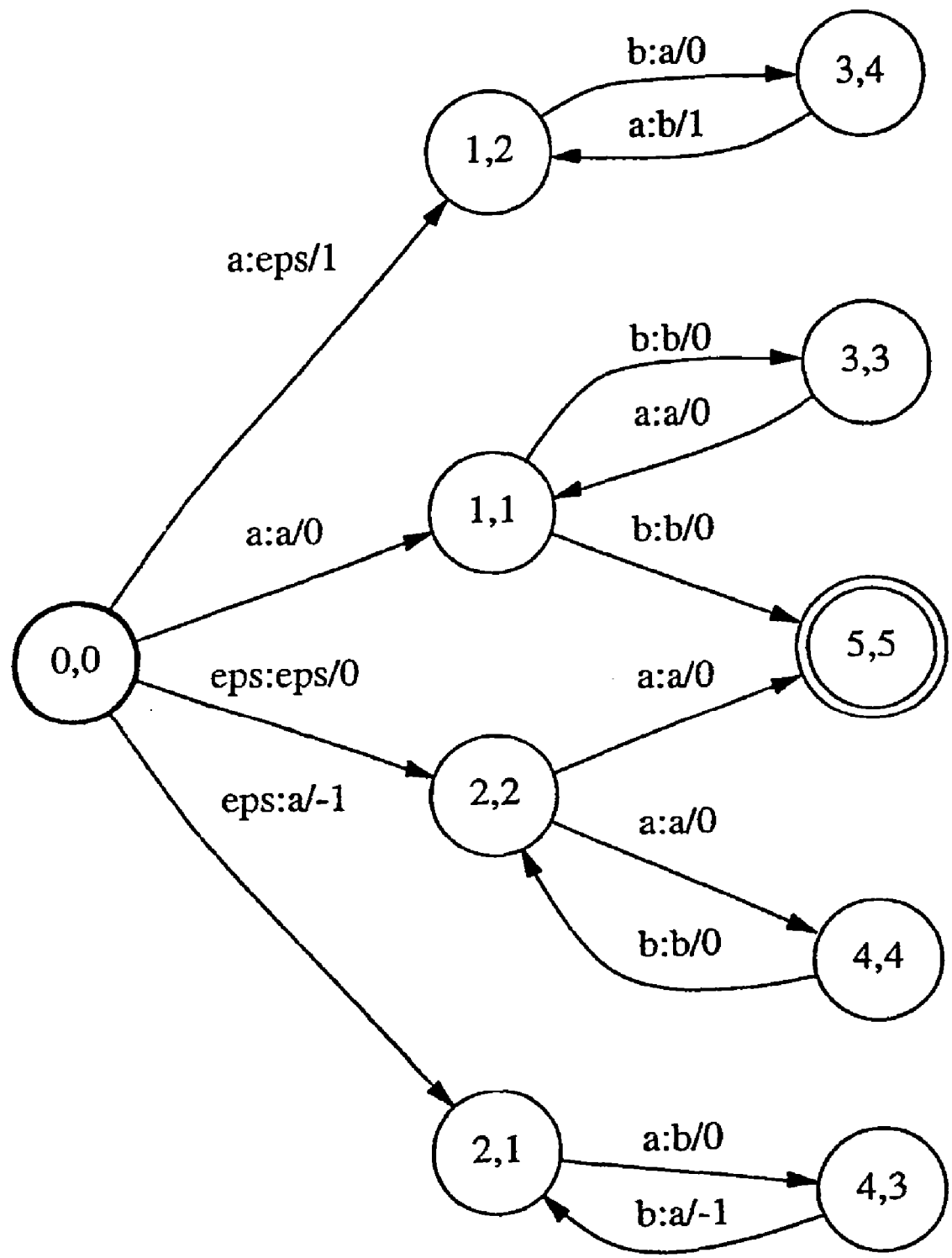
FIG. 23 illustrates one exemplary embodiment of a composed weighted finite-state transducer obtained by composing the weighted finite-state transducers shown in FIGS. 21 and 22.

FIG. 21 shows the second weighted finite-state transducer $W_2$. FIG. 22 shows one exemplary embodiment of the second inverse weighted finite-state transducer $W_2^{-1}$ obtained by taking the inverse of the second weighted finite-state transducer $W_2$. FIG. 23 illustrates one exemplary embodiment of the second composed transducer $W_{C2}$ obtained by composing the weighted finite-state transducer shown in FIGS. 21 and 22. In particular, by inspection, it is obvious that at least the first cycle $c_1$, comprising the states 1,2 and 3,4, and the fourth cycle $c_4$, comprising the states 2,1 and 4,3, do not meet the first, i.e., the cycle-identity, condition. Thus, the second weighted finite-state transducer $W_2$ does not have the twins property and thus is not determinizable.

Figure 24:
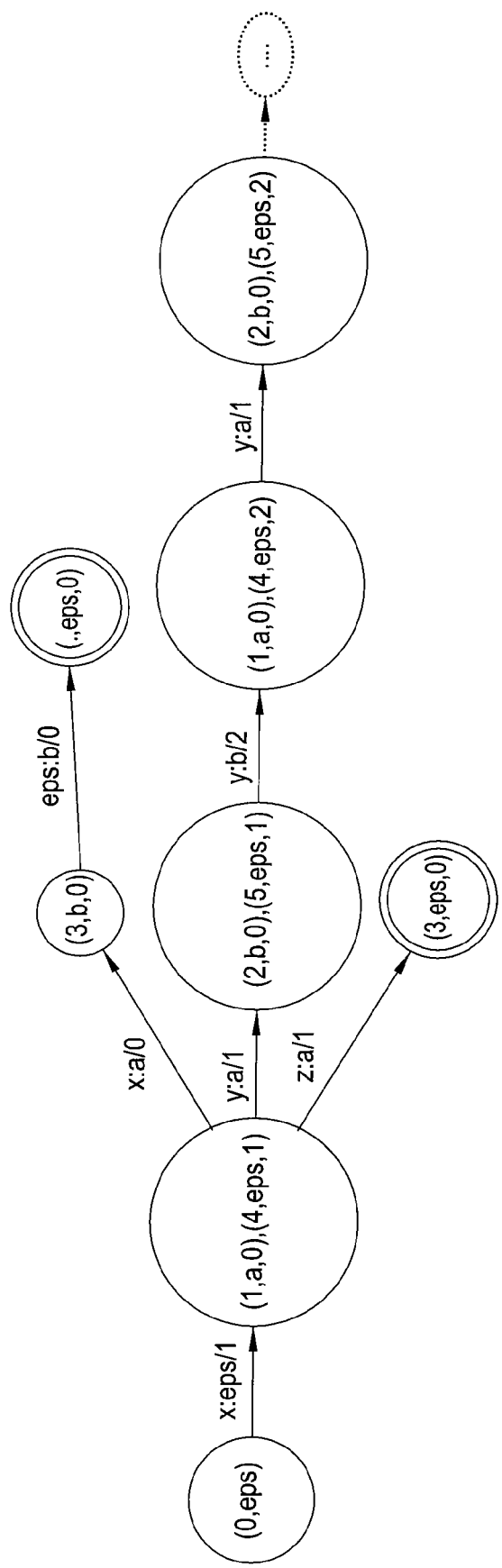
FIG. 24 illustrates one exemplary attempt at determinizing the weighted finite-state transducer shown in FIG. 21.

As shown in FIG. 24, an attempt to determinize the second weighted finite-state transducer $W_2$ using the method outlined in the 679 patent does not halt, as an infinite series of states is created. Because the second weighted finite-state transducer $W_2$ does not meet the cycle-identity condition, it is not necessary to test whether the second weighted finite-state transducer $W_2$ is functional, i.e., meets the second condition, or meets the residue conditions.

Figure 25:
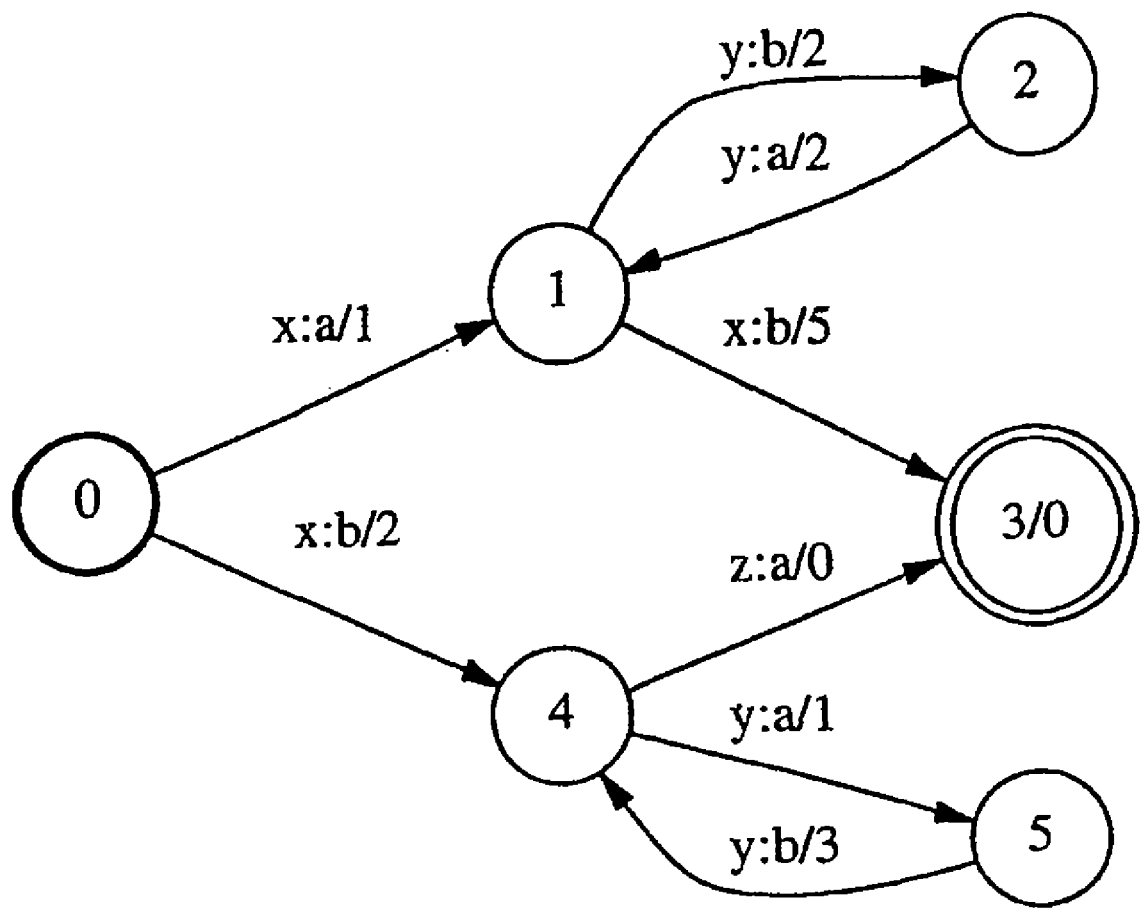
FIG. 25 illustrates a second exemplary embodiment of a weighted finite-state transducer that does not have the twins property.
Figure 26:
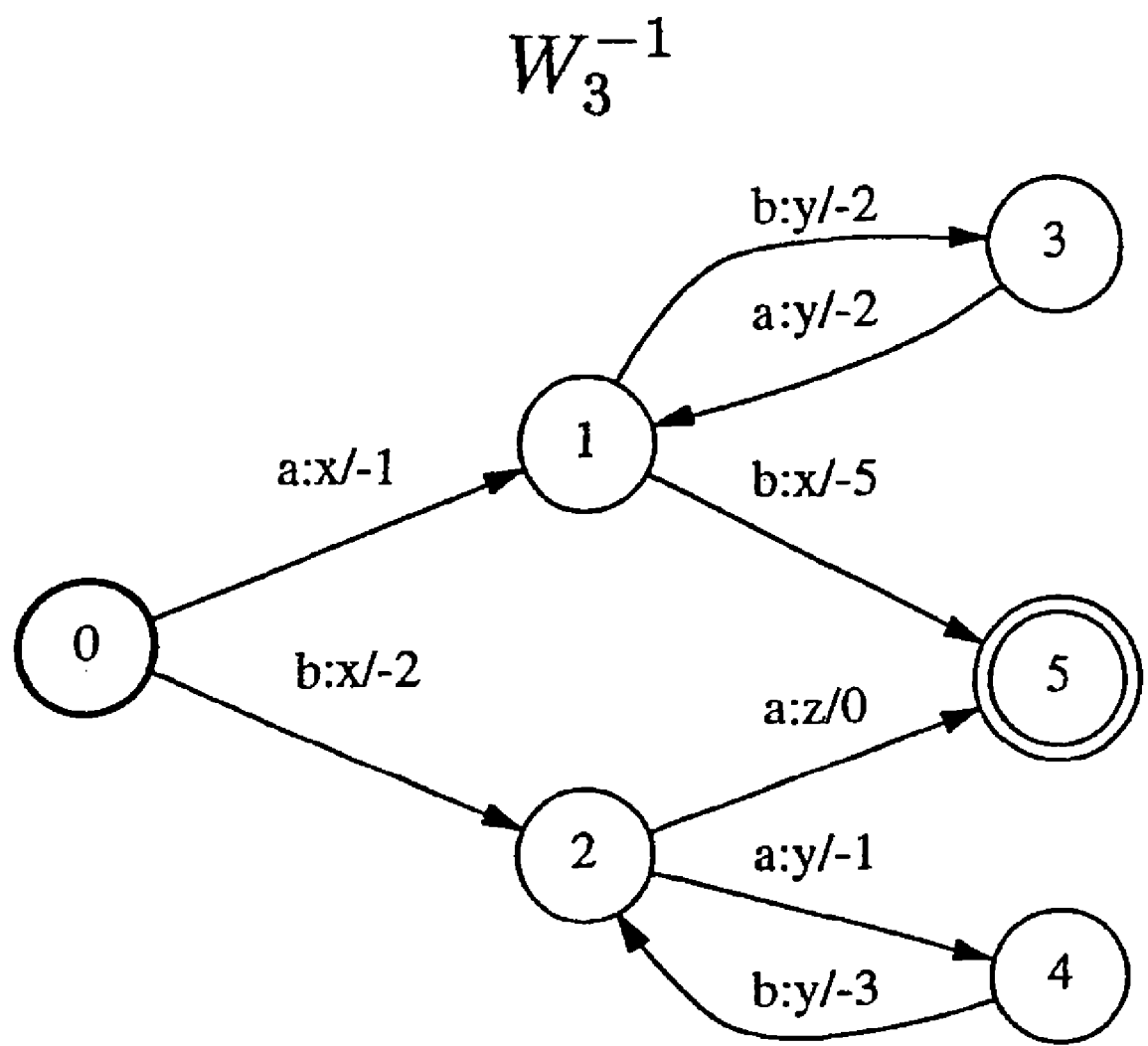
FIG. 26 illustrates one exemplary embodiment of an inverse finite-state transducer obtained by inverting the weighted finite-state transducer shown in FIG. 25.
Figure 27:
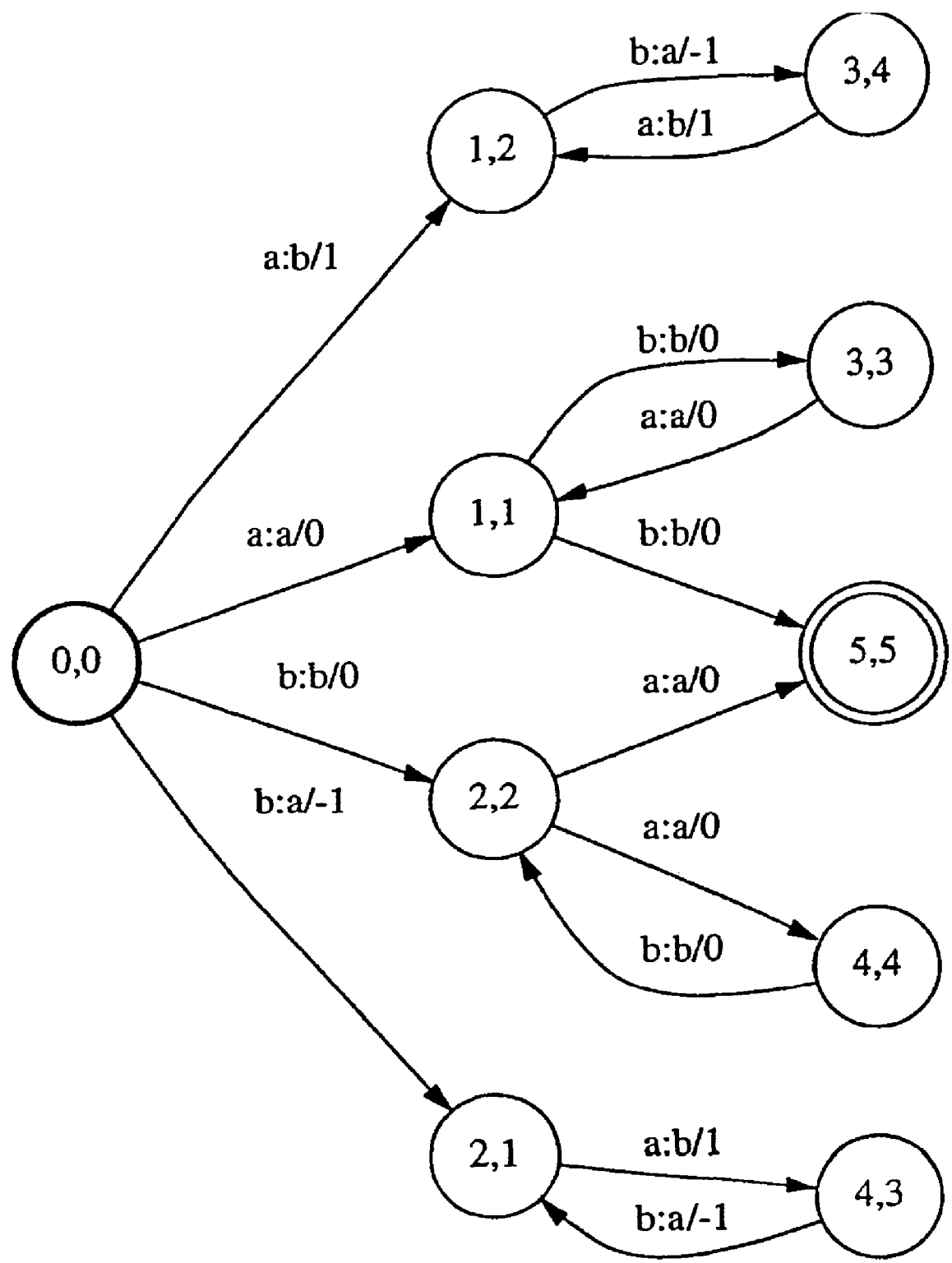
FIG. 27 illustrates one exemplary embodiment of a composed weighted finite-state transducer obtained by composing the weighted finite-state transducers shown in FIGS. 25 and 26.

FIG. 25 illustrates a third weighted finite-state transducer $W_3$. FIG. 26 shows the inverse third weighted finite-state transducer $W_3^{-1}$ that is obtained by taking the inverse of the third weighted finite-state transducer $W_3$. FIG. 27 shows a third composed transducer $W_{C3}$ obtained by composing the weighted finite-state transducers $W_3$ and $W_3^{-1}$ shown in FIGS. 25 and 26.

As shown in FIG. 27, the third composed transducer WC3 has four cycles $c_1$-$c_2$. However, like the first composed transducer $W_{C1}$, each of these cycles meets the cycle-identity condition. This can easily be verified by inspecting the third composed transducer $W_{C3}$. Similarly, without explanation, the third weighted finite-state transducer $W_{C3}$ is functional, and therefore meets the second, i.e., functional, condition. However, the third composed weighted transducer $W_{C3}$ does not meet the third residue condition.

In particular, this third weighted composed transducer $W_{C3}$ has the same labels as the second unweighted transducer $T_2$. Thus, based on the same analysis set forth above, the residue of the path 0,0-1,2-3,4-1,2 is not pure. Accordingly, because the residue of this path is not pure, the path itself is not pure. Because this path is not pure, it cannot meet the third condition for the reason set forth above with respect to FIG. 15. Thus, the third weighted finite-state transducer $W_3$ does not have the twins property and thus is not determinizable.

Figure 28:
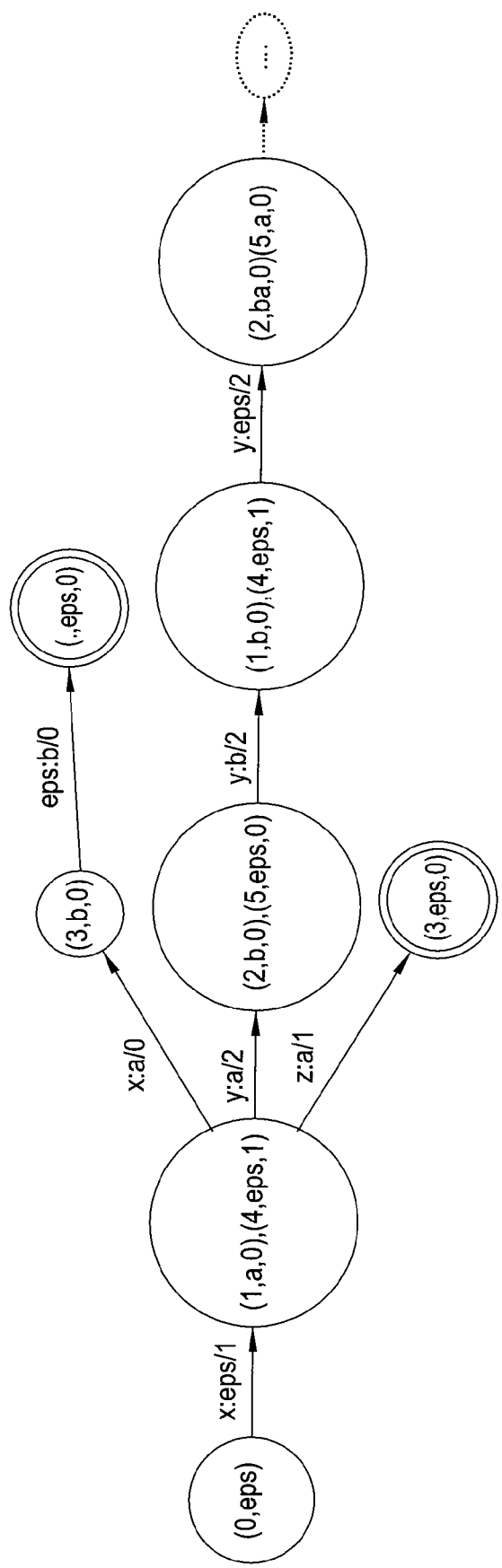
FIG. 28 illustrates one exemplary attempt at determinizing the weighted finite-state transducer shown in FIG. 25.

FIG. 28 illustrates one exemplary embodiment of an attempt to determinize the third weighted finite-state transducer $W_3$ using the method outlined in the 679 patent. As shown in FIG. 28, when this method is applied to the third weighted finite-state transducer $W_3$, the method does not halt, due to the infinite string of states that is generated, as shown in FIG. 28. Thus, because the method of the 679 patent does not halt, the third weighted finite-state transducer $W_3$ is not determinizable, as correctly determined as outlined above.

It should be appreciated that, for the finite-state transducers shown in FIGS. 9-28, there is no more than one path to any particular cycle or cycle-accessible state. Thus, the third condition is used directly, as there are no situations in which the fourth condition could be used to simplify the analysis required to determine whether the third condition holds. FIGS. 29-32 illustrate a pair of unweighted finite-state transducers $T_3$ and $T_4$ that illustrate how the fourth condition and a fifth condition can be used to simplify testing for the third condition when there are more than a single path to the same cycle-accessible state in the obtained composed transducers $T_{C3}$-$T_{C6}$. The fifth condition is $<\pi_1>^{-1}<\pi_2>\equiv[c]$, that is, that the residue of the residue of path $\pi_1$ and the residue of path $\pi_2$ commutes with the output string of the cycle c.

Figure 29:
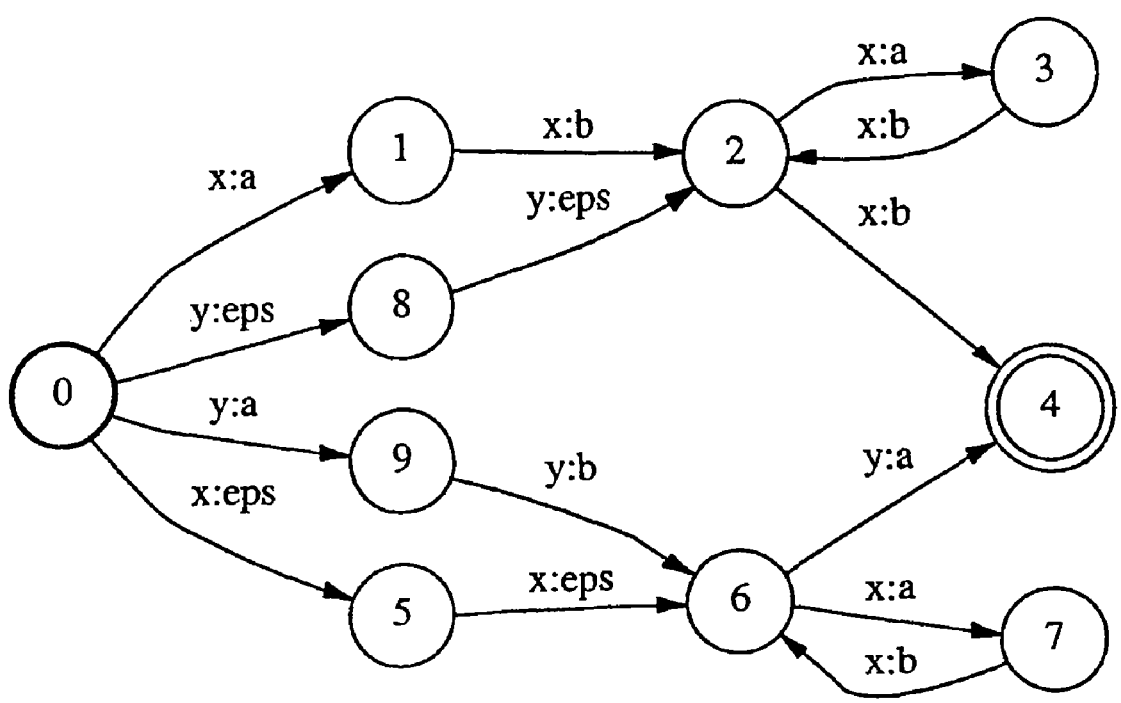
FIG. 29 illustrates a second finite-state transducer that has the twins property.
Figure 30:
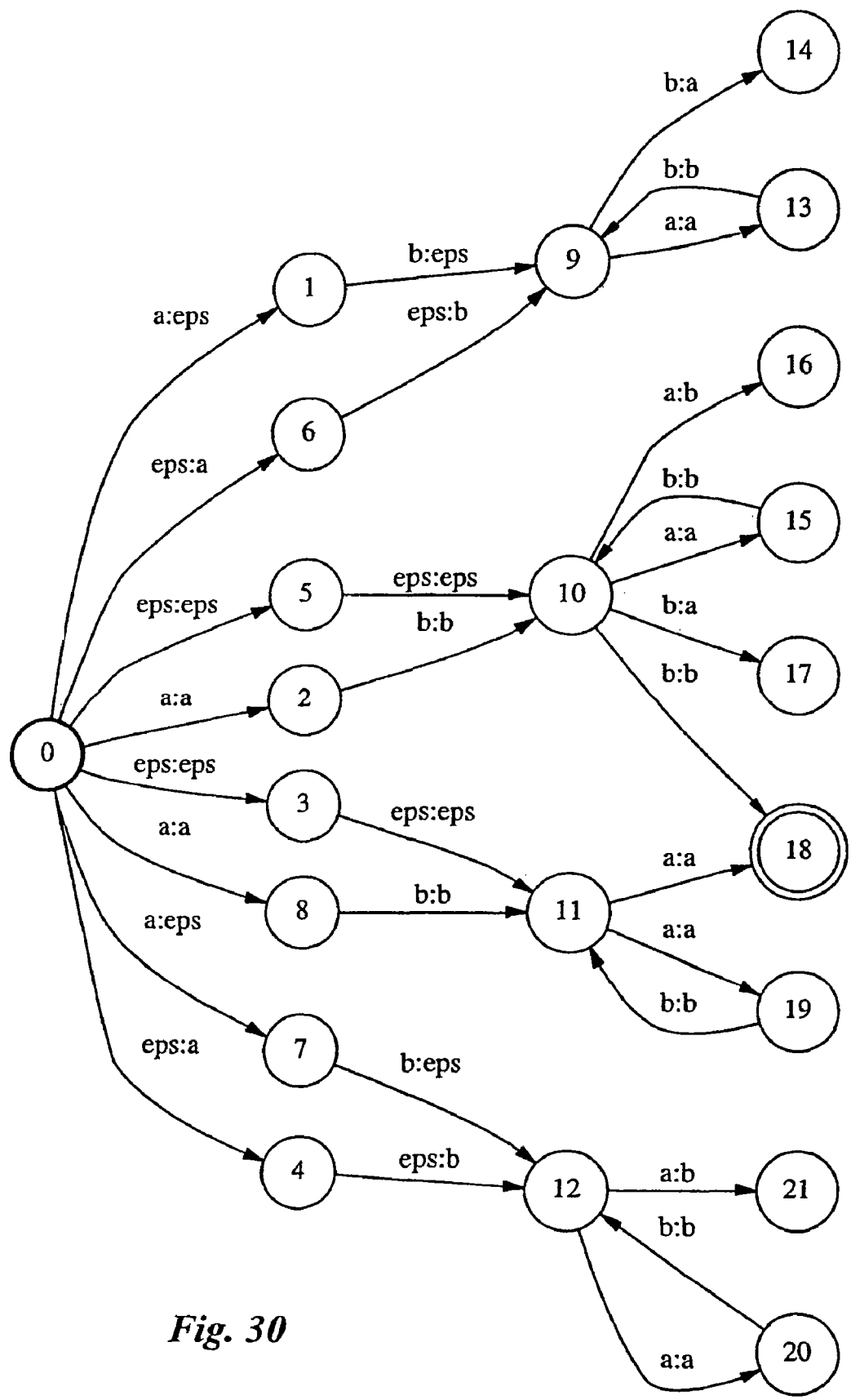
FIG. 30 illustrates one exemplary embodiment of composing the finite-state transducer shown in FIG. 17 with its inverse.

In particular, as shown in FIG. 29, a third unweighted finite-state transducer $T_3$ has the twins property. FIG. 30 shows the third composed transducer $T_{C3}$ that can be obtained by composing the third unweighted finite-state transducer $T_3$ with its inverse unweighted finite-state transducer $T_3^{-1}$. In particular, in the third composed transducer $T_{C3}$, there are four cycles $c_1$-$c_4$. The first cycle $c_1$ comprises states 9 and 13, while the second cycle $c_2$ comprises states 10 and 15, the third cycle $c_3$ comprises states 11 and 19, and the fourth cycle $c_4$ comprises states 12 and 20.

As shown in FIG. 30, each of the states 9, 10, 11 and 12 is a cycle-accessible state and has at least two paths from the initial state 0 to that state. In particular, there are two paths $\pi_1$ and $\pi_2$ comprising states 0-1-9 and 0-1-6, respectively, to the cycle $c_1$. Thus, for the first path $\pi_1$, the third condition can be used to test this path. In particular, the residue $<\pi_1>$ of the first path $\pi_1$ is $(ab)^{-1}(\epsilon\epsilon)$. Simplified, the residue $<\pi_1>$ is $b^{-1}a^{-1}$.

Similarly, the residue $<\pi_1 c_1>$ is $(abab)^{-1}(\epsilon\epsilon ab)$. This simplifies to $b^{-1}a^{-1}b^{-1}a^{-1}ab$, which further simplifies to $b^{-1}a^{-1}b^{-1}b$, which further simplifies to $b^{-1}a^{-1}$. Thus, because $b^{-1}a^{-1}$ is equal to $b^{-1}a^{-1}$, the residues $<\pi_1>$ and $<\pi_1 c_1>$ are equivalent. Thus, the third condition holds for this path.

However, for the second path $\pi_2$ to the cycle-accessible state 9, it would not be necessary to perform all of this analysis. In particular, as outlined above, $\pi_1$ and $\pi_2$ are two paths leading from the initial state to the same non-empty cycle c, that is the cycle $c_1$. Additionally, the immediately preceding analysis has established that the residues $<\pi_1>$ and $<\pi_{C1}>$ are equivalent. Then, without having to directly determine whether the residues $<\pi_2>$ and $<\pi_2 c_1>$ are equivalent, this can be determined by determining whether the residue $<\pi_1>^{-1}<\pi_2>$ commutes with $o[c_1]$, that is, with the output string of the cycle $c_1$.

As the residue $<\pi_1>$ has already been determined during the analysis of the first path $\pi_1$, it is only necessary to determine the residue $<\pi_2>$, the residue of residues $<\pi_1>^{-1}<\pi_2>$ and the output string $o[c_1]$ for the cycle $c_1$. In particular, the residue $<\pi_2>$ for the second path is $(\epsilon\epsilon)^{-1}(ab)$, which simplifies to ab. Thus, because the residue $<\pi_1>$ is $b^{-1}a^{-1}$, the residue of residues $<\pi_1>^{-1}<\pi_2>$ is $(b^{-1}a^{-1})^{-1}ab$, which simplifies to (ab)ab or abab. Finally, the output string $o[c_1]$ of the first cycle $c_1$ is ab. Since the string abab commutes with the string ab, the fifth condition holds for the second path $\pi_2$, and thus the third condition holds for the second string $\pi_2$. Thus, it was not necessary to determine the residue $<\pi_2 c_1>$ for the second path $\pi_2$ and the first cycle $c_1$.

While doing so in the example shown in FIG. 30 is trivial, in practice, cycles can extend over a very large number of states. As such, determining the residue for such cycles significantly raises the time complexity of the method for determining whether a particular finite-state transducer has the twins property. In contrast, by only needing to determine the residue of the second path $\pi_2$ and the output string $o[c_1]$ of the cycle c, both of which can be done in linear time, the time complexity of the method for checking for the twins property remains relatively small.

Figure 31:
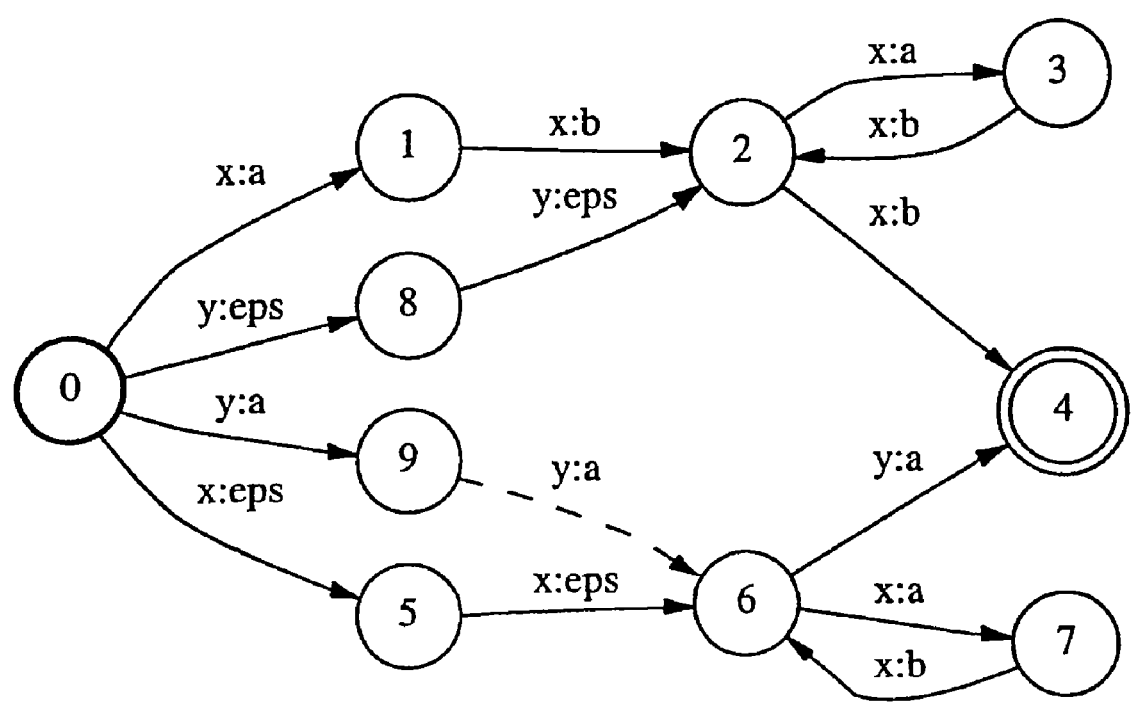
FIG. 31 illustrates a further exemplary embodiment of a finite-state transducer that does not have the twins property.

FIG. 31 shows a fourth unweighted finite-state transducer $T_4$ that does not have the twins property. In particular, as shown in FIG. 31, the path from state 9 to state 6 in the fourth finite-state transducer $T_4$ has a different label than the corresponding edge in the third finite-state transducer $T_3$ shown in FIG. 29.

Figure 32:
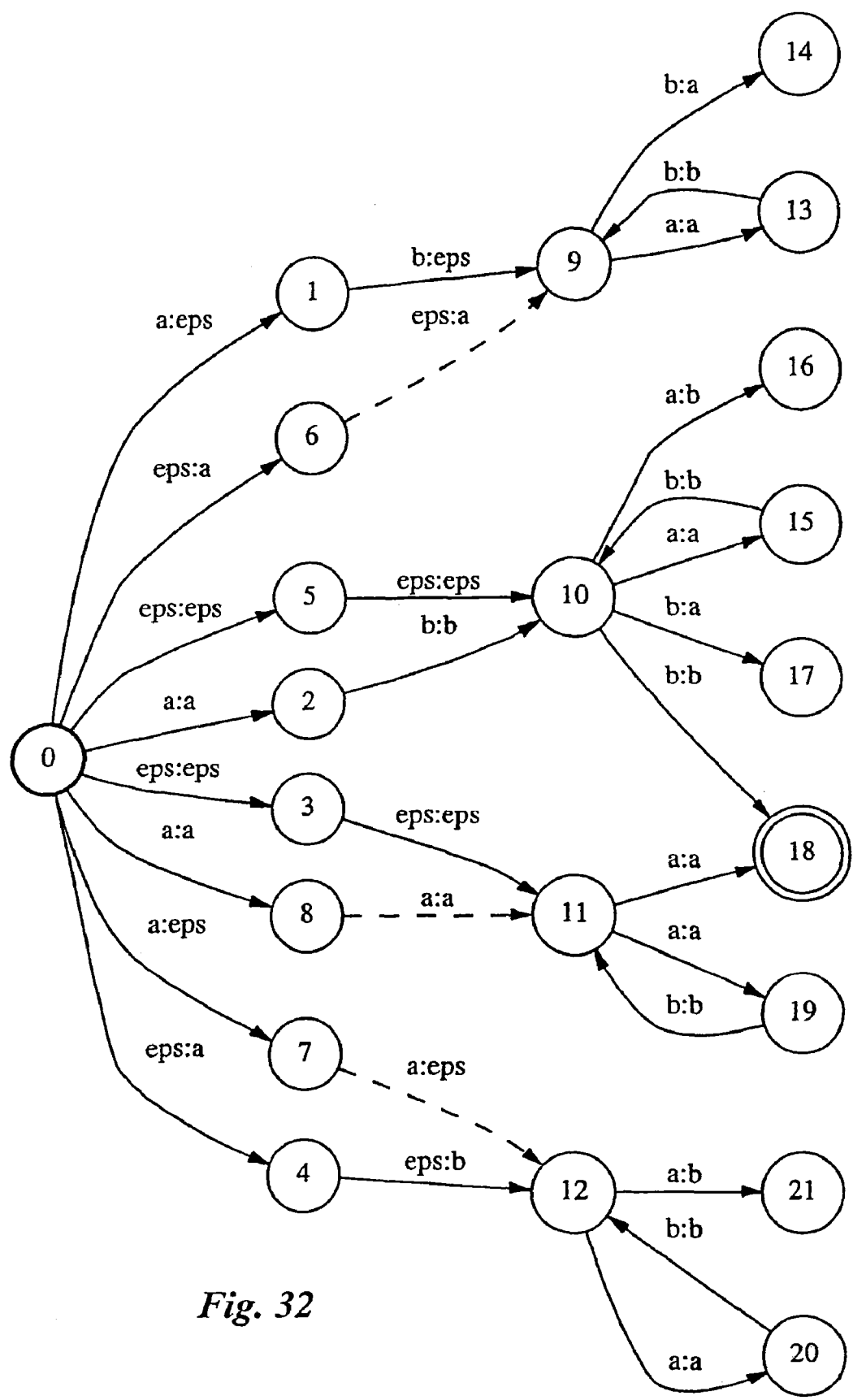
FIG. 32 illustrates one exemplary embodiment of composing the finite-state transducer shown in FIG. 31 with the inverse of the finite-state transducer shown in FIG. 31 illustrating that the second condition is not met.

FIG. 32 shows the fourth composed transducer $T_{C4}$ obtained by composing the fourth unweighted finite-state transducer $T_4$ with its inverse unweighted finite-state transducer $T_4^{-1}$. In particular, as shown in FIG. 32, in the fourth composed transducer $T_{C4}$, the paths extending between states 6 and 9, between states 8 and 11, and between states 7 and 12 are different than the corresponding states in the third composed finite-state transducer $T_{C3}$ shown in FIG. 30. It should be appreciated that all of the other paths are the same in these two composed transducers.

Accordingly, as indicated above, the first path $\pi_1$, comprising states 0-1-9, to the first cycle c1, comprising states 9 and 13, meets the third condition. This also indicates that the fifth condition can be used to test the second path $\pi_2$, comprising states 0-6-9. In particular, the residue $<\pi_2>$ of this path $\pi_2$ is $(\epsilon\epsilon)^{-1}aa$, which simplifies to the string aa. Given the values for the residue $<\pi_1>$ of the first path $\pi_1$ and the output string $o[c_1]$ for the cycle $c_1$ outlined above, the residue of residues $<\pi_1>^{-1}<\pi_2>$ is $(b^{-1}a^{-1})^{-1}aa$, which simplifies to abaa, while the output string $o[c_1]$ is ab. In this case, the strings abaa and ab do not commute. Thus, path $\pi_2$ violates the fourth condition. As a result, the second path $\pi_2$ must also violate the third condition. Because the third condition is violated in the fourth composed transducer $T_{C4}$, the fourth unweighted finite-state transducer $T_4$ does not have the twins property and thus is not determinizable.

Figure 33:
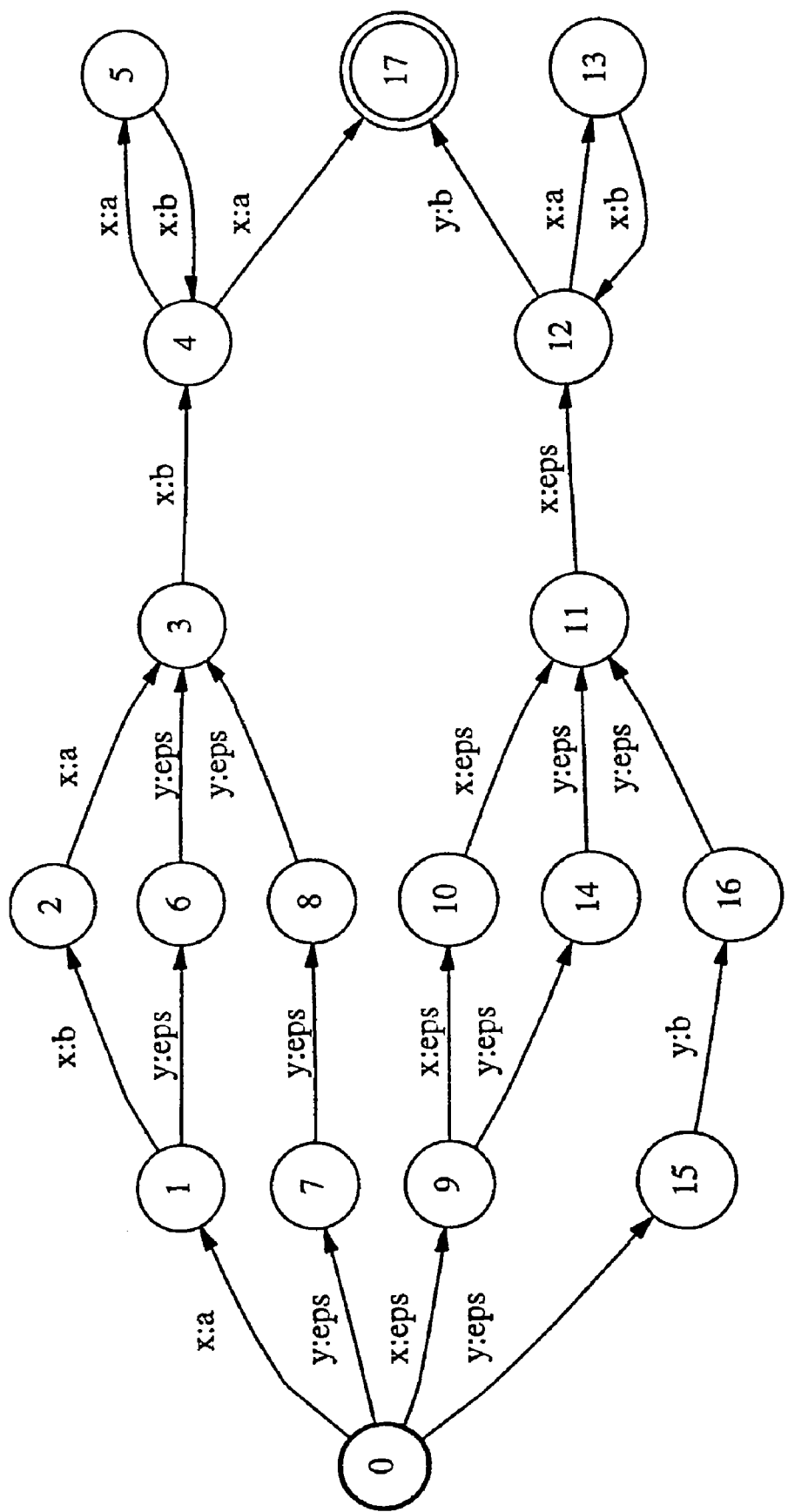
FIG. 33 illustrates a third exemplary embodiment of a finite-state transducer that has the twins property.
Figure 34:
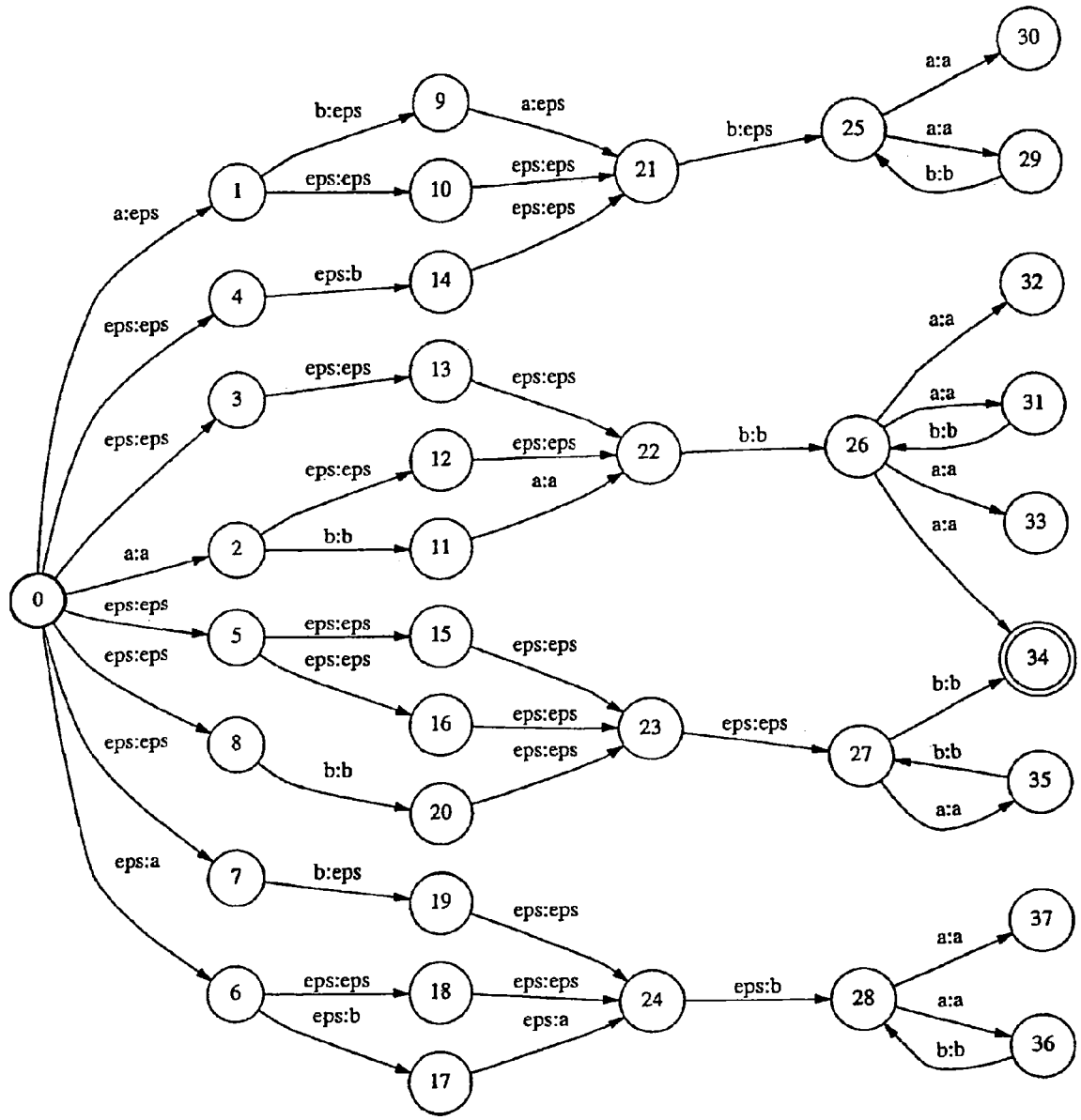
FIG. 34 illustrates one exemplary embodiment of a composed finite-state transducer that is obtained by composing the finite-state transducer shown in FIG. 33 and the inverse of the finite-state transducer shown in FIG. 33.

FIGS. 33-36 show two more unweighted finite-state transducers $T_5$ and $T_6$ that illustrate unweighted finite-state transducers that meet, and do not meet, the conditions for the fourth condition. In particular, FIG. 33 shows the fifth unweighted finite-state transducer $T_5$. FIG. 34 shows a fifth composed transducer $T_{C5}$ that is obtained by composing the fifth unweighted finite-state transducer $T_5$ shown in FIG. 33 with its inverse unweighted finite-state transducer $T_5^{-1}$.

As shown in FIG. 34, there are four cycles $c_1$-$c_4$, comprising, respectively, states 25 and 29, states 26 and 31, states 27 and 35, and states 28 and 36. Additionally, there are four cycle-accessible states 21-24, each having at least three paths from the initial state to those cycle-accessible states. As outlined above, the fourth condition tests, for three paths $\pi_1$, $\pi_2$ and $\pi_3$ to the same cycle-accessible state, whether the residue $<\pi_1>^{-1}<\pi^2>$ commutes with the residue $<\pi_1>^{-1}<\pi_3>$. As indicated above, if a finite-state transducer T has the twins property, then this fourth condition will hold for the composed transducer $T_C$. Contrapositively, if this condition does not hold, then the finite-state transducer T does not have the twins property.

Accordingly, as shown in FIG. 34, state 21 is a cycle-accessible state that accesses the cycle $c_1$. There are three paths in the fifth composed transducer $T_{C5}$ from the initial state 0 to the cycle-accessible state 21. These three paths $\pi_1$, $\pi_2$ and $\pi_3$ comprise, respectively, states 0-1-9-21, states 0-1-10-21 and states 0-4-14-21. In particular, the residue $<\pi_1>$ is $(aba)^{-1}(\epsilon\epsilon\epsilon)$, which simplifies to $a^{-1}b^{-1}a^{-1}$. Likewise, the residue $<\pi_2>$ is $(a\epsilon\epsilon)^{-1}(\epsilon\epsilon\epsilon)$, which simplifies to $a^{-1}$. Finally, the residue $<\pi_3>$ is $(\epsilon\epsilon\epsilon)^{-1}(\epsilon\epsilon\epsilon)$, which simplifies to b. Then, the residue $<\pi_1>^{-1}<\pi_2>$ is $(a^{-1}b^{-1}a^{-1})^{-1}a^{-1}$, which simplifies to $abaa^{-1}$, which further simplifies to ab. Similarly, the residue $<\pi_1>^{-1}<\pi_3>$ is $(a^{-1}b^{-1}a^{-1})^{-1}b$, which simplifies to abab. Since the strings ab and abab commute, the fourth condition holds.

It should be appreciated that this is not sufficient to determine whether the fifth finite-state transducer $T_5$ has the twins property, and is thus determinizable, because the fourth condition is sufficient for the third path $\pi_3$ only when the third condition holds for the first and second paths $\pi_1$ and $\pi_2$. Thus, it is further necessary to analyze the fifth composed transducer $T_{C5}$ for paths $T_4$ and $\pi_5$ that encompass the first and second paths $\pi_1$ and $\pi_2$ but extend to the cycle $c_1$, that is, for the path $\pi_4$, comprising states 0-1-9-21-25, and the path $\pi_5$, comprising states 0-1-10-21-25. Assuming the third condition holds for these two paths $\pi_4$ and $\pi_5$, when the fifth condition holds for the path $\pi_3$ and holds as well for the various other paths to the cycles $c_2$-$c_3$ and the cycle-accessible states 22-24, then the fifth unweighted finite-state transducer $T_5$ will have the twins property and thus will be determinizable.

Figure 35:
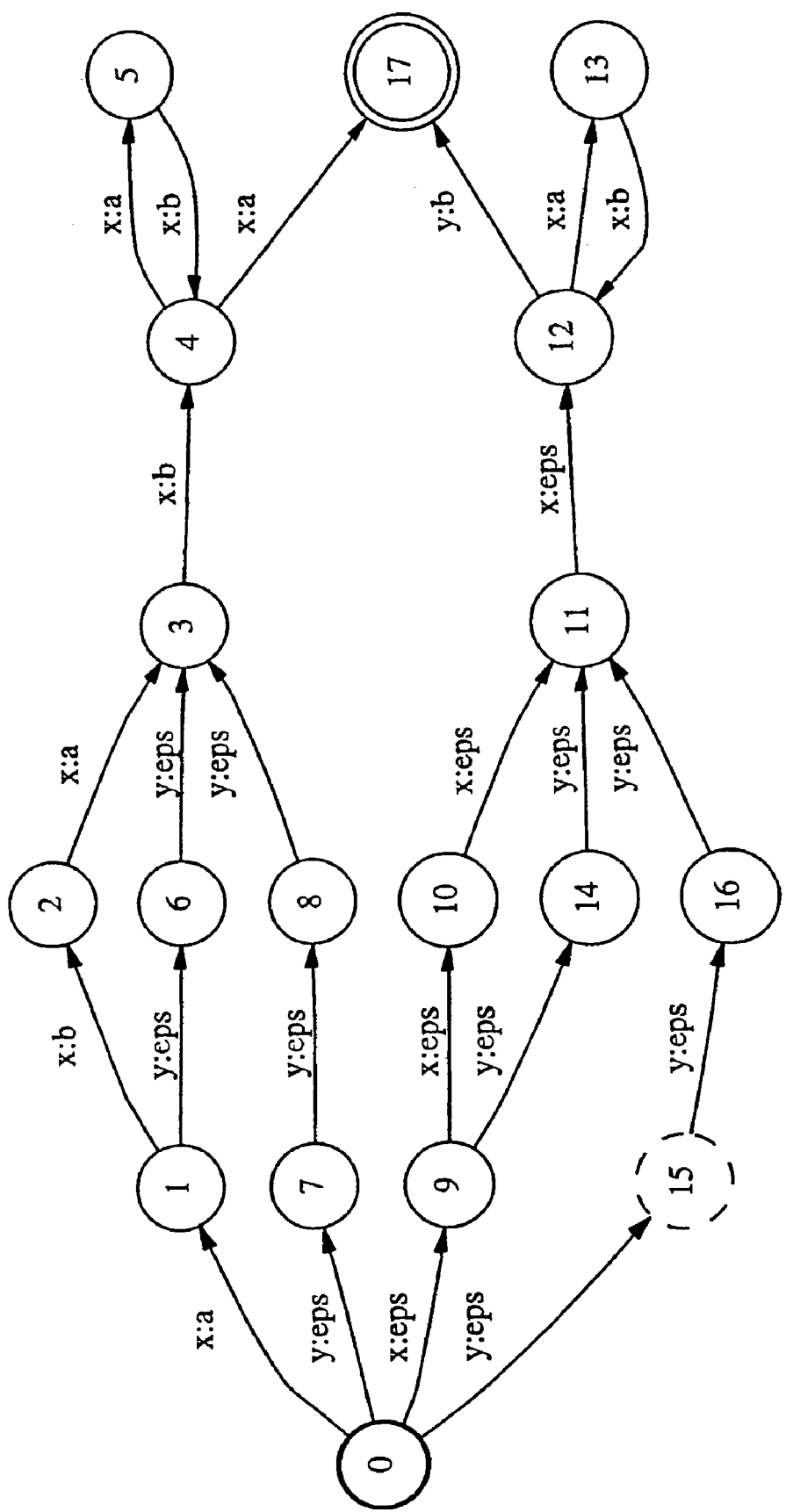
FIG. 35 illustrates a third finite-state transducer that does not have the twins property.
Figure 36:
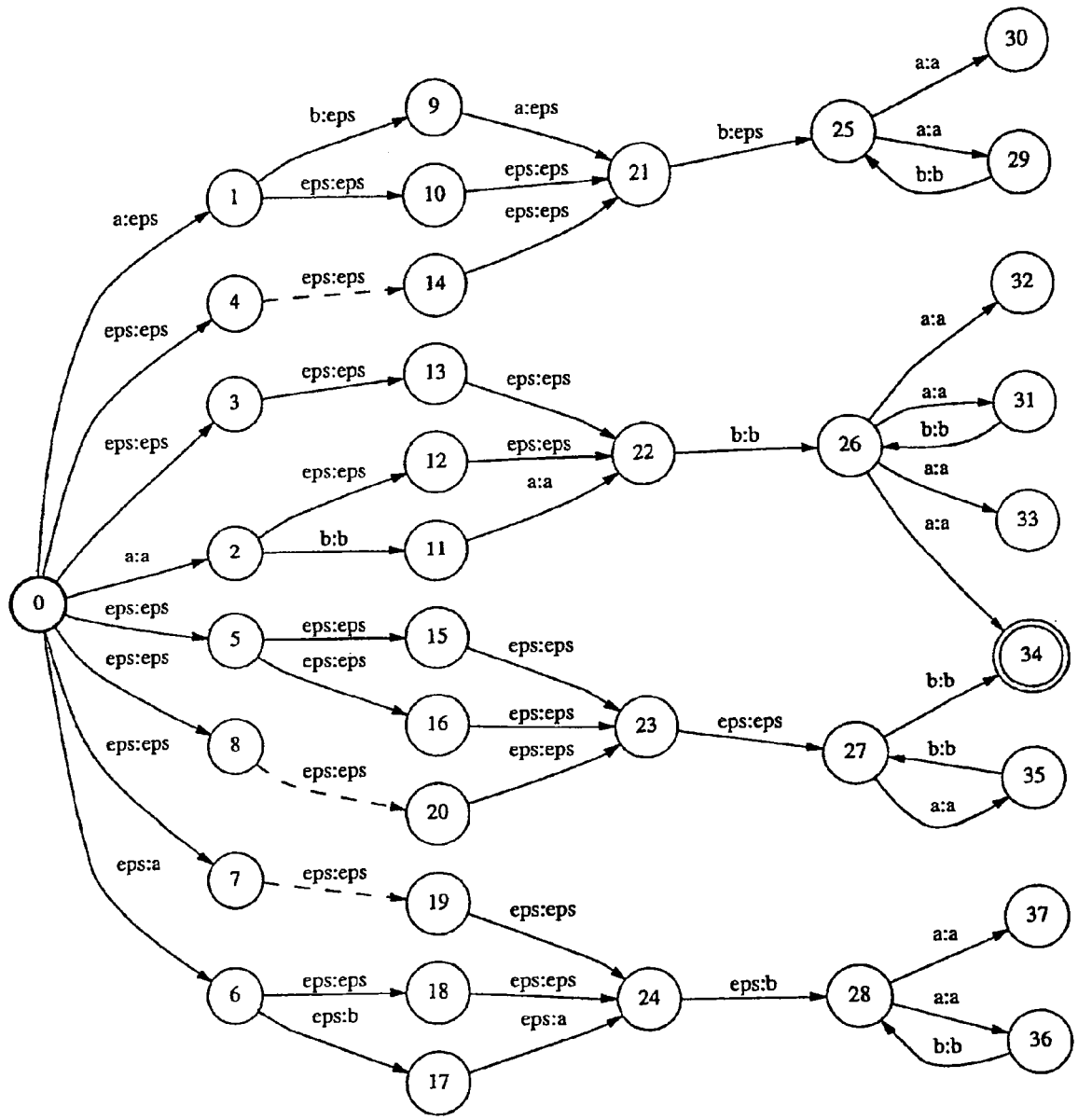
FIG. 36 illustrates the composition of the finite-state transducer shown in FIG. 35 and the inverse of the finite-state transducer shown in FIG. 35, illustrating that the third and fourth conditions are not met.

FIG. 35 shows a sixth unweighted finite-state transducer $T_6$ that is not determinizable, because it does not have the twins property. That this sixth unweighted finite-state transducer $T_6$ does not have the twins property can be verified by examining the sixth composed transducer $T_{C6}$, which is shown in FIG. 36. The sixth composed transducer $T_{C6}$ is obtained by composing the sixth unweighted finite-state transducer $T_6$ with its inverse unweighted finite-state transducer $T_6^{-1}$. As shown in FIG. 35, the sixth unweighted finite-state transducer $T_6$ is generally identical to the determinizable fifth unweighted finite-state transducer $T_5$, except for the edge extending from state 15 to state 16. Accordingly, the sixth composed transducer $T_{C6}$ shown in FIG. 36 is generally identical to the fifth composed transducer $T_{C5}$ shown in FIG. 34, except for the edges extending between states 4 and 14, 8 and 20, and 7 and 19. In particular, in the sixth composed transducer $T_{C6}$ shown in FIG. 36, the labels on these edges are different than the labels on the corresponding edges in the fifth composed transducer $T_{C5}$ shown in FIG. 34.

Thus, like the fifth composed transducer $T_{C5}$, the sixth composed transducer $T_{C6}$ shown in FIG. 36 has the same four cycles $c_1$-$c_4$, the same three paths $\pi_1$, $\pi_2$ and $\pi_3$ to the same cycle-accessible state 21, and the same two paths $\pi_4$ and $\pi_5$ to the cycle $c_1$. Moreover, like the fifth composed transducer $T_{C5}$, the paths $\pi_4$ and $\pi_5$ in the sixth composed transducer $T_{C6}$ meet the third condition. Thus, the third path $\pi_3$, comprising the states 0-4-14-21, can be tested using the fourth condition. Again, like the fifth composed transducer $T_{C5}$, the residues of $<\pi_1>$ and $<\pi_2>$ for the sixth composed transducer $T_{C6}$ shown in FIG. 36 are, respectively, $a^{-1}b^{-1}a^{-1}$ and $a^{-1}$. Thus, like the fifth composed transducer $T_{C5}$, the residue $<\pi_1>^{-1}<\pi_2>$ for the sixth composed transducer $T_{C6}$ is ab.

However, in contrast to the fifth composed transducer $T_{C5}$, the residue $<\pi_3>$ for the sixth composed transducer $T_{C6}$ shown in FIG. 36 is $(\epsilon\epsilon\epsilon)^{-1}(\epsilon\epsilon\epsilon)$, which reduces to the empty string $\epsilon$. Thus, for the sixth composed transducer $T_{C6}$ shown in FIG. 36, the residue $<\pi_1>^{-1}<\pi_3>$ is $(a^{-1}b^{-1}a^{-1})^{-1}\epsilon$, which reduces to aba. Clearly, the strings ab and aba do not commute. Thus, the sixth unweighted finite-state transducer $T_6$ shown in FIG. 36 does not have the twins property and thus is not determinizable. Because the fourth condition failed at this point, it is unnecessary to perform any further testing on any other paths of the sixth composed transducer $T_{C6}$.

As outlined above with respect to the first condition, a weighted finite-state automaton will have the twins property if the cycle-identity condition is met by all strongly connected components in that weighted finite-state automaton. Thus, assuming all of the strongly connected components have been previously identified, a depth-first search (DFS) of each strongly connected component S can be run starting from an arbitrary one of the states $q_s$ of that strongly connected component S. This depth-first search can be used to determine the weight of any path from that arbitrarily-selected starting state $q_s$ to each other state q that is a member of that selected strongly connected component S. It should be appreciated that this determined weight must be unique. Otherwise, there would be two cycles through the arbitrarily-selected starting state $q_s$, and the state q, which is a member of the selected strongly connected component S, with distinct weights. Thus, one of the weights would necessarily be different from the identity value of the multiplicative operator ($\otimes$).

Table 1 shows a pseudocode listing of a method that determines the value of the weight of a cycle. In this pseudocode listing, the weight of a path from an arbitrarily selected starting state $q_s$ to another state q of a selected strongly connected component S is denoted as W[q]. The value for the weights for each such state in the selected strongly connected component, other than the arbitrarily-selected starting state $q_s$, is set to some undefined value, while the weight of the arbitrarily-selected starting state W[$q_s$] is set to the identity value $\overline{1}$ of the multiplicative operator ($\otimes$) of the semiring over which the weighted finite-state automaton A is defined.

TABLE 1

```
0   Cycle-Identity(S)
1       for each e ∈ E ; transitions visited in the order of a DFS of S
2           do if (W[n[e]] = UNDEFINED)
3               then W[n[e]] ← W[p[e]] ⊗ w[e]
```

TABLE 1-continued

```
4        if (W[n[e]] ≠ W[p[e]] ⊗ w[e])
5            then return FALSE
6        return TRUE
```

In particular, as shown in Table 1, in line 0, a strongly connected component S is selected. It should be appreciated that the pseudocode shown in Table 1 is initialized by selecting an arbitrary one of the edges e of the selected strongly connected component and by setting the weight W[p[e]] of the beginning state of that arbitrarily selected edge e, i.e., the start state $q_s$, to the identity value $\bar{1}$ of the multiplicative operator (⊗). Then, in line 1, each edge e that occurs within that strongly connected component is selected in turn. If, in line 2, the weight W[n[e]] of the end state n[e] of the selected edge e remains undefined, then, in line 3, it is defined as the weight W[p[e]] of the beginning state p[e] of that edge e combined with the weight w[e] of that edge e by the multiplicative operator (⊗). Next, in line 4, if the weight W[n[e]] of the end state n[e] does not equal the weight W[p][e]] of the beginning state p[e] combined with the weight w[e] of the edge by the multiplicative operator (⊗) in line 5, a signal is output indicating the twins property is not present.

It should be appreciated that the test in line 4 will always be true until the end state n[e] of the current edge e is the start state $q_s$, which is not undefined. Accordingly, at this time, the condition in line 2 will fail and the operation defined in line 3 will not be performed. It should also be appreciated that, at this time, the weight W[p][e] ⊗ w[e], which is the weight W[p[e]] of the beginning state p[e] of the edge e that leads back to the starting state $q_s$ combined with the weight w[e] of that edge e by the multiplicative operator (⊗), will be the weight of the cycle. If that weight does not equal the weight of the starting state $q_s$, which was set to the identity value $\bar{1}$ of the multiplicative operator (⊗), then the cycle-identity test fails and the weighted finite-state automaton cannot have the twins property. If the test in line 4 does not fail and all strongly connected components S have been selected, then line 6 returns an indication that the test was successful for all strongly connected components S. Thus, the weighted finite-state automaton A meets the first condition and that weighted finite-state automaton has the twins property. Thus, that weighted finite-state automaton is determinizable.

It should be appreciated that checking whether the weight of each cycle of a weighted finite-state automaton equals the identity value of the multiplicative operator (⊗) can be done in linear time. In particular, the twins property can be checked for any trim cycle-unambiguous weighted automaton in time $O(|Q|^2+|E|^2)$. In particular, for any trim cycle-unambiguous weighted automaton A, checking for the twins property is equivalent to verifying, for the weighted finite-state automaton $A_I$ formed by intersecting the automaton A with its inverse $A^{-1}$, that the weight of any cycle in the intersection automaton $A_I$ equals the identity value of the multiplicative operator (⊗) of the semiring over which the trim cycle-unambiguous weighted automaton A has been defined.

In particular, this can be done by running a program based on the pseudocode shown in Table 1 for each strongly connected component S of the intersection automaton $A_I$. The total cost of such a program is linear in the size of the intersection automaton $A_I$, since a depth-first search can be done in linear time and since the strongly connected components of the intersection automaton $A_I$ can also be determined in linear time. In particular, this time complexity is believed to be optimal when the alphabet Σ contains at least two distinct elements.

As indicated above, determining that a finite-state transducer T is equivalent to the identity function over its domain of definition can be done in linear time in the size of that finite-state transducer T. As indicated above, this is equivalent to verifying that, for any successful path π in that finite-state transducer T, the input string for that path is equal to the output string for that path, that is, i[π]=o[π[. As further indicated above, if that finite-state transducer is equivalent to the identity function over its domain of definition, then for any two paths π and π' from an initial state to a coaccessible state q, the residue of π is equal to the residue of π', that is, <π>=<π'>. As indicated above, the residue of any path from the initial state i to such a coaccessible state q can be denoted by R[q].

Table 2 is one exemplary embodiment of a pseudocode listing of a procedure "identity" usable to determine whether a given finite-state transducer T is equivalent to the identity function over its domain of definition.

TABLE 2

```
0  Identity(T)
1    for each e ∈ E, such that coacc[n[e]] =TRUE; in the order of a
        DFS from I
2      do if (R[n[e]] = UNDEFINED)
3        then R[n[e]] ← i[e]⁻¹R[p[e]]o[e]
4        if (R[n[e]] ≠ i[e]⁻¹R[p[e]]o[e]) or (n[e]∈ F & R[n[e]] ≠ ε)
5          then return FALSE
6    return TRUE
```

As shown in Table 2, line 1 indicates that the operations defined in lines 2-5 will be preformed for each edge e that has a coaccessible end state n[e] and that the edges e in the finite-state transducer T will be selected in a depth-first search order starting from the initial state i. Next, line 2 checks, for each such edge e, if the residue R[n[e]] has previously been determined. If it has not been determined, line 3 is executed. Otherwise, line 3 is skipped. In line 3, the residue R[n[e]] is determined as the inverse i[e]⁻¹ of the input label i[e] of the current edge e, the residue R[p[e]] of the beginning state p[e] of the current edge e, and the output label o[e] of the current edge e, that is, i[e]⁻¹R[p[e]]o[e]. In line 4, the residue R[n[e]] is compared to the residue i[e]⁻¹R[p[e]]o[e]. Line 4 also checks whether the end state n[e] of the current edge e is a final state and whether the residue R[n[e]] comprises the empty string.

It should be appreciated that the residue R[n[e]] will be undefined the first time that end state n[e] of the current edge e is reached. However, if that state is also the end state n[e] of another path π, if that path π was analyzed earlier, the residue R[n[e] at that state n[e] will already have been defined. In the first case, i.e., the first time the end state n[e] is reached, obviously the residue R[n[e]] will equal the residue i[e]⁻¹R [p[e]]o[e]. However, the second time that state n[e] is reached, via some other path, these two residues may not be equal. If they are not equal, then the finite-state transducer T is not equivalent to the identity function over its domain of definition. Alternatively, if the end state n[e] is a member of the set of final states and the residue R[n[e]] does not equal the empty set, then the finite-state transducer T is also not equivalent to the identity function over its domain of definition.

In either of these cases, line 5 is executed and an indication is output that the finite-state transducer T is not equivalent to the identity function over its domain of definition. Thus, the finite-state transducer T is not functional. If neither of the conditions set forth in line 4 are met, the next edge e' having a coaccessible end state n[e'] is selected using the depth-first search from the initial state i. If all such edges having coaccessible end states n[e] fail to meet either of the conditions in line 4, then line 5 is never executed. As a result, line 6 is executed. Line 6 causes an output to be generated that indicates that the finite-state transducer T is equivalent to the identity function over its domain of definition. Thus, if the finite state transducer T being analyzed is a composed transducer $T_{Cb}$, obtained by composing a base finite state transducer $T_b$ with its inverse finite-state transducer $T_b^{-1}$, then the finite-state transducer $T_b$ is functional. However, as outlined above, while this is a necessary condition for determining that the determinizability of the functional finite-state transducer $T_b$ has the twins property, this is not a sufficient condition.

It should be appreciated that finding the coaccessible states of the finite-state transducer T, and thus defining the array "coacc[n[e]] defined in line 1, can be done in linear time. The determination of new residues set forth in line 3 and the comparisons set forth in line 4 are a linear number of residue operations. Each of these operations can be done in constant time, after a pre-processing stage, that is linear in the size of the finite-state transducer T. A tree of all of the input and output strings of the paths in the finite-state transducer T found using the depth-first search can be built. The size of the tree is linear in the size of the finite-state transducer T. A suffix tree from this tree can be built in linear time in the size of the first tree.

As indicated above, the residue of a path s is defined as $i[\pi]^{-1}o[\pi]$. Therefore, if a residue is pure, it is either a suffix of $o[\pi]$ or the inverse of a suffix of $i[\pi]$. Thus, the residue of this path can be encoded by a bit specifying that information and a position in the suffix tree corresponding to the residue $<\pi>$. Two residues are then equal if and only if these two residues have the same bit and correspond to the same position of the suffix tree. Therefore, comparing the residues can be done in constant time.

Where a new edge has an input label a and an output label b, as set forth in line 3, determining the new residue $a^{-1}rb$ for the end state of that new edge from a residue r of the beginning state of that new edge can be done in constant time. Furthermore, if the residue r is pure, determining whether the new residue $a^{-1}rb$ is pure or not can be done in a constant time. Thus, the corresponding position in the suffix tree can be found by going possibly one step up the suffix link, followed by one step down in the first tree, which can be done in constant time. Thus, the total cost of the pseudocode shown in Table 2 is linear in the size of the finite-state transducer T. The pseudocode shown in Table 2 can be performed over a composed transducer $T_C$ obtained by composing the finite-state transducer T with its inverse finite-state transducer $T^{-1}$ to determine if the finite-state transducer T is functional. Additionally, the worst-case size for the composed transducer $T_C$ is $O(|Q|^2+|E|^2)$. Thus, the time complexity for determining whether the finite-state transducer T is functional is $O(|Q|^2+|E|^2)$.

Table 3 is a pseudocode listing of one exemplary embodiment of a method for determining whether the composed transducer $T_C$, obtained by composing a given functional finite-state transducer T with its inverse transducer $T^{-1}$, meets the third or fourth conditions for any edge that has a cycle-accessible end state n[e].

TABLE 3

| 0 | Residue (q,k) |
|---|---|
| 1 | for each e ∈ E[q]such that cyacc[n[e]] = TRUE |
| 2 | do R ← $i[e]^{-1}R_k[p[e]]o[e]$ |
| 3 | if (R ∉ Σ*∪(Σ$^{-1}$)*) then return FALSE |
| 4 | if (scc[n[e]] = scc[p[e]]) |

TABLE 3-continued

| 5 | then if ($R_k$[n[e]] ≠ ∞ and $R_k$[n[[e]] ≠ R) return FALSE) |
|---|---|
| 6 | else if (k = 1 & $R_1$[n[e]] ≠ ∞ & $R_2$[n[e]] = ∞ & $R_1$[n[e]] ≠ R) |
| 7 | then $R_2$[n[e]] ← R |
| 8 | Residue (n[e],2) |
| 9 | else if ($R_1$[n[e]] ≠ ∞ and $R_2$[n[e]] ≠ ∞) |
| 10 | then if ($(R_1[n[e]])^{-1} R_2[n[e]] = R_1[n[e]]^{-1}R$) |
| 11 | then return FALSE |
| 12 | if ($R_k$[n[e]] = ∞) |
| 13 | then $R_k$[n[e]] ← R |
| 14 | Residue (n[e],k) |
| 15 | return TRUE |

As shown in Table 3, referring to lines 8 and 14, this is a recursive method that moves along edges of the composed transducer $T_C$ from one cycle-acessible end state n[e] to another cycle-accessible end state n[e'] using a depth-first search of the composed transducer $T_C$. For each such cycle-accessible end state n[e], the residues $R_k$[n[e]], for k=1 and 2, are initialized to infinity or some other undefined value, which is represented by the infinity symbol in the pseudocodes shown in Table 3. Prior to performing this pseudocode, the composed transducer $T_C$ was searched to build the array "cyacc[n[e]], that is, the set of cycle-acessible end states n[e].

Then, beginning in line 1, each edge e having a cycle-accessible end state n[e] is selected in turn using a depth-first search from the initial state i. The initial call for this pseudocode, i.e., the base iteration, is based on the initial state i and a value of 1 for k, that is, "residue (i,1)". Then, in line 1, each edge of the set of edges extending from the current state q having a cycle-accessible end state n[e] is selected in turn. The recursion defined in lines 8 and 14 implements the depth-first search from the cycle-accessible end state n[e] from that selected edge e.

As outlined above, the residue of a finite-state transducer, at a state q that is a beginning state of an edge e, is R[p[e]]. As further indicated above, the residue R[n[e]] of the end state n[e] of an edge e extending from that state q is $i[e]^{-1}R[p[e]]o[e]$. That is, in line 2, the current residue R for the end state n[e] of the current edge e is determined based on the input and output labels of that edge e and the $k^{th}$ residue of the beginning state p[e] of that edge. Next, in line 3, the current residue R is checked to determine if it is pure. If not, an indication is output that the composed transducer $T_C$ is not pure and thus fails the third and fourth conditions. Therefore, the functional finite-state transducer T does not have the twins property.

If the current residue R is pure, line 4 determines whether the strongly connected component scc[n[e]] that contains the end state n[e] of the current edge e is the same strongly connected component as the strongly connected component scc[p[e]] that contains the beginning state p[e] of the current edge e. It should be appreciated that a strongly connected component scc[q] can be defined for every state. However, if that state q is not part of a cycle, the strongly connected component scc[q] for that state q will comprise only that state q. If the two strongly connected components scc[n[e]] and scc[p[e]]are the same, line 5 is performed. This will occur once the cycle is entered. Otherwise, line 6 is performed.

Line 5 tests whether at least one of the first or second residues $R_1$[n[e]] or $R_2$[n[e]] for the current end state n[e] has been defined and, if that first or second residue $R_1$[n[e]] or $R_2$[n[e]] for the end state n[e] of the current edge e has been defined, whether it is equal to the current residue R. This can occur only when the end of the cycle is reached. If that first or second residue $R_1[n[e]]$ or $R_2[n[e]]$ is not equal to the current residue R, the third condition is not met. As a result, the functional finite-state transducer T does not have the twins property and therefore is not determinizable. If the conditions defined in line 5 are met, line 12 is performed.

In line 6, a determination is made whether the first residue $R_1[n[e]]$ for the current end state n[e] has been defined, while the second residue $R_2[n[e]]$ for the current end state n[e] has not been defined, that k is equal to 1, and that the defined first residue $R_1[n[e]]$ does not equal the current residue R. If all of these conditions are met, then lines 7 and 8 are performed. Otherwise, if any one of these conditions is not met, line 9, and possibly lines 10 and 11, are performed.

In line 7, because the first residue $R_1[n[e]]$ for the current end state n[e] is already defined, the value for the second residue $R_2[n[e]]$ of the current end state n[e] is defined as the current residue R. Then, in line 8, the pseudocode shown in Table 3 is recursively called using the current end state n[e] as the state q and setting k equal to 2. Control then passes to this further call to the pseudocode shown in Table 3. When control returns to the present call of the pseudocode shown in Table 3, line 12 is performed.

If line 9 is performed, the first and second residues $R_1[n[e]]$ and $R_2[n[e]]$ are analyzed to determine if both the first and second residues $R_1[n[e]]$ and $R_2[n[e]]$ for the end state n[e] of the current edge e have been defined. If so, line 10 is performed. Otherwise, line 12 is performed. If line 10 is performed, the first and second residues $R_1[n[e]]$ and $R_2[n[e]]$ for the current end state n[e] and the current residue R are checked to see if the fourth condition is met. If not, line 11 is performed. Line 11 causes an output to be generated that indicates that the functional finite-state transducer T does not have the twins property and therefore is not determinizable. Otherwise, in line 10, if the fourth condition is met, line 12 is performed.

In line 12, the first or second residue $R_1[n[e]]$ and $R_2[n[e]]$, based on the value of k for the end state n[e] of the current edge e, is checked to determine if it has been defined. If so, the current call for the pseudocode shown in Table 3 ends, and control returns to the previous call of the pseudocode shown in Table 3. Otherwise, lines 13 and 14 are performed. In line 13, the first or second residue $R_1[n[e]]$ or $R_2[n[e]]$ for the current value of k and for the end state n[e] of the current edge e is set to the current residue R. Then, in line 14, a new call to the pseudocode shown in Table 3 is made using the end state n[e] of the current edge e as q, and using the current value of k as the value of k for the new call to the pseudocode shown in Table 3.

Thus, in the pseudocode shown in Table 3, as long as the end state n[e] of the current edge is also cycle-accessible, and none of the failure conditions defined in lines 3, 5 and 11 are met, a new call to this pseudocode shown in Table 3 is made for each edge along that path. This continues until either a non-cycle-accessible state is reached, a cycle is completely traversed, or the current edge to the end state n[e] is the third subsequent edge that ends in the end state n[e]. Once one of these conditions is met, and the purity condition, the third condition or the fourth condition hold, the path is traversed in reverse until a beginning state for one of the previously selected edges is reached for which there is another edge e' extending from that beginning state to a cycle-accessible end state, n[e'], whether or not that end state n[e'] for the new edge e' has been reached before or not.

Once all of the paths through the composed transducer $T_C$ have been traversed, such that none of the conditions defined in lines 6 or 12 generate new calls to the pseudocode shown in Table 3, line 15 is executed. Generally, this will occur only after all of the paths extending from the initial state i to a cycle-accessible state have been traversed. If line 15 is reached, then the third and fourth conditions have been met for all such cycle-accessible paths in the composed transducer $T_C$. Thus, assuming the finite-state transducer is functional, the finite-state transducer T has the twins property and is determinizable.

It should be appreciated that each edge e having a cycle-accessible end state n[e] is traversed at most two times using the pseudocode shown in Table 3, since this pseudocode is called only when the first residue $R_1[n[e]]$ or the second residue $R_2[n[e]]$ is not defined. This pseudocode performs a number of string operations, including determining a new residue, comparing two residues, and comparing the primitive root of two residues, that are all linear in the size of the composed state transducer $T_C$. Thus, in the worst case, these operations are at most quadratic in the size of the functional finite-state transducer T. It should also be appreciated that some of these string operations can be done in constant time. However, comparing the primitive roots can cost up to $|Q|^2-1$ comparisons, that is, the length of the longest string in a spanning tree. The best current estimate of the time complexity of the pseudocode shown in Table 3 is $O(|Q|^2(|Q|^2+|E|^2))$.

Figure 37:
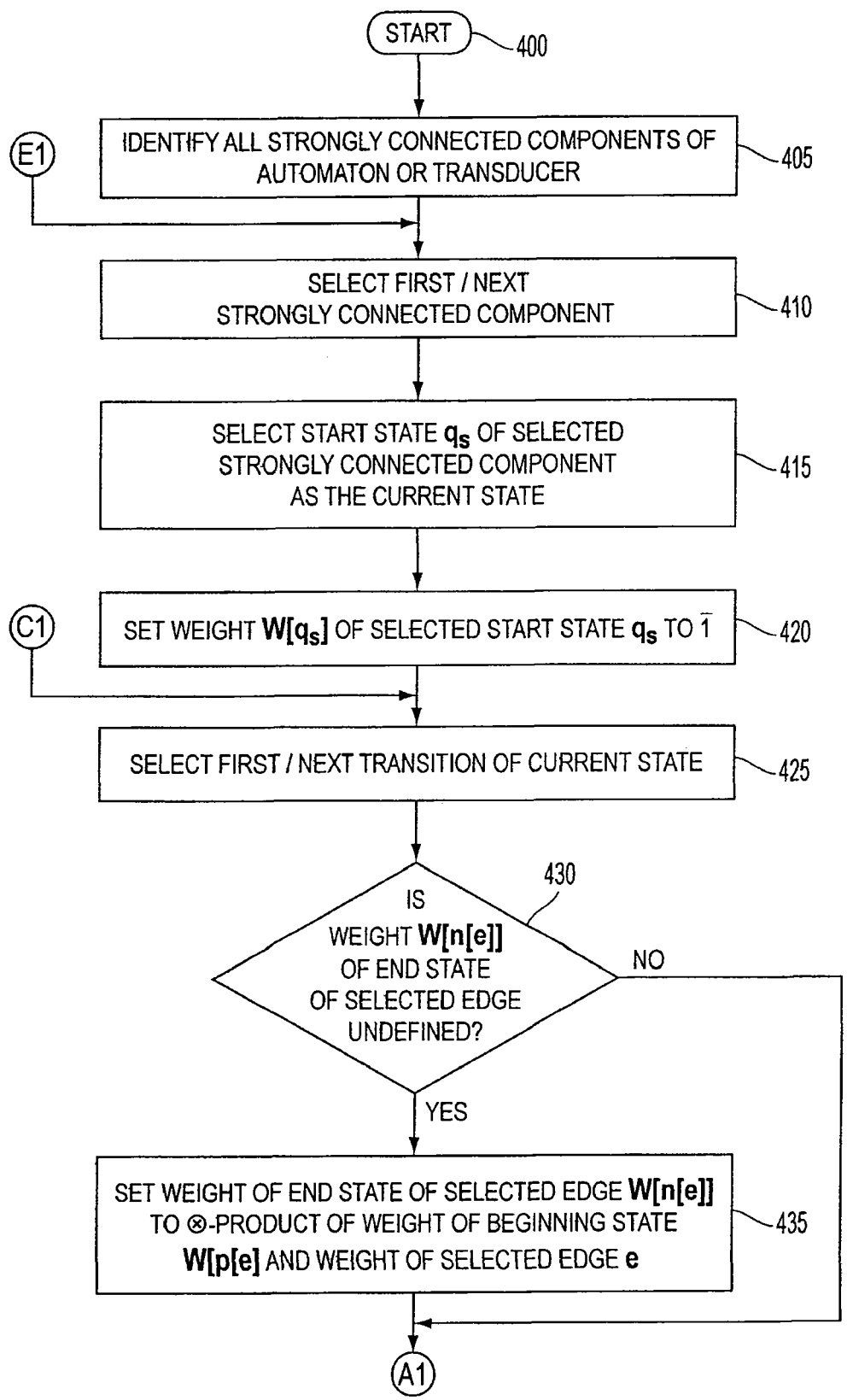
FIGS. 37-39 are a flowchart outlining one exemplary embodiment of a method for determining if a weighted finite-state automaton or a weighted finite-state transducer has the cycle-identity property.
Figure 38:
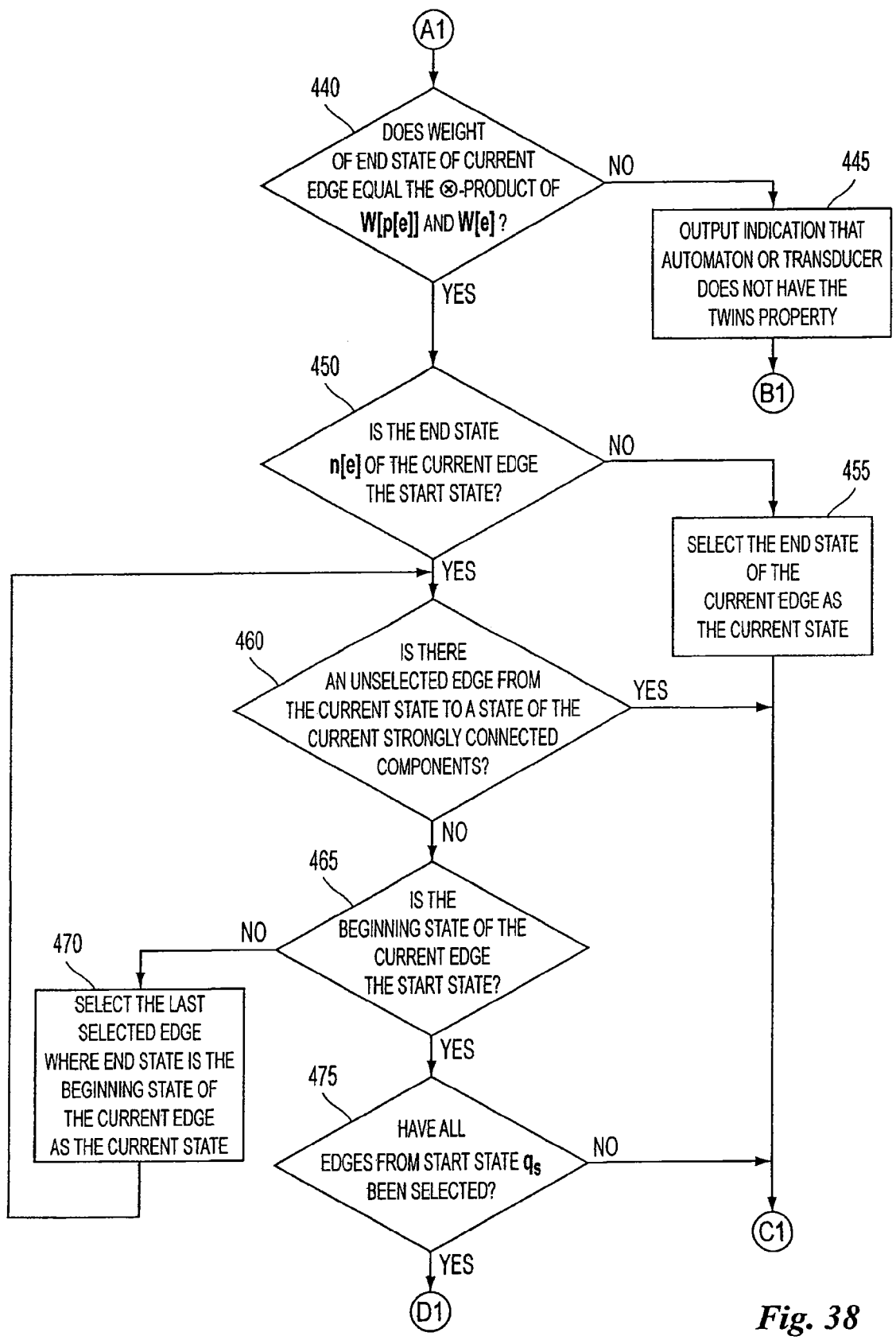
Figure 39:
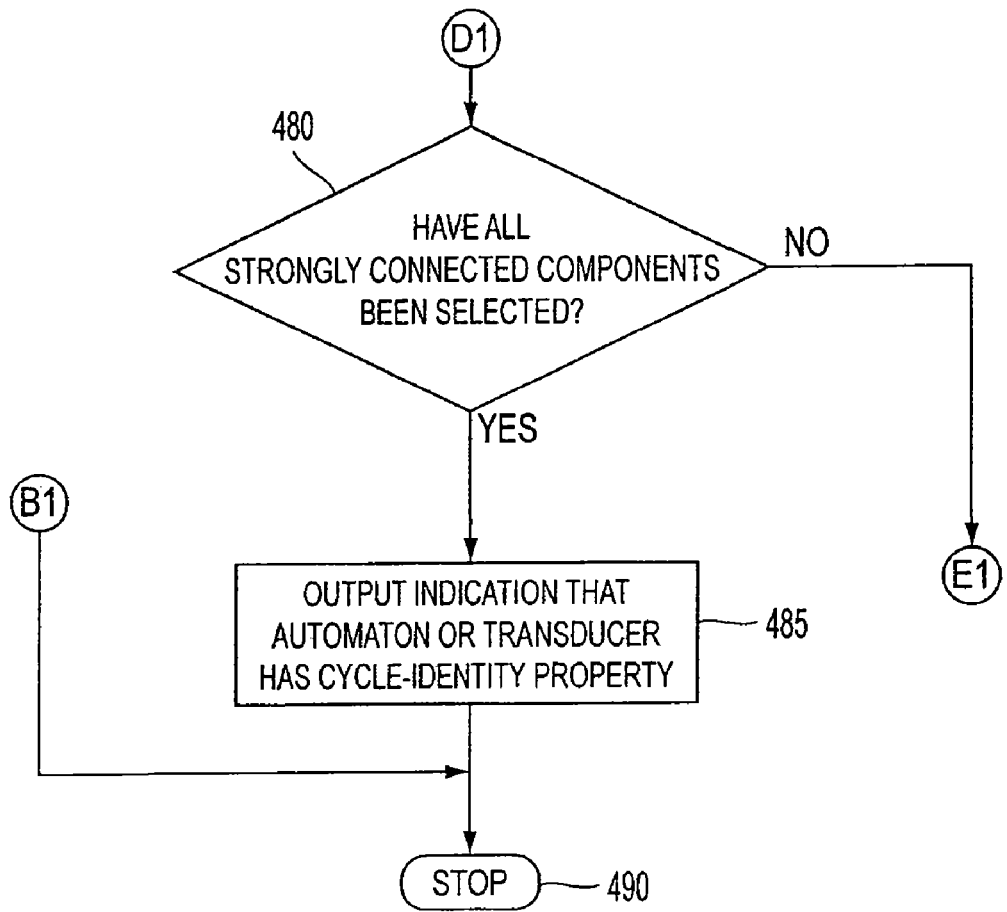

FIGS. 37-39 outline one exemplary embodiment of a method for determining whether a given weighted finite-state automaton or weighted finite-state transducer has the cycle-identity condition, that is, the first condition. It should be appreciated that, if the weighted finite-state automaton or transducer has the cycle-identity condition, and has been obtained by taking the intersection of a base weighted finite-state automaton or the composition of the base weighted finite-state transducer with its inverse weighted finite-state automaton or transducer, then that base weighted finite-state automaton has the twins property or that base weighted transducer meets a necessary condition for having the twins property.

As shown in FIGS. 37-39, the method begins in step 400 and continues to step 405, where all strongly connected components of the finite-state automaton or transducer are identified. Then, in step 410, the first or next strongly connected component is selected. Next, in step 415, a start state $q_s$ of the selected strongly connected component is selected as the current state. It should be appreciated that the start state $q_s$ of the selected strongly connected component can be arbitrarily chosen from the set of states q that form the selected strongly connected component S. Operation then continues to step 420.

In step 420, the weight $W[q_s]$ of the selected start state $q_s$ is set to the identity value of the multiplicative operator ($\otimes$) of the semiring over which the weighted finite-state automaton or transducer has been defined. Next, in step 425, the first or next edge or transition leaving the current state is selected. Then, in step 430, a determination is made whether the weight W[n[e]] of the end state n[e] of the selected edge e is undefined. If so, operation continues to step 435. Otherwise, operation jumps to step 440.

In step 435, the weight W[n[e]] of the end state n[e] of the selected edge e is set to the multiplicative-operator-product of the weight W[p[e]] of the beginning state p[e] of the selected edge and the weight w[e] of the selected edge e, that is, to W[p[e]] $\otimes$ W[e]. Then, in step 440, a determination is made whether the weight W[n[e]] of the end state n[e] of the current edge e equals the multiplicative-operator-product of the weights W[p[e]] and w[e], that is, W[p[e]] $\otimes$ W[e]. If not, operation continues to step 445. Otherwise, operation jumps to step 450.

In step 445, an indication is output that the weighted finite-state automaton or transducer being analyzed fails to meet the first condition, i.e., the cycle-identity condition. Thus, if the weighted finite-state automaton or transducer is the weighted finite-state automaton or transducer obtained by intersecting a base weighted finite-state automaton with its inverse weighted finite-state automaton or by composing a base weighted finite-state transducer with its inverse weighted finite-state transducer, this output also indicates that that base weighted finite-state automaton or finite-state transducer does not have the twins property and thus is not determinizable. Operation then jumps to step 490.

In contrast, in step 450, a determination is made whether the end state n[e] of the current edge e is the start state $q_s$. If not, operation continues to step 455. Otherwise, operation jumps to step 460. In step 455, the end state n[e] of the current edge e is selected as the current state. Operation then jumps back to step 425. In contrast, in step 460, a determination is made whether an unselected edge e' from the current state p[e] to another state n[e'] of the current strongly-connected component exists. If so, operation again jumps back to step 425. Otherwise, operation continues to step 465. In step 465, a determination is made whether the beginning state p[e] of the current edge e is the start state $q_s$. If not, operation continues to step 470. Otherwise, operation jumps to step 475. In step 470, the last selected edge e' whose end state n[e'] is the beginning state p[e] of the current edge e is selected as the current state. Operation then returns to step 460.

In contrast, in step 475, a determination is made whether all edges from the start state $q_s$ have been selected. If not, operation again returns to step 425. Otherwise, operation continues to step 480. In step 480, a determination is made whether all of the strongly connected components in the weighted finite-state automaton or transducer have been selected. If not, operation returns to step 410. Otherwise, operation continues to step 485. In step 485, an indication is output that the weighted finite-state automaton or transducer being analyzed has the cycle-identity property. Operation then continues to step 490, where operation of the method ends.

Additionally, in various exemplary embodiments, in step 485, if the method is being used to analyze a weighted finite-state automaton, and the weighted finite-state automaton being analyzed was obtained by intersecting a base weighted finite-state automaton with its inverse weighted finite-state automaton, an indication is output that the base weighted finite-state automaton has the twins property and is thus determinizable. In contrast, in step 485, if the method is being used to analyze a weighted finite-state transducer, and the weighted finite-state transducer being analyzed was obtained by composing a base weighted finite-state transducer with its inverse weighted finite-state transducer, then an indication is output that the base weighted finite-state transducer meets the cycle-identity, or first condition, and thus should be analyzed for the second, or functional, condition and the third and fourth, or residue, conditions.

Figure 40:
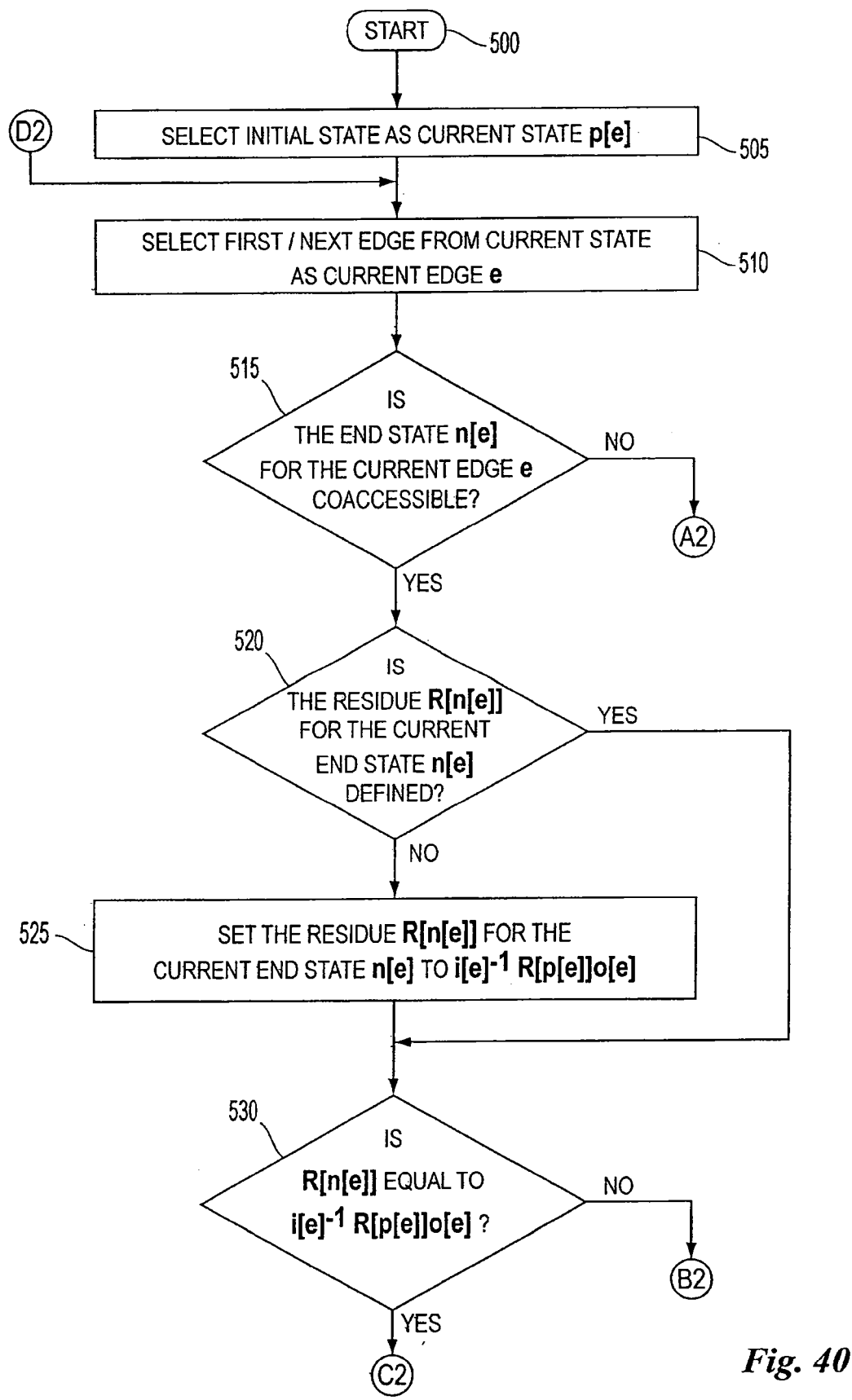
FIGS. 40-42 are a flowchart outlining one exemplary embodiment of a method for determining if a finite-state transducer is functional.
Figure 41:
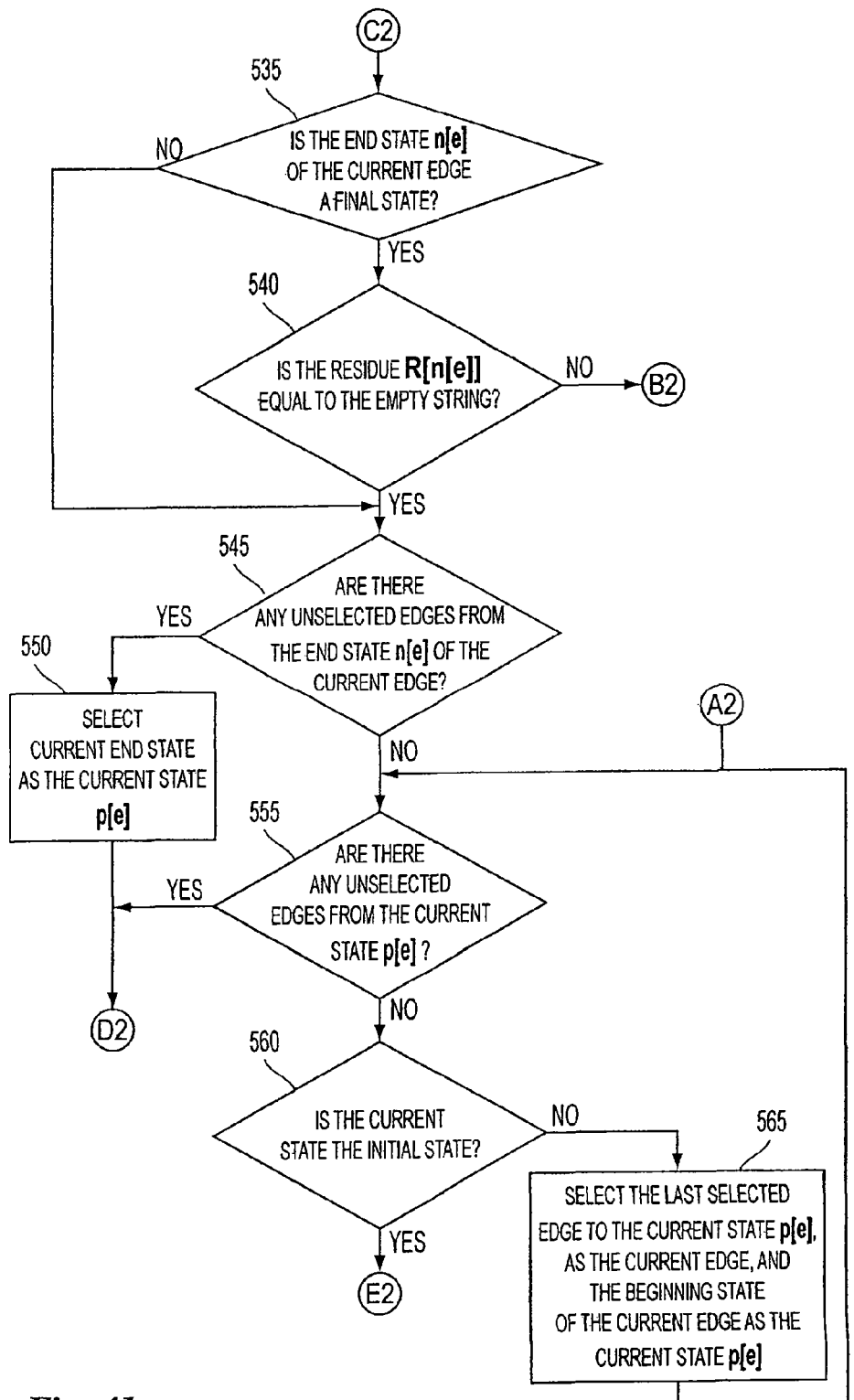
Figure 42:
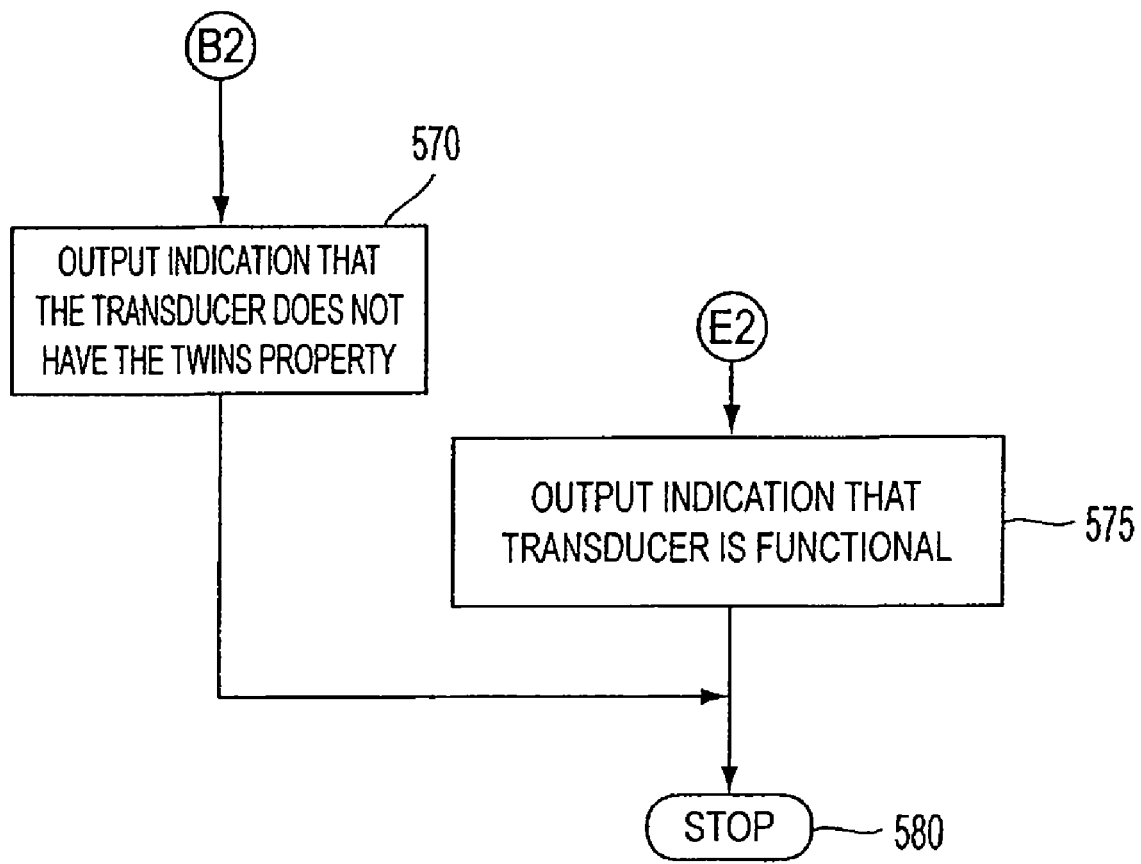
Figure 43:
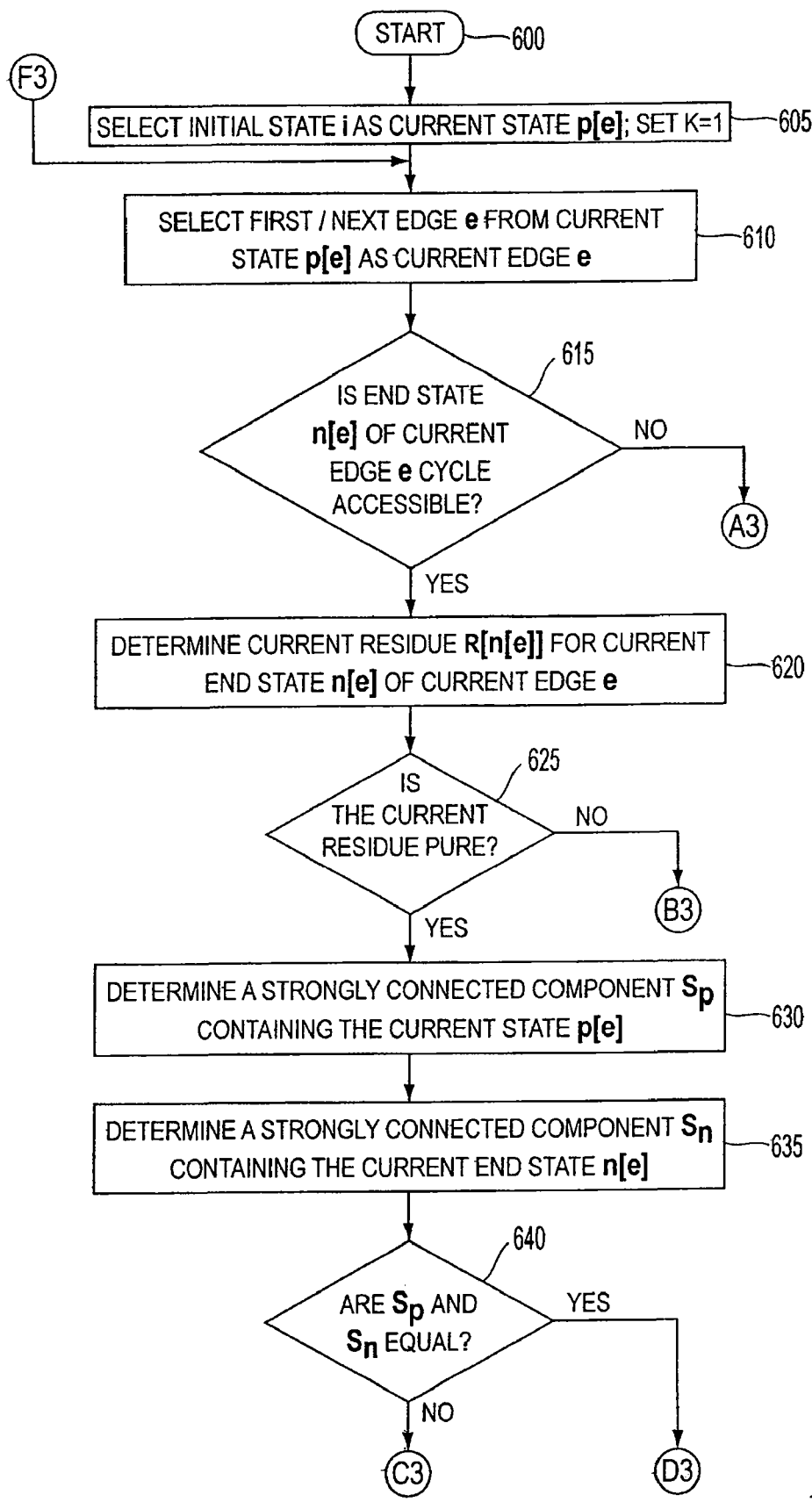
FIGS. 43-46 are a flowchart outlining one exemplary embodiment of a method for determining if the residue conditions are met for every cycle-accessible edge.
Figure 44:
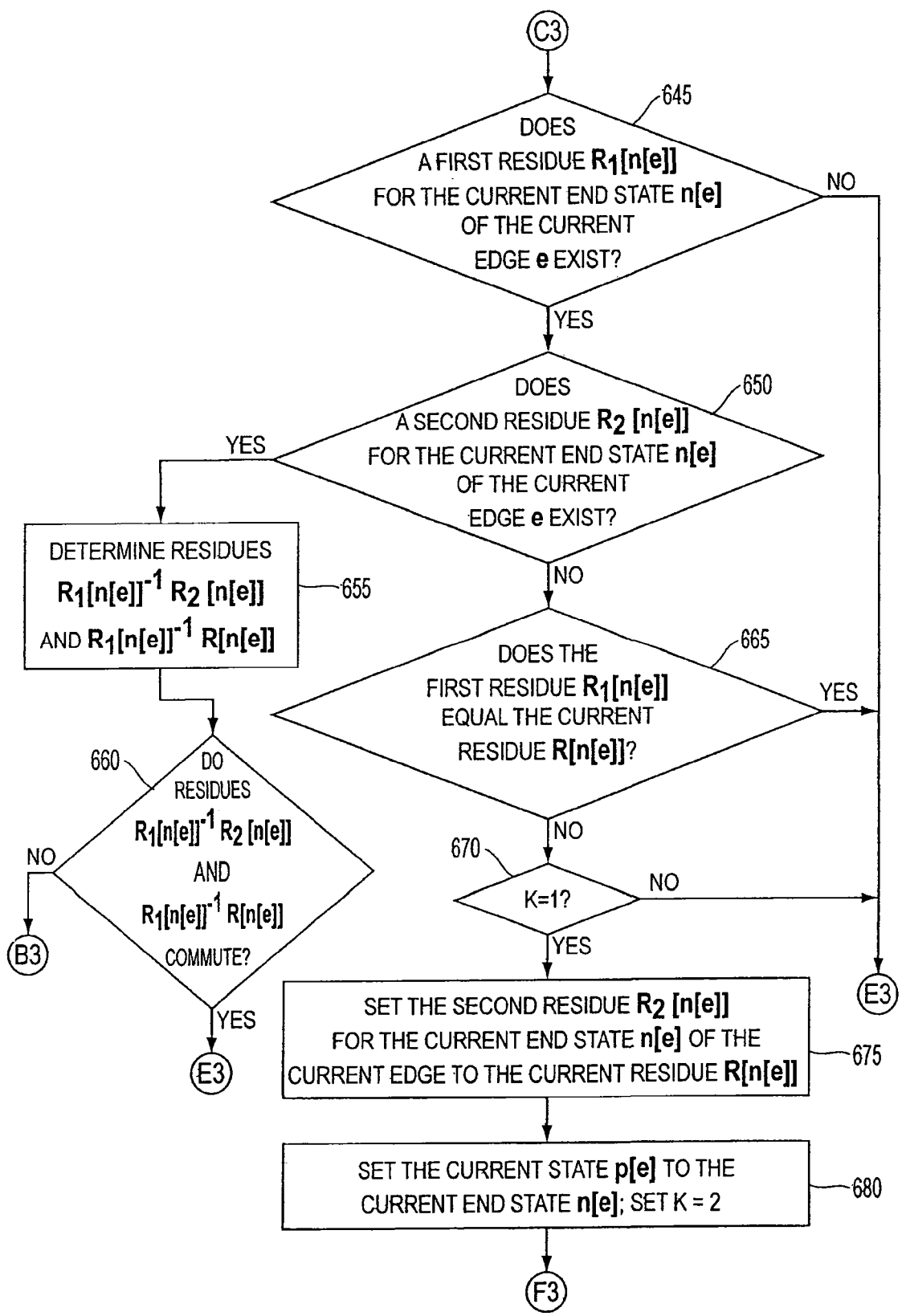
Figure 45:
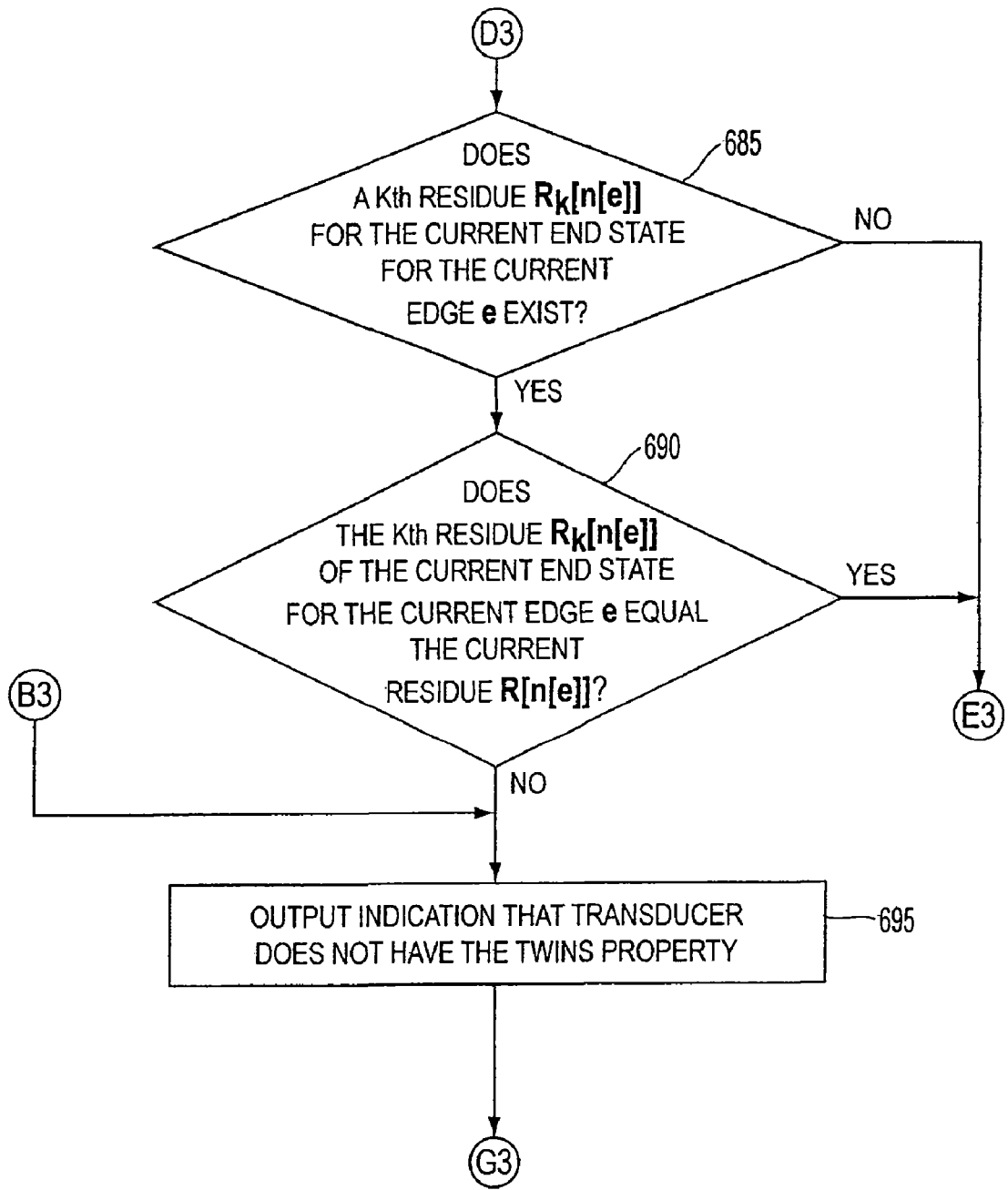
Figure 46:
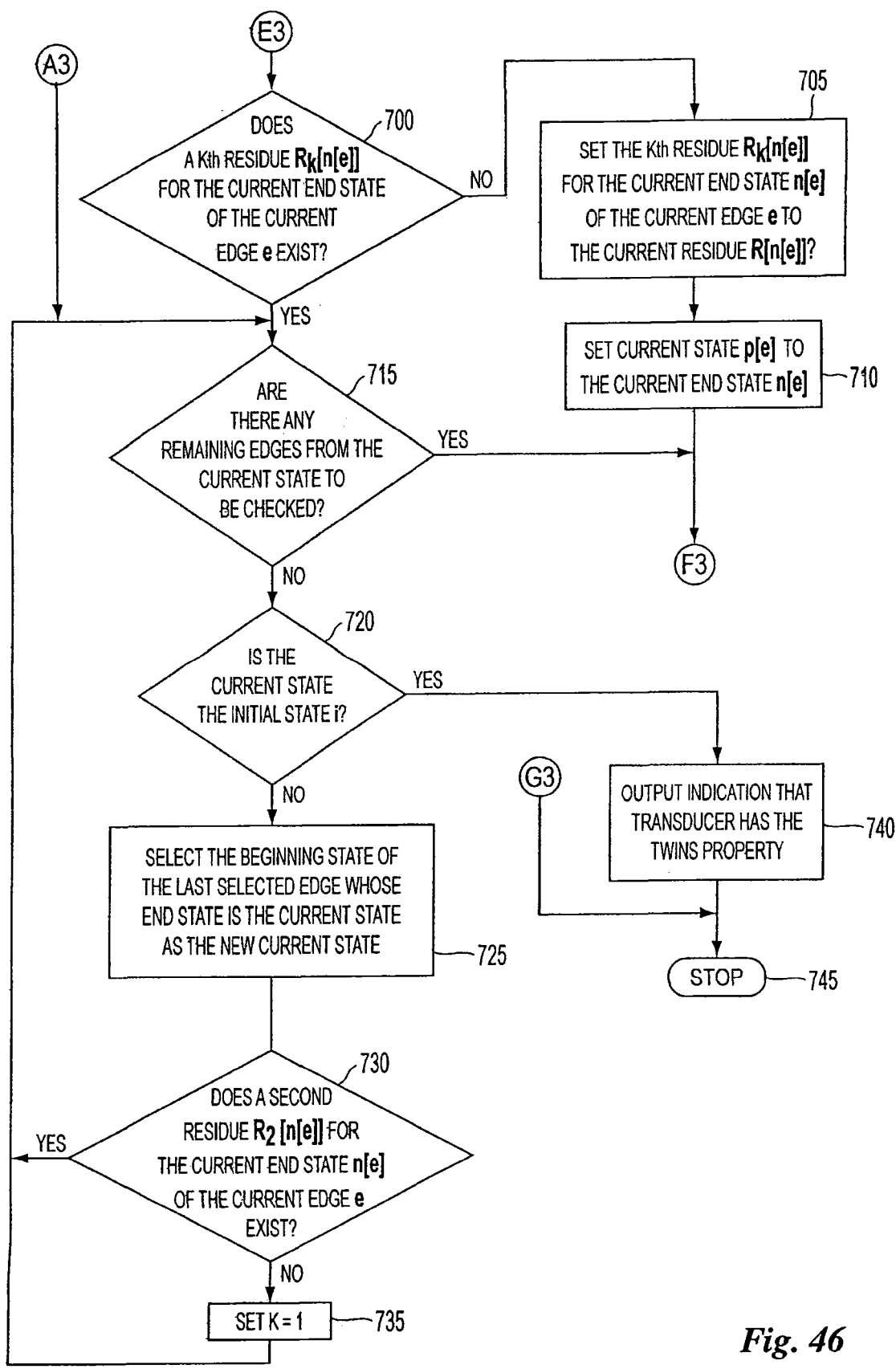

FIGS. 40-42 outline one exemplary embodiment of a method for determining whether a weighted or unweighted finite-state transducer meets the second, or functional, condition. In particular, if the finite-state transducer being analyzed was obtained by composing a base finite-state transducer with its inverse transducer, then the finite-state transducer being analyzed having the functional condition is a necessary but insufficient condition for determining that the base finite-state transducer is determinizable.

As shown in FIGS. 40-42, beginning in step 500, operation continues to step 505, where an initial state i of the finite-state transducer being analyzed is selected as the current state p[e].

Next, in step 510, a first or next edge e from the current state p[e] is selected as the current edge e. Next, in step 515, a determination is made whether the end state n[e] for the current edge e is coaccessible. If not, operation jumps to step 555. Otherwise, operation continues to step 520.

In step 520, a determination is made whether the residue R[n[e]] for the current end state n[e] is defined. If not, operation continues to step 525. Otherwise, operation jumps directly to step 530. Next, in step 525, the residue R[n[e]] for the current end state n[e] is set to $i[e]^{-1}R[p[e]]o[e]$. Then, in step 530, a determination is made whether the residue R[n[e]] is equal to the residue $i[e]^{-1}R[p[e]]o[e]$. If not, operation jumps to step 570. Otherwise, operation continues to step 535. Of course, it should be appreciated that, if step 530 is reached by step 525, the two residues compared in step 530 will inherently be equal and operation will continue to step 535.

In step 535, a determination is made whether the end state n[e] of the current edge e is a final state f. If so, operation continues to step 540. Otherwise, operation jumps directly to step 545. Then, in step 540, a determination is made whether the residue R[[e]] for the end state n[e] of the current edge e is equal to the empty string $\epsilon$. If not, operation again jumps to step 570. Otherwise, operation continues to step 545.

In step 545, a determination is made whether there are any unselected edges e' extending from the end state n[e] of the current edge e. If so, operation continues to step 550. Otherwise, operation jumps to step 555. In step 550, the current end state n[e] of the current edge is selected as the current state p[e]. Operation then returns to step 510. In step 555, a determination is made whether there are any unselected edges e' from the current state p[e]. If so, operation again returns to step 510. Otherwise, operation continues to step 560.

In step 560, a determination is made whether the current state p[e] is the initial state i. If not, operation continues to step 565. Otherwise, operation jumps to step 575. In step 565, the last selected edge e' leading to the current state p[e] is selected as the current edge e and the beginning state of the current edge is selected as the current state p[e]. Operation then returns to step 555.

In step 570, an indication is output that the finite-state transducer being analyzed does not meet the functional condition, that is, the second condition. Furthermore, in various exemplary embodiments where the transducer being analyzed is a composed transducer obtained by composing a base finite-state transducer with its inverse transducer, an indication is output that the base finite-state transducer is not functional. In this case, since the base finite-state transducer is not functional, it is not determinizable. In contrast, in step 575, an indication is output that the transducer being analyzed is functional. In various exemplary embodiments where the transducer being outlined is a composed finite-state transducer obtained by composing a base finite-state transducer with its inverse transducer, then a further indication is output that the base transducer is functional and meets a necessary, but insufficient, condition for determining whether the base finite-state transducer is determinizable. Operation then continues to step 580, where operation of the method ends.

FIGS. 43-46 outline one exemplary embodiment of a method for determining whether a weighted or unweighted finite-state transducer meets the residue conditions, that is, the third and fourth conditions. If the finite-state transducer being analyzed is a composed transducer obtained by composing a base finite-state transducer with its inverse transducer, then, if the transducer being analyzed meets the residue conditions, the base finite-state transducer meets necessary, but not sufficient, conditions for being determinizable.

As shown in FIGS. 43-46, beginning in step 600, operation of the method continues to step 605, where an initial state i is selected as a current state p[e]. Then, in step 610, the first or next edge e from the current state p[e] is selected as the current edge e. Then, in step 615, a determination is made whether the end state n[e] of the current edge e is cycle-accessible. If not, operation jumps to step 715. Otherwise, operation continues to step 620.

In step 620, the current residue R[n[e]] for the current end state n[e] of the current edge e is determined. Next, in step 625, a determination is made whether the current residue R[n[e]] is pure. If not, operation jumps to step 695. Otherwise, operation continues to step 630.

In step 630, a strongly connected component $S_p$ that contains the current state p[e] is determined. Next, in step 635, a strongly connected component $S_n$ that contains the current end state n[e] for the current edge e is determined. Next, in step 640, a determination is made whether the strongly connected components $S_p$ and $S_n$ are equal. If so, operation jumps to step 685. Otherwise, operation continues to step 645.

In step 645, a determination is made whether a first residue $R_1$[n[e]] for the current end state n[e] of the current edge e exists. If not, operation jumps to step 700. Otherwise, operation continues to step 650. In step 650, a determination is made whether a second residue $R_2$[n[e]] for the current end state n[e] of the current edge e exists. If so, operation continues to step 655. Otherwise, operation jumps to step 665.

Next, in step 655, the residues $R_1$[n[e]]$^{-1}R_2$[n[e]] and $R_1$[n[e]]$^{-1}$R[n[e]] are determined. Then, in step 660, a determination is made whether these residues determined in step 655 commute. If not, operation again jumps to step 695. In contrast, if these two residues do commute, operation jumps to step 700.

In contrast, in step 665, because the first residue exists but the second residue does not, a determination is made whether the first residue $R_1$[n[e]] equals the current residue R[n[e]]. If so, operation again jumps to step 700. Otherwise, operation continues to step 670. In step 670, a determination is made whether k is equal to 1. If not, operation again jumps to step 700. Otherwise, operation continues to step 675. In step 675, the second residue $R_2$[n[e]] for the current end state n[e] of the current edge e is set to the current residue R[n[e]]. Then, in step 680, the current state p[e] is set to the current end state n[e] and k is set to 2. Operation then returns to step 610.

In step 685, a determination is made whether the $k^{th}$ residue $R_k$[n[e]] for the current end state n[e] for the current edge e exists. If not, operation again jumps to step 700. Otherwise, operation continues to step 690. In step 690, a determination is made whether the $k^{th}$ residue $R_k$[n[e]] of the current end state n[e] for the current edge e is equal to the current residue R[n[e]]. If so, operation once again jumps to step 700. Otherwise, the finite-state transducer being analyzed fails the third condition and operation continues to step 695. In step 695, an indication is output that the transducer being analyzed does not meet one of the residue conditions, i.e., one of the third and fourth conditions, or is not pure. In various exemplary embodiments where the finite-state transducer being analyzed is a composed transducer obtained by composing a base finite-state transducer with its inverse finite-state transducer, a further indication that the base transducer does not have the twins property, and thus is not determinizable, can also be output. Operation then jumps to step 745.

In step 700, a determination is made whether the $k^{th}$ residue $R_k$[n[e]] for the current end state n[e] of the current edge e exists. If not, operation continues to step 705. Otherwise, operation jumps to step 715. In step 705, the $k^{th}$ residue $R_k$[n[e]] for the current end state n[e] of the current edge e is set to the value of the current residue R[n[e]]. Next, in step 710, the current state p[e] is set to the current end state n[e] of the current edge e. Operation then returns to step 610.

In contrast, in step 715, a determination is made whether there are any remaining edges extending from the current state p[e] to be checked. If so, operation again returns to step 610. Otherwise, operation continues to step 720. In step 720, a determination is made whether the current state p[e] is the initial state i. If not, operation continues to step 725. Otherwise, operation jumps to step 740.

In step 725, the beginning state p[e'] of the last selected edge e' whose end state n[e'] is the current state p[e] is selected as the new current edge e and the new current state p[e]. Then, in step 730, a determination is made whether the second residue $R_2$[n[e]] for the end state n[e] for the current edge e exists. If so, operation jumps back to step 715. Otherwise, operation continues to step 735, where k is reset to 1. Operation then again jumps back to step 715.

In step 740, an indication is output that the finite-state transducer being analyzed meets both of the residue conditions, that is, the third and fourth conditions. In various exemplary embodiments, if the finite-state transducer being analyzed is a composed transducer obtained by composing a base finite-state transducer with its inverse transducer, then the indication output can also indicate that the base transducer has the twins property and, assuming it is functional, is determinizable. In various other exemplary embodiments, for weighted finite-state transducers, assuming the weighted finite-state transducer also meets the first condition, then the indication output can also indicate that the weighted finite-state transducer has the twins property. Operation then continues to step 745, where the method ends.

Figure 47:
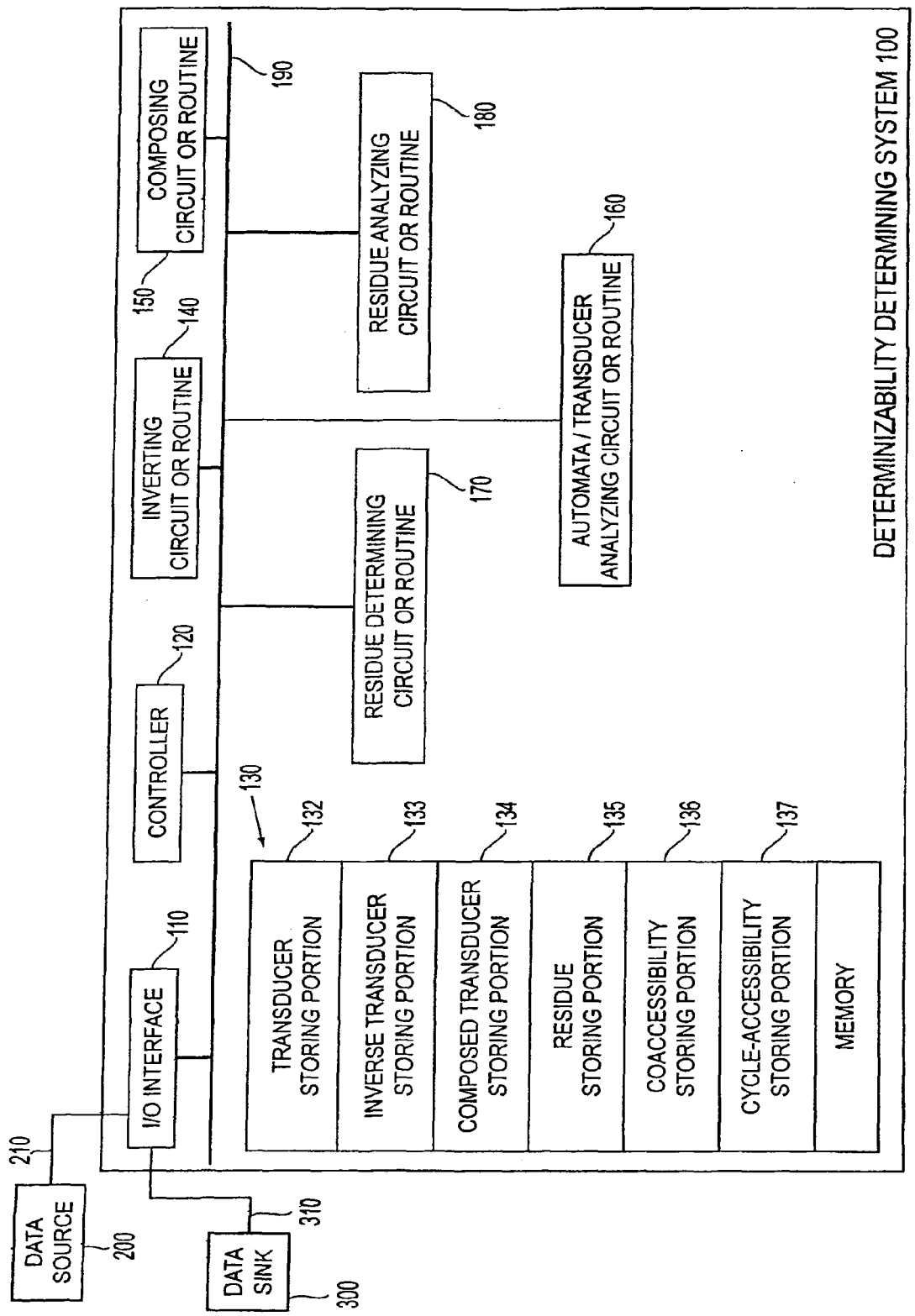
FIG. 47 is a block diagram outlining one exemplary embodiment of a determinizability determining system.

FIG. 47 is a block diagram of one exemplary embodiment of a determinizability determining system 100 usable to determine whether a particular finite-state automaton or transducer is determinizable. As shown in FIG. 47, the determinizability determining system 100 includes an input/output interface 110, a controller 120, a memory 130, an inverting circuit or routine 140, a composing circuit or routine 150, an automata or transducer analyzing circuit or routine 160, a residue determining circuit or routine 170, and a residue analyzing circuit or routine 180, each interconnected by control and/or databus 190.

A data source 200 is connected over a link 210 to the input/output interface 110, while a data sink 300 is connected over a link 310 to the input/output interface 110. The memory 130 can contain one or more functional portions usable to store particular types of data, including a transducer storing portion 132, an inverse transducer storing portion 133, a composed transducer storing portion 134, a residue storing portion 135, a coaccessibility storing portion 136, a cycle-accessibility storing portion 137 and the like.

The data source 200 can be used to supply a weighted finite-state automaton or a weighted or unweighted finite-state transducer to be analyzed to the determinizability determining system 110. The determinizability determining system 100 can output various types of indications to the data sink 300 over the link 310 indicating whether or not the weighted finite-state automaton or weighted or unweighted finite-state transducer to be analyzed is determinizable or not. It should be appreciated that the data source 200 and the data sink 300 can be integrated into a single device having a single link to the input/output interface 110.

The data source 200 can be a locally or remotely located computer, or any other known or later-developed device that is capable of generating and/or outputting the weighted finite-state automaton or weighted or unweighted finite-state transducer to be analyzed. Similarly, the data source 200 can be any suitable device or system that stores and/or transmits electronic data, such as a client or a server of a network. It should be appreciated that the data source 200 can be integrated into the determinizability determining system 100, such that the determinizability determining system 100 both creates and analyzes the transducer or automaton to be analyzed.

If the data source 200 is a distinct device, the link 210 connecting the data source 200 to the input/output interface 110 can be any known or later-developed device or system for connecting the data source 200 to the determinizability determining system 100, including a direct cable connection, a connection over a wide area network or a local area network, a connection over an intranet, a connection over the Internet, a connection over the public switched telephone system, or a connection over any other distributed processing network or system. It should further be appreciated that the link 210 connecting the data source 200 to the determinizability determining system 100 can include one or more wireless links. In general, the link 210 can be any known or later-developed connection system or structure usable to connect the data source 200 to the determinizability determining system 100.

In operation, a weighted finite-state automaton or a weighted or unweighted finite-state transducer, or, more generally, a "machine", to be analyzed by the determinizability determining system 100 is output by the data source 200 over the link 210 and input by the input/output interface 110. Under control of the controller 120, the machine input from the data source 200 through the input/output interface 110 is stored into the transducer storing portion 132 of the memory 130. Next, the inverting circuit or routine 140 inputs the machine stored in the transducer storing portion 132 and generates the inverse machine. Under control of the controller 120, the inverse machine generated by the inverting circuit or routine 140 is stored in the inverse transducer storing portion 133.

The composing circuit or routine 150, under control of the controller 120, inputs the machines stored in the transducer and inverse transducer storing portions 132 and 133. In various exemplary embodiments, where the machines are weighted finite-state automata, the composing circuit or routine 150 generates an intersection machine obtained by finding the intersection between the weighted finite-state automaton and the corresponding inverse weighted finite-state automaton. This intersection weighted finite-state automaton is then stored, under control of the controller 120, in the composed transducer storing portion 134.

Alternatively or additionally, in various other exemplary embodiments, the composing circuit or routine 150, when the machines are weighted or unweighted finite-state transducer and the corresponding inverse weighted or unweighted finite-state transducer, the composing circuit or routine 150 also or instead generates a composed transducer. The composed transducer is then stored, under control of the controller 120, in the composed transducer storing portion 134.

The automata/transducer analyzing circuit or routine 160 then inputs either or both of the intersection automaton or the composed transducer and analyzes these machines to determine for weighted machines if the cycle-accessibility, or first condition, is met, and for weighted or unweighted transducers, determines if the functionality and residue conditions, that is, the second, third and fourth conditions, are met. Additionally, when the determinizability determining system 100 is analyzing a finite-state transducer, the residue determining circuit or routine 170 is used, under control of the controller 120, to determine the residues to be used in determining if the composed transducer meets the second, third or fourth conditions. Similarly, the residue analyzing circuit or routine 180 is used, under control of the controller 120, to compare or otherwise analyze the residues generated by the residue determining circuit or routine 170 to determine if the generated residues meet the second, third or fourth conditions, as appropriate.

Figure 48:
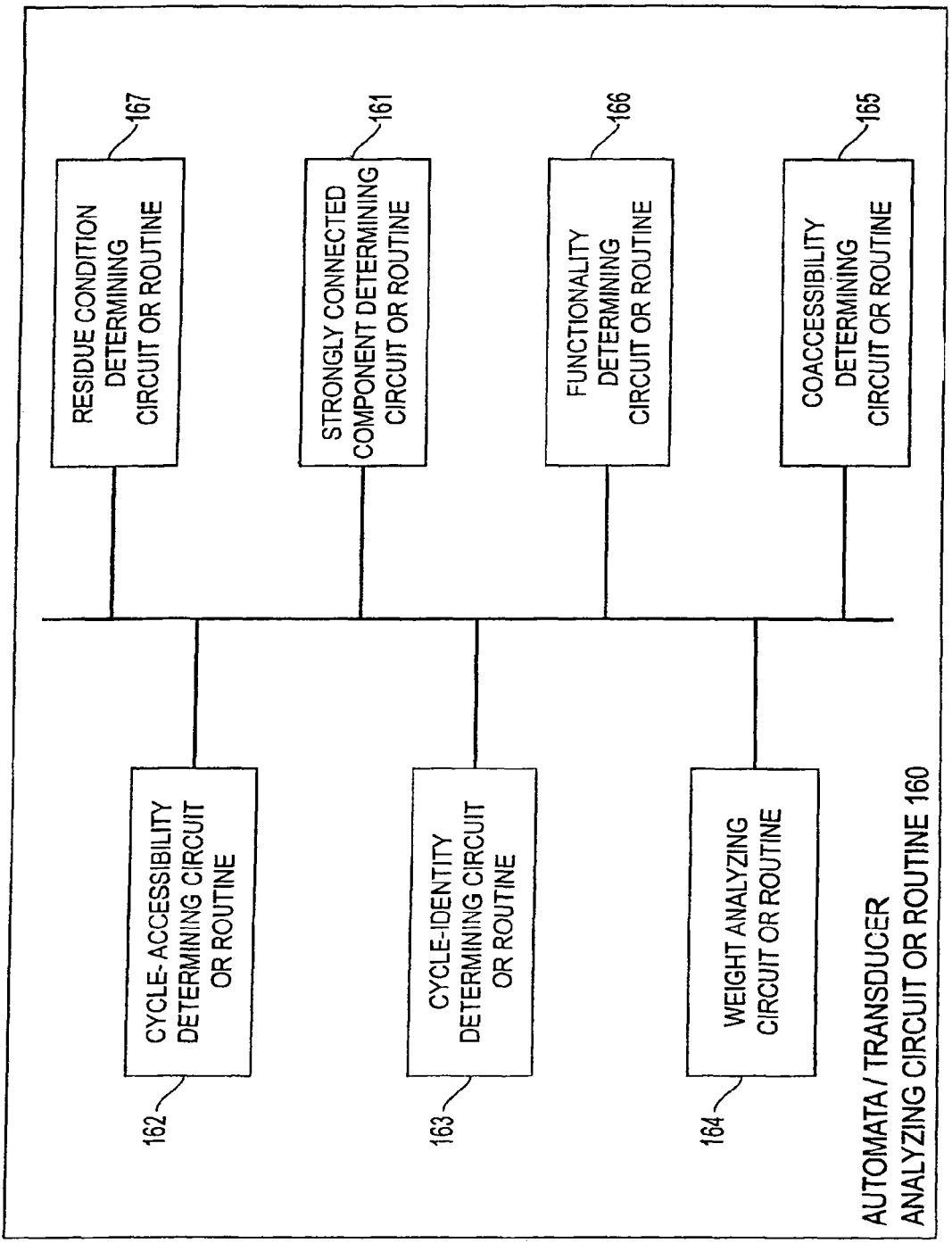
FIG. 48 is a block diagram outlining in greater detail one exemplary embodiment of the automata/transducers analyzing circuit or routine.

FIG. 48 shows in greater detail one exemplary embodiment of the automata or transducer analyzing circuit or routine 160. As shown in FIG. 48, the automata or transducer analyzing circuit or routine 160 comprises a strongly connected component determining circuit or routine 161, a cycle-accessibility determining circuit or routine 162, a cycle-identity determining circuit or routine 163, a weight analyzing circuit or routine 164, a coaccessibility determining circuit or routine 165, a functionality determining circuit or routine 166, and a residue condition determining circuit or routine 167.

In operation, the automata or transducer analyzing circuit or routine 160 inputs the intersection automata or transducer and/or the composed transducer. The finite-state automata or finite-state transducer analyzing circuit or routine 160 first determines whether the machine to be analyzed is a weighted finite-state automata, an unweighted finite-state transducer, or a weighted finite-state transducer. If the machine to be analyzed is a weighted finite-state automaton, only the strongly connected component determining circuit or routine 161, the cycle-identity determining circuit or routine 163 and the weight analyzing circuit or routine 164 are activated to test for the first, or cycle-identity, condition.

In contrast, if the machine to be analyzed is an unweighted finite-state transducer, only the cycle-accessibility determining circuit or routine 162, the coaccessibility determining circuit or routine 165, the functionality determining circuit or routine 166 and the residue condition determining circuit or routine 167 are activated to test for the second condition, to determine the set of cycle-accessible states for the third and fourth conditions and to test for the third and fourth conditions. If the input machine is a weighted finite-state transducer, then all of the elements of the finite-state automata or finite-state transducer analyzing circuit or routine 160 are activated.

For weighted finite-state automata or transducers, the strongly connected component determining circuit or routine 161 analyzes the input machine to identify the strongly connected components. Next, the cycle-identity determining circuit or routine 163 inputs each determined strongly connected component and begins a depth-first search through that strongly connected component. The weight analyzing circuit or routine 164 determines the various weights at each state of the depth-first search. The cycle-identity determining circuit or routine 163 inputs the determine weights from the weight analyzing circuit or routine 164 and compares them to determine if the first condition is met.

If the cycle-identity determining circuit or routine 163 determines that the first, or cycle-identity, condition is met for a weighted finite-state automaton, the finite-state automata or finite-state transducer analyzing circuit or routine 163 outputs an indication to the controller 120 that the analyzed weighted finite-state automaton has the twins property and is thus determinizable. In contrast, if the machine being analyzed is a weighted finite-state transducer, then the finite-state automata or finite-state transducer analyzed circuit or routine 160 outputs an indication to the controller 120 that the first condition is met. In this case, under control of the controller 120, the finite-state automata or finite-state transducer analyzed circuit or routine 160 activates the coaccessibility determining circuit or routine 165. In contrast, if at any time the cycle-identity determining circuit or routine 163 determines that the first, or cycle-identity, condition is not met, the finite-state automata or finite-state transducer analyzing circuit or routine 160 immediately outputs an indication to the controller 120 that the weighted finite-state automaton being analyzed does not have the cycle-identity condition.

The coaccessibility determining circuit or routine 165 determines the set of coaccessible states within the weighted or unweighted finite-state transducer being analyzed. Then, the functionality determining circuit or routine 166 inputs each edge using a depth-first search for each edge. The functionality determining circuit or routine 166 determines if the residue for the end state of that edge has been defined. If not, the functionality determining circuit or routine 166 interacts with the residue determining circuit 170 to obtain the appropriate residue. Then, the functionality determining circuit or routine 166 interacts with the residue analyzing circuit or routine 180 to compare the residues as outlined above for the functionality condition. Based on the results of the comparisons obtained by the residue analyzing circuit or routine 180 and output to the functionality determining circuit or routine 166, the functionality determining circuit or routine 166 determines whether second condition has been met or violated.

If the functionality determining circuit or routine 166 determines that the second, or functionality, condition is met for a weighted or unweighted finite-state transducer, the finite-state automata or finite-state transducer analyzing circuit or routine 160 outputs an indication to the controller 120 that the analyzed weighted or unweighted finite-state transducer meets the second condition and thus may be determinizable. In contrast if at any time the functionality determining circuit or routine 166 determines that the second, or functionality, condition is not met for a weighted or unweighted finite-state transducer, the finite-state automata or finite-state transducer analyzing circuit or routine 160 immediately outputs an indication to the controller 120 that the finite-state transducer being analyzed is not functional.

Similarly, for weighted or unweighted finite-state transducers, the cycle-accessibility determining circuit or routine 162 identifies the set of states that are cycle-accessible. Then, the residue condition determining circuit or routine 167 selects each edge having a cycle-accessible end state in turn, using a depth-first search. As each edge is selected, the residue condition determining circuit or routine 167 interacts with the residue determining circuit or routine 170 to determine the appropriate residue and with the residue analyzing circuit or routine 180 to determine if the determined residue is pure, and to perform the various residue comparisons and analyses outlined above with respect to the third and fourth conditions. Based on the results of these analyses, the residue conditions determining circuit or routine 167 determines, for each edge, whether the purity condition or one of the third or fourth, or residue, conditions are violated.

If so, the finite-state automata or finite-state transducer analyzing circuit or routine 160 immediately outputs an indication to the controller 120 that the finite-state transducer being analyzed does not have the twins property. In contrast, once the weighted or unweighted finite-state transducer is fully analyzed, if the residue condition determining circuit or routine 167 determines that the third and fourth conditions are met for a weighted or unweighted finite-state transducer, the finite-state automata or finite-state transducer analyzing circuit or routine 160 outputs an indication to the controller 120 that the analyzed weighted or unweighted finite-state transducer meets the residue conditions and thus may be determinizable.

The controller 120, based on these outputs, determines if the particular input machine being analyzed meets all of the necessary conditions for that machine to be determinizable. If so, the controller 120 outputs an indication over the signal line 310 to the data sink 300 that the input machine has the twins property and thus is determinizable. In contrast, as soon as any of the appropriate conditions are not met for a particular input machine and the finite-state automata or finite-state transducer analyzing circuit or routine 160 outputs an indication of that, the controller 120 outputs an indication over the link 310 to the data sink 300 that the particular input machine is not determinizable.

It should be appreciated that the determinizability determining system 100 is, in various exemplary embodiments, implemented on a programmed general-purpose computer. However, the determinizability determining system 100 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing one or more of the flowcharts shown in FIGS. 37-46, can be used to implement the determinizability determining system 100.

It should be understood that each of the circuits shown in FIGS. 47 and 48 can be implemented as portions of a suitably programmed general-purpose computer. Alternatively, each of the circuits shown in FIGS. 47 and 48 can be implemented as physically distinct hardware circuits within an ASIC, or using a FPGA, a PLD, a PLA or a PAL, or using discrete logic elements or discrete circuit elements. The particular form each of the circuits shown in FIGS. 47 and 48 will take is a design choice and will be obvious and predictable to those skilled in the art.

It should be appreciated that the memory 130 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for determining if a first weighted finite-state transducer is determinizable, comprising:

determining an inverse weighted finite-state transducer from the first weighted finite-state transducer;

composing the first weighted finite-state transducer and the inverse weighted finite-state transducer to form a composed weighted finite-state transducer;

determining, via a controller, if the composed weighted finite-state transducer meets a cycle-identity condition;

wherein, if the composed weighted finite-state transducer does not meet the cycle-identity condition, the first weighted finite-state transducer is not determinizable; and providing an output indicative of whether the first weighted finite-state transducer is determinizable.

2. The method of claim 1, wherein determining if the composed weighted finite-state transducer meets the cycle-identity condition comprises:
 (a) identifying all strongly connected components in the composed weighted finite-state transducer;
 (b) selecting one of the identified strongly connected component as a current strongly connected component;
 (c) identifying all transitions in the current strongly connected component;
 (d) selecting a first transition of the current strongly connected component;
 (e) determining a weight of an end state of a last transition of the current strongly connected component; and
 (f) determining at least one of:
  if the weight of the end state of the last transition of the current strongly connected component is equal to an identity value of a multiplicative operator of the weighted finite-state transducer; and
  if the weight of the end state of the last transition of the current strongly connected component is equal to the weight of a beginning state of the first transition;
  wherein, if the weight of the end state of the last transition of the current strongly connected component is not equal to the identity value of the multiplicative operator of the weighted finite-state transducer or if the weight of the end state of the last transition of the current strongly connected component is not equal to the weight of the beginning state of the first transition, the weighted finite-state transducer is not determinizable.

3. The method of claim 2, wherein determining the weight of the end state of the last transition of the current strongly connected component comprises:
 selecting a first transition as a current transition;
 determining a multiplicative product of a weight of a beginning state of the current transition of the current strongly connected component and a weight of the current transition;
 setting the weight of an end state of the current transition to the multiplicative product, wherein the end state of the current transition is the beginning state of a next transition of the current strongly connected component; and
 repeating the multiplicative product determining and weight setting steps using the next transition as the current transition until the end state of the current transition is the beginning state of the first transition.

4. The method of claim 2, further comprising, if the weight of the end state of the last transition of the current strongly connected component is equal to the identity value of the multiplicative operator of the weighted finite-state transducer and the weight of the end state of the last transition of the current strongly connected component is equal to the weight of the beginning state of the first transition of the current strongly connected component, repeating steps (b)-(f) until all strongly connected components have been selected as the current strongly connected component, wherein, for each identified strongly connected component, if the weight of the end state of the last transition of that strongly connected component is equal to the identity value of the multiplicative operator of the weighted finite-state transducer and is equal to the weight of the beginning state of the first transition that strongly connected component, the intersection weighted finite-state transducer meets the cycle-identity condition.

5. The method of claim 1, wherein determining if the composed weighted finite-state transducer meets the cycle-identity condition comprises:
 (a) identifying all strongly connected components in the composed weighted finite-state transducer;
 (b) selecting one of the identified strongly connected components that has not been selected as a current strongly connected component;
 (c) selecting a start state of the selected strongly connected component as a current state;
 (d) setting the weight of the selected start state to the identity value of a multiplicative operator of the first weighted finite-state transducer;
 (e) selecting a transition from the current state that has not yet been selected as the current transition;
 (f) determining if a weight of the end state is defined;
 (g) if the weight of the end state is not defined, defining the weight of the end state as the multiplicative product of the weight of the current state and a weight of the current transition;
 (h) determining if the weight of the end state is equal to the multiplicative product of the weight of the current state and the weight of the current transition, wherein, if the weight of the end state is not equal to the multiplicative product of the weight of the current state and the weight of the current transition, the first weighted finite-state transducer is not determinizable;
 (i) if the weight of the end state is equal to the multiplicative product of the weight of the current state and the weight of the current transition, determining if an end state of the current transition is the start state;
 (i1) if the end state is not the start state, (j) selecting the end state of the current transition as the current state and returning to step (e);
 (i2) if the end state is the start state, (k) determining if there is a transition from the current state to another state of the current strongly connected component that has not yet been selected;
 (k1) if there is a transition from the current state to another state of the current strongly connected component that has not yet been selected, returning to step (e);
 (k2) if there is not a transition from the current state to another state of the current strongly connected component that has not yet been selected, (l) determining if the beginning state of the current transition is the start state;
 (l1) if the current state is not the start state, (m) selecting the last selected transition whose end state is the current state and returning to step (j);
 (l2) if the current state is the start state, (n) determining if all transitions from the start state have been selected;
 (n1) if all transitions from the start state have not been selected, (o) returning to step (e);
 (n2) if all transitions from the start state have been selected, (p) determining if all strongly connected components have been selected, wherein, if all strongly connected components have been selected, the first weighted finite-state transducer has the cycle-identity condition; and
 (q) if all strongly connected components have not been selected, returning to step (b).

6. The method of claim 1, further comprising:
 determining if the first weighted finite-state transducer is trim; and
 if not, converting the first weighted finite-state transducer into an equivalent trim weighted finite-state transducer, wherein the trim weighted finite-state transducer is used in place of the first weighted finite-state transducer in the inverse weighted finite-state transducer determining step and the intersecting step.

7. The method of claim 1, further comprising, when the intersection weighted finite-state transducer meets the cycle-identity condition, determining if the first weighted finite-state transducer is functional, wherein, if the first weighted finite-state transducer is not functional, the first weighted finite-state transducer is not determinizable.

8. The method of claim 7, wherein determining if the first weighted finite-state transducer is functional comprises:
composing the first weighted finite-state transducer with the inverse finite-state transducer to generate a composed finite-state transducer; and
determining if the composed finite-state transducer is equal to the identity function over the domain of that composed finite-state transducer.

9. The method of claim 8, wherein determining if the composed finite-state transducer is equal to the identity function over the domain of that composed finite-state transducer comprises:
determining all successful paths in the composed finite-state transducer; and
determining, for each successful path, if the input string of that successful path is equal to the output string of that successful path;
wherein, if the input string of that successful path is equal to the output string of that successful path for all successful paths, the composed finite-state transducer is equal to the identity function over the domain of that composed finite-state transducer.

10. The method of claim 8, wherein determining if the composed finite-state transducer is equal to the identity function over the domain of that composed finite-state transducer comprises:
determining all successful paths in the composed finite-state transducer; and
determining, for each successful path, if the residue for that successful path is equal to zero;
wherein, if the residue for that successful path is equal to zero for all successful paths, the composed finite-state transducer is equal to the identity function over the domain of that composed finite-state transducer.

11. The method of claim 8, wherein determining if the composed finite-state transducer is equal to the identity function over the domain of that composed finite-state transducer comprises:
(a) selecting an initial state of the composed finite-state transducer as a current state;
(b) selecting a transition from the current state that has not been selected as a current transition;
(c) determining if an end state of the current transition is coaccessible;
(d) if the end state of the current transition is coaccessible, determining whether a residue for the end state of the current transition has been defined;
(e) if the residue for the end state of the current transition e has not been defined, defining the residue for the current end state as $i[e]^{-1} R [p[e]] o[e]$, where $i[e]$ is the input symbol of the current transition e, $R[p[e]]$ is the residue of the beginning state of the current transition e and $o[e]$ is the output symbol of the current transition e;
(f) determining if the residue for the end state of the current transition is equal to $i[e]^{-1} R[p[e]] o[e]$, wherein, if the residue for the end state of the current transition is not equal to $i[p[e]]^{-1} R[p[e]] o[e]$, the first weighted finite-state transducer is not determinizable;
(g) if the residue for the end state of the current transition is equal to $i[e]^{-1} R[p[e]] o[e]$, determining if the end state of the current transition is a final state;
(h) if the end state of the current transition is a final state, determining if the residue of the end state of the current transition is equal to the empty string, wherein, if the residue of the end state of the current transition is not equal to the empty string, the first weighted finite-state transducer is not determinizable;
(i) if the end state of the current transition is not a final state or if the residue of the end state of the current transition is equal to the empty string, determining if there are any unselected transitions from the end state of the current transition;
(j) if there are any unselected transitions from the end state of the current transition, selecting the end state of the current transition as the current state and returning to step (b);
(k) if there are no unselected transitions from the end state of the current transition or the end state of the current transition is not coaccessible, (l) determining if there are any unselected transitions from the current state;
(l1) if there are any unselected transitions from the current state, (m) returning to step (b);
(l2) if there are no unselected transitions from the current state, (n) determining if the current state is the initial state, wherein, if the current state is the initial state, the first weighted finite-state transducer is functional; and
(o) if the current state is not the initial state, selecting the last selected transition whose end state is the current state and returning to step (l).

12. The method of claim 7, further comprising, when the first weighted finite-state transducer is functional, determining if, for the composed weighted finite-state transducer, a residue purity condition holds for any transition in the composed weighted finite-state transducer that has an end state that is cycle-accessible.

13. The method of claim 12, wherein, if the residue purity condition does not hold for any transition in the composed weighted finite-state transducer that has an end state that is cycle-accessible, the first weighted finite-state transducer is not determinizable.

14. The method of claim 7, further comprising, when the first weighted finite-state transducer is functional, determining if, for the composed weighted finite-state transducer and for any path $\pi$ from an initial state of the composed finite-state transducer to a strongly connected component c of the composed finite-state transducer, the residue $<\pi>$ of the path $\pi$ is equal to the residue $<\pi c>$ of the concatenated path $\pi c$.

15. The method of claim 14, wherein, if the residue $<\pi>$ of the path $\pi$ is not equal to the residue $<\pi c>$ of the concatenated path $\pi c$ for any path $\pi$ in the composed weighted finite-state transducer that is cycle-accessible, the first weighted finite-state transducer is not determinizable.

16. The method of claim 7, further comprising, when the first weighted finite-state transducer is functional, determining if, for the composed weighted finite-state transducer, at least one of a first residue condition and a second residue condition holds for every transition in the composed weighted finite-state transducer that has an end state that is cycle-accessible.

17. The method of claim 16, wherein the first residue condition is, for a non-empty strongly connected component of the composed weighted finite-state transducer that has three paths $\pi_1$, $\pi_2$ and $\pi$, each having distinct residues, that, leading from an initial state to that strongly connected component, the residue of the residue of path $\pi_1$ and the residue of the path π commutes with the residue of the residue of the path $\pi_1$ and the residue of the path $\pi_2$.

18. The method of claim 16, wherein the second residue condition is that, for three paths $\pi_1$, $\pi_2$, and $\pi_3$ in that composed finite-state transducer that lead from the initial state to the same cycle-accessible state, the residue of the residue of the path $\pi_1$ and the residue of the path $\pi_2$ commute with the residue of the residue of the path $\pi_1$ and the residue of the path $\pi_3$.

19. The method of claim 16, wherein determining if the first residue condition holds for a transition in the composed weighted finite-state transducer comprises:
   determining if a strongly connected component that contains an end state of that transition is equal to a strongly connected component that contains a beginning state of that transition; and
   determining if a residue for the end state is equal to a residue for the beginning state concatenated with that transition.

20. The method of claim 16, wherein determining if the second residue condition holds for a transition in the composed weighted finite-state transducer comprises:
   determining if a residue of a first residue for the end state of that transition and a second residue for the end state of that transition commutes with a residue of the first residue for the end state of that transition and a third residue for the end state of that transition.

21. The method of claim 16, wherein determining, for the composed weighted finite-state transducer, if at least one of a first residue condition and a second residue condition holds for any transition in the composed weighted finite-state transducer that has an end state that is cycle-accessible, comprises:
   (a) selecting the initial state of the composed weighted finite-state transducer as the current state;
   (b) selecting a transition extending from the current state that has an end state that is cycle-accessible and that has not previously been selected as a current transition;
   (c) determining a current residue for an end state of the current transition; and
   (d) determining if the current residue is pure, wherein, if the current residue is not pure, the weighted finite-state transducer is not determinizable.

22. The method of claim 21, further comprising:
   (e) determining if a first strongly connected component containing a beginning state of the current transition and a second strongly connected component containing the end state of the current transition are equivalent;
   (e1) if the first and second strongly connected components are not equivalent, (f) determining if a first residue for the end state of the current transition has been defined;
   (f1) if the first residue for the end state of the current transition has been defined, (g) determining if a second residue for the end state of the current transition has been defined;
   (g1) if the second residue for the end state of the current transition has been defined, (h) determining a third residue of the first residue for the end state of the current transition and the current residue and a fourth residue of the first residue for the end state of the current transition and the second residue for the end state of the current transition; and
   (i) determining if the third and fourth residues commute, wherein, if the third and fourth residues do not commute, the weighted finite-state transducer is not determinizable.

23. The method of claim 22, further comprising:
   (g2) if the second residue for the end state of the current transition has not been defined, (j) determining if the first residue for the end state of the current transition is equal to the current residue;
   (j1) if the first residue for the end state of the current transition is not equal to the current residue, (k) determining if only the first residue for the end state of the current transition has been defined;
   (k1) if only the first residue for the end state of the current transition has been defined, (l) defining the second residue for the end state of the current transition as the current residue; and
   (m) repeating the method beginning with step (b) using the end state of the current transition as the current state.

24. The method of claim 23, further comprising:
   (k2) if more than the first residue for the end state of the current transition has been defined, (n) determining if a kth residue for the end state of the current transition has been defined;
   (n1) if the kth residue for the end state of the current transition has not been defined, (o) defining the kth residue for the end state of the current transition as the current residue; and
   (p) repeating the method beginning with step (b) using the end state of the current transition as the current state.

25. The method of claim 24, further comprising:
   (n2) if the kth residue for the end state of the current transition has been defined, (q) determining if there are any unselected transitions extending from the current state;
   (q1) if there are any unselected transitions extending from the current state, (r) repeating the method beginning with step (b);
   (q2) if there are no unselected transitions extending from the current state, (s) determining if the current state is the initial state, wherein, if the current state is the start state, every transition in the composed finite-state transducer whose end state is cycle-accessible meets one of the first and second residue conditions;
   (t) if the current state is not the initial state, selecting a most-recently-selected edge whose end state is the current state as the current transition and a beginning state of the current transition as the current state; and
   (u) returning to step (q).

26. The method of claim 23, further comprising:
   (j2) if the first residue for the end state of the current transition is equal to the current residue, (n) determining if a kth residue for the end state of the current transition has been defined;
   (n1) if the kth residue for the end state of the current transition has not been defined, (o) defining the kth residue for the end state of the current transition as the current residue; and
   (p) repeating the method beginning with step (b) using the end state of the current transition as the current state.

27. The method of claim 26, further comprising:
   (n2) if the kth residue for the end state of the current transition has been defined, (q) determining if there are any unselected transitions extending from the current state;
   (q1) if there are any unselected transitions extending from the current state, (r) repeating the method beginning with step (b);
   (q2) if there are no unselected transitions extending from the current state, (s) determining if the current state is the initial state, wherein, if the current state is the start state, every transition in the composed finite-state transducer whose end state is cycle-accessible meets one of the first and second residue conditions;

(t) if the current state is not the initial state, selecting a most-recently-selected edge whose end state is the current state as the current transition and a beginning state of the current transition as the current state; and (u) returning to step (q).

28. The method of claim 22, further comprising:

(i1) if the third and fourth residues commute, (j) determining if a kth residue for the end state of the current transition has been defined;

(j1) if the kth residue for the end state of the current transition has not been defined, (k) defining the kth residue for the end state of the current transition as the current residue; and (m) repeating the method beginning with step (b) using the end state of the current transition as the current state.

29. The method of claim 28, further comprising:

(j2) if the kth residue for the end state of the current transition has been defined, (n) determining if there are any unselected transitions extending from the current state;

(n1) if there are any unselected transitions extending from the current state, repeating the method beginning with step (b);

(n2) if there are no unselected transitions extending from the current state, (o) determining if the current state is the initial state, wherein, if the current state is the start state, every transition in the composed finite-state transducer whose end state is cycle-accessible meets one of the first and second residue conditions;

(p) if the current state is not the initial state, selecting a most-recently-selected edge whose end state is the current state as the current transition and a beginning state of the current transition as the current state;

(q) returning to step (n).

30. The method of claim 22, further comprising:

(f2) if the first residue for the end state of the current transition has not been defined, (j) determining if a kth residue for the end state of the current transition has been defined;

(j1) if the kth residue for the end state of the current transition has not been defined, (k) defining the kth residue for the end state of the current transition as the current residue; and (l) repeating the method beginning with step (b) using the end state of the current transition as the current state.

31. The method of claim 30, further comprising:

(j2) if the kth residue for the end state of the current transition has been defined, (m) determining if there are any unselected transitions extending from the current state;

(m1) if there are any unselected transitions extending from the current state, (n) repeating the method beginning with step (b);

(m2) if there are no unselected transitions extending from the current state, (o) determining if the current state is the initial state, wherein, if the current state is the start state, every transition in the composed finite-state transducer whose end state is cycle-accessible meets one of the first and second residue conditions;

(p) if the current state is not the initial state, selecting a most-recently-selected edge whose end state is the current state as the current transition and a beginning state of the current transition as the current state; and (q) returning to step (m).

32. The method of claim 22, further comprising:

(e2) if the first and second strongly connected components are equivalent, (j) determining if a kth residue for the end state of the current transition has been defined;

(j1) if the kth residue for the end state of the current transition has not been defined, (k) defining the kth residue for the end state of the current transition as the current residue; and (l) repeating the method beginning with step (b) using the end state of the current transition as the current state.

33. The method of claim 32, further comprising, (j2) if the kth residue for the end state of the current transition has been defined, (m) determining if the kth residue for the end state of the current transition is equal to the current residue, wherein, if the kth residue for the end state of the current transition is not equal to the current residue, the weighted finite-state transducer is not determinizable.

34. The method of claim 32, further comprising:

(j2) if the kth residue for the end state of the current transition has been defined, (m) determining if the kth residue for the end state of the current transition is equal to the current residue;

(m1) if the kth residue for the end state of the current transition is equal to the current residue, (n) determining if there are any unselected transitions extending from the current state;

(n1) if there are any unselected transitions extending from the current state, (o) repeating the method beginning with step (b); and (n2) if there are no unselected transitions extending from the current state, (p) determining if the current state is the initial state, wherein, if the current state is the start state, every transition in the composed finite-state transducer whose end state is cycle-accessible meets one of the first and second residue conditions.

35. The method of claim 34, further comprising:

(q) if the current state is not the initial state, selecting a most-recently-selected edge whose end state is the current state as the current transition and a beginning state of the current transition as the current state;

(r) returning to step (n).

36. A method for determining if a first weighted finite-state automaton is determinizable, comprising:

determining an inverse weighted finite-state automaton from the first weighted finite-state automaton;

intersecting the first weighted finite-state automaton and the inverse weighted finite-state automaton to form an intersection weighted finite-state automaton;

determining, via a controller, if the intersection weighted finite-state automaton meets a cycle-identity condition;

wherein, if the intersection weighted finite-state automaton does not meet the cycle-identity condition, the first weighted finite-state automaton is not determinizable; and providing an output indicative of whether the first weighted finite-state automaton is determinizable.

37. The method of claim 36, wherein determining if the intersection weighted finite-state automaton meets the cycle-identity condition comprises (a) identifying all strongly connected components in the intersection weighted finite-state automaton;

(b) selecting one of the identified strongly connected component as a current strongly connected component;

(c) identifying all transitions in the current strongly connected component;

(d) selecting a first transition of the current strongly connected component;

(e) determining a weight of an end state of a last transition of the current strongly connected component; and
(f) determining at least one of:
if the weight of the end state of the last transition of the current strongly connected component is equal to an identity value of a multiplicative operator of the weighted finite-state automaton; and
if the weight of the end state of the last transition of the current strongly connected component is equal to the weight of a beginning state of the first transition;
wherein, if the weight of the end state of the last transition of the current strongly connected component is not equal to the identity value of the multiplicative operator of the weighted finite-state automaton or if the weight of the end state of the last transition of the current strongly connected component is not equal to the weight of the beginning state of the first transition, the weighted finite-state automaton is not determinizable.

38. The method of claim 37, wherein determining the weight of the end state of the last transition of the current strongly connected component comprises:
selecting a first transition as a current transition;
determining a multiplicative product of a weight of a beginning state of the current transition of the current strongly connected component and a weight of the current transition;
setting the weight of an end state of the current transition to the multiplicative product, wherein the end state of the current transition is the beginning state of a next transition of the current strongly connected component; and
repeating the multiplicative product determining and weight setting steps using the next transition as the current transition until the end state of the current transition is the beginning state of the first transition.

39. The method of claim 37, further comprising, if the weight of the end state of the last transition of the current strongly connected component is equal to the identity value of the multiplicative operator of the weighted finite-state automaton and the weight of the end state of the last transition of the current strongly connected component is equal to the weight of the beginning state of the first transition of the current strongly connected component, repeating steps (b)-(f) until all strongly connected components have been selected as the current strongly connected component, wherein, for each identified strongly connected component, if the weight of the end state of the last transition of that strongly connected component is equal to the identity value of the multiplicative operator of the weighted finite-state automaton and is equal to the weight of the beginning state of the first transition of that strongly connected component, the weighted finite-state automaton is determinizable.

40. The method of claim 36, wherein determining if the intersection weighted finite-state automaton meets the cycle-identity condition comprises
(a) identifying all strongly connected components in the intersection weighted finite-state automaton;
(b) selecting one of the identified strongly connected component that has not been selected as a current strongly connected component;
(c) selecting a start state of the selected strongly connected component as a current state;
(d) setting the weight of the selected start state to the identity value of a multiplicative operator of the first weighted finite-state automaton;
(e) selecting a transition from the current state that has not yet been selected as the current transition;
(f) determining if a weight of the end state is defined;
(g) if the weight of the end state is not defined, defining the weight of the end state as the multiplicative product of the weight of the current state and a weight of the current transition;
(h) determining if the weight of the end state is equal to the multiplicative product of the weight of the current state and the weight of the current transition, wherein, if the weight of the end state is not equal to the multiplicative product of the weight of the current state and the weight of the current transition, the first weighted finite-state automaton is not determinizable;
(i) if the weight of the end state is equal to the multiplicative product of the weight of the current state and the weight of the current transition, determining if an end state of the current transition is the start state;
(i1) if the end state is not the start state, (j) selecting the end state of the current transition as the current state and returning to step (e);
(i2) if the end state is the start state, (k) determining if there is a transition from the current state to another state of the current strongly connected component that has not yet been selected;
(k1) if there is a transition from the current state to another state of the current strongly connected component that has not yet been selected, (l) returning to step (e);
(k2) if there is not a transition from the current state to another state of the current strongly connected component that has not yet been selected, (m) determining if the beginning state of the current transition is the start state;
(m1) if the current state is not the start state, (n) selecting the last selected transition whose end state is the current state and returning to step (k);
(m2) if the current state is the start state, (o) determining if all transitions from the start state have been selected;
(o1) if all transitions from the start state have not been selected, (p) returning to step (e);
(o2) if all transitions from the start state have been selected, (q) determining if all strongly connected components have been selected, wherein, if all strongly connected components have been selected, the first weighted finite-state automaton is determinizable; and
(r) if all strongly connected components have not been selected, returning to step (b).

41. The method of claim 36, further comprising:
determining if the first weighted finite-state automaton is trim; and
if not, converting the first weighted finite-state automaton into an equivalent trim weighted finite-state automaton, wherein the trim weighted finite-state automaton is used in place of the first weighted finite-state automaton in the inverse weighted finite-state automaton determining step and the intersecting step.

42. A method for determining if a first finite-state transducer is determinizable, comprising:
determining, via a controller, if the first finite-state transducer is functional, wherein, if the first finite-state transducer is not functional, the first finite-state transducer is not determinizable; and
providing an output indicative of whether the first finite-state transducer is determinizable.

43. The method of claim 42, wherein determining if the first finite-state transducer is functional comprises:
composing the first finite-state transducer with the inverse finite-state transducer to generate a composed finite-state transducer; and determining if the composed finite-state transducer is equal to the identity function over the domain of that composed finite-state transducer.

44. The method of claim 43, wherein determining if the composed finite-state transducer is equal to the identity function over the domain of that composed finite-state transducer comprises:

determining all successful paths in the composed finite-state transducer; and determining, for each successful path, if the input string of that successful path is equal to the output string of that successful path;

wherein, if the input string of that successful path is equal to the output string of that successful path for all successful paths, the composed finite-state transducer is equal to the identity function over the domain of that composed finite-state transducer.

45. The method of claim 43, wherein determining if the composed finite-state transducer is equal to the identity function over the domain of that composed finite-state transducer comprises:

determining all successful paths in the composed finite-state transducer; and determining, for each successful path, if the residue for that successful path is equal to the empty string;

wherein, if the residue for that successful path is equal to the empty string for all successful paths, the composed finite-state transducer is equal to the identity function over the domain of that composed finite-state transducer.

46. The method of claim 43, wherein determining if the composed finite-state transducer is equal to the identity function over the domain of that composed finite-state transducer comprises:

(a) selecting an initial state of the composed finite-state transducer as a current state;

(b) selecting a transition from the current state that has not been selected as a current transition;

(c) determining if an end state of the current transition is coaccessible;

(d) if the end state of the current transition is coaccessible, determining whether a residue for the end state of the current transition has been defined;

(e) if the residue for the end state of the current transition e has not been defined, defining the residue for the current end state as $i[e]^{-1} R[p[e]] o[e]$, where $i[e]$ is the input symbol of the current transition e, $R[p[e]]$ is the residue of the beginning state of the current transition e and $o[e]$ is the output symbol of the current transition e;

(f) determining if the residue for the end state of the current transition is equal to $i[e]^{-1} R[p[e]] o[e]$, wherein, if the residue for the end state of the current transition is not equal to $i[e]^{-1} R[p[e]] o[e]$, the first finite-state transducer is not determinizable;

(g) if the residue for the end state of the current transition is equal to $i[e]^{-1} R[p[e]] o[e]$, determining if the end state of the current transition is a final state;

(h) if the end state of the current transition is a final state, determining if the residue of the end state of the current transition is equal to the empty string, wherein, if the residue of the end state of the current transition is not equal to the empty string, the first finite-state transducer is not determinizable;

if the end state of the current transition is not a final state or if the residue of the end state of the current transition is equal to the empty string, determining if there are any unselected transitions from the end state of the current transition;

(j) if there are any unselected transitions from the end state of the current transition, selecting the end state of the current transition as the current state and returning to step (b);

(k) if there are no unselected transitions from the end state of the current transition or the end state of the current transition is not coaccessible, (l) determining if there are any unselected transitions from the current state;

(l1) if there are any unselected transitions from the current state, (m) returning to step (b);

(l2) if there are no unselected transitions from the current state, (n) determining if the current state is the initial state, wherein, if the current state is the initial state, the first finite-state transducer is functional; and (o) if the current state is not the initial state, selecting the last selected transition whose end state is the current state and returning to step (l).

47. The method of claim 42, further comprising, when the first finite-state transducer is functional, determining if, for the composed finite-state transducer, a residue purity condition holds for any transition in the composed finite-state transducer that has an end state that is cycle-accessible.

48. The method of claim 47, wherein, if the residue purity condition does not hold for any transition in the composed finite-state transducer that has an end state that is cycle-accessible, the first finite-state transducer is not determinizable.

49. The method of claim 42, further comprising, when the first finite-state transducer is functional, determining if, for the composed finite-state transducer and for any path $\pi$ from an initial state of the composed finite-state transducer to a strongly connected component c of the composed finite-state transducer, a residue $<\pi>$ of the path $\pi$ is equal to a residue $<\pi c>$ of the concatenated path $\pi c$.

50. The method of claim 49, wherein, if the residue $<\pi>$ of the path $\pi$ is not equal to the residue $<\pi c>$ of the concatenated path $\pi c$ for any path $\pi$ in the composed finite-state transducer that is cycle-accessible, the first finite-state transducer is not determinizable.

51. The method of claim 42, further comprising, when the first finite-state transducer is functional, determining if, for the composed finite-state transducer, at least one of a first residue condition and a second residue condition holds for every transition in the composed finite-state transducer that has an end state that is cycle-accessible.

52. The method of claim 51, wherein the first residue condition is, for a non-empty strongly connected component of the composed finite-state transducer that has three paths $\pi_1$, $\pi_2$ and $\pi$ having residues that are distinct from each other, where each path $\pi_1$, $\pi_2$ and $\pi$ leads from a same initial state to that strongly connected component, that the residue of the residue of path $\pi_1$ and the residue of the path $\pi$ commutes with the residue of the residue of the path $\pi_1$ and the residue of the path $\pi_2$.

53. The method of claim 51, wherein the second residue condition is, for three paths $\pi_1$, $\pi_2$, and $\pi_3$ in that composed finite-state transducer, where each path $\pi_1$, $\pi_2$ and $\pi$ leads from the same initial state to the same cycle-accessible state, that the residue of the residue of the path $\pi_1$ and the residue of the path $\pi_2$ commutes with the residue of the residue of the path $\pi_1$ and the residue of the path $\pi_3$.

54. The method of claim 51, wherein determining if the first residue condition holds for a transition in the composed finite-state transducer comprises:

determining if a strongly connected component that contains an end state of that transition is equal to a strongly connected component that contains a beginning state of that transition; and determining if a residue for the end state is equal to a residue for the beginning state concatenated with that transition.

55. The method of claim 51, wherein determining if the second residue condition holds for a transition in the composed finite-state transducer comprises:

determining if a residue of a first residue for the end state of that transition and a second residue for the end state of that transition commutes with a residue of the first residue for the end state of that transition and a third residue for the end state of that transition.

56. The method of claim 51, wherein determining, for the composed finite-state transducer, if at least one of a first residue condition and a second residue condition holds for any transition in the composed finite-state transducer that has an end state that is cycle-accessible comprises:

(a) selecting the initial state of the composed finite-state transducer as the current state;

(b) selecting a transition extending from the current state that has an end state that is cycle-accessible and that has not previously been selected as a current transition;

(c) determining a current residue for an end state of the current transition; and (d) determining if the current residue is pure, wherein, if the current residue is not pure, the finite-state transducer is not determinizable.

57. The method of claim 56, further comprising:

(e) determining if a first strongly connected component containing a beginning state of the current transition and a second strongly connected component containing the end state of the current transition are equivalent;

(e1) if the first and second strongly connected components are not equivalent, (f) determining if a first residue for the end state of the current transition has been defined;

(f1) if the first residue for the end state of the current transition has been defined, (g) determining if a second residue for the end state of the current transition has been defined;

(g1) if the second residue for the end state of the current transition has been defined, (h) determining a third residue of the first residue for the end state of the current transition and the current residue and a fourth residue of the first residue for the end state of the current transition and the second residue for the end state of the current transition; and (i) determining if the third and fourth residues commute, wherein, if the third and fourth residues do not commute, the finite-state transducer is not determinizable.

58. The method of claim 57, further comprising:

(g2) if the second residue for the end state of the current transition has not been defined, (j) determining if the first residue for the end state of the current transition is equal to the current residue;

(j1) if the first residue for the end state of the current transition is not equal to the current residue, (k) determining if only the first residue for the end state of the current transition has been defined;

(k1) if only the first residue for the end state of the current transition has been defined, (l) defining the second residue for the end state of the current transition as the current residue; and (m) repeating the method beginning with step (b) using the end state of the current transition as the current state.

59. The method of claim 58, further comprising:

(k2) if more than the first residue for the end state of the current transition has been defined, (n) determining if a kth residue for the end state of the current transition has been defined;

(n1) if the kth residue for the end state of the current transition has not been defined, (o) defining the kth residue for the end state of the current transition as the current residue; and (p) repeating the method beginning with step (b) using the end state of the current transition as the current state.

60. The method of claim 59, further comprising:

(n2) if the kth residue for the end state of the current transition has been defined, (q) determining if there are any unselected transitions extending from the current state;

(q1) if there are any unselected transitions extending from the current state, (r) repeating the method beginning with step (b);

(q2) if there are no unselected transitions extending from the current state, (s) determining if the current state is the initial state, wherein, if the current state is the start state, every transition in the composed finite-state transducer whose end state is cycle-accessible meets one of the first and second residue conditions;

(t) if the current state is not the initial state, selecting a most-recently-selected edge whose end state is the current state as the current transition and a beginning state of the current transition as the current state; and (u) returning to step (q).

61. The method of claim 58, further comprising:

(j2) if the first residue for the end state of the current transition is equal to the current residue, (n) determining if a kth residue for the end state of the current transition has been defined;

(n1) if the kth residue for the end state of the current transition has not been defined, (o) defining the kth residue for the end state of the current transition as the current residue; and (p) repeating the method beginning with step (b) using the end state of the current transition as the current state.

62. The method of claim 61, further comprising:

(n2) if the kth residue for the end state of the current transition has been defined, (q) determining if there are any unselected transitions extending from the current state;

(q1) if there are any unselected transitions extending from the current state, (r) repeating the method beginning with step (b);

(q2) if there are no unselected transitions extending from the current state, (s) determining if the current state is the initial state, wherein, if the current state is the start state, every transition in the composed finite-state transducer whose end state is cycle-accessible meets one of the first and second residue conditions;

(t) if the current state is not the initial state, selecting a most-recently-selected edge whose end state is the current state as the current transition and a beginning state of the current transition as the current state; and (u) returning to step (q).

63. The method of claim 57, further comprising:

(i1) if the third and fourth residues commute, (j) determining if a kth residue for the end state of the current transition has been defined;

(j1) if the kth residue for the end state of the current transition has not been defined, (k) defining the kth residue for the end state of the current transition as the current residue; and
(m) repeating the method beginning with step (b) using the end state of the current transition as the current state.

64. The method of claim 63, further comprising:
(j2) if the kth residue for the end state of the current transition has been defined, (n) determining if there are any unselected transitions extending from the current state;
(n1) if there are any unselected transitions extending from the current state, repeating the method beginning with step (b);
(n2) if there are no unselected transitions extending from the current state, (o) determining if the current state is the initial state, wherein, if the current state is the start state, every transition in the composed finite-state transducer whose end state is cycle-accessible meets one of the first and second residue conditions;
(p) if the current state is not the initial state, selecting a most-recently-selected edge whose end state is the current state as the current transition and a beginning state of the current transition as the current state;
(q) returning to step (n).

65. The method of claim 57, further comprising:
(f2) if the first residue for the end state of the current transition has not been defined, (j) determining if a kth residue for the end state of the current transition has been defined;
(j1) if the kth residue for the end state of the current transition has not been defined, (k) defining the kth residue for the end state of the current transition as the current residue; and
(l) repeating the method beginning with step (b) using the end state of the current transition as the current state.

66. The method of claim 65, further comprising:
(j2) if the kth residue for the end state of the current transition has been defined, (m) determining if there are any unselected transitions extending from the current state;
(m1) if there are any unselected transitions extending from the current state, repeating the method beginning with step (b);
(m2) if there are no unselected transitions extending from the current state, (n) determining if the current state is the initial state, wherein, if the current state is the start state, every transition in the composed finite-state transducer whose end state is cycle-accessible meets one of the first and second residue conditions;
(o) if the current state is not the initial state, selecting a most-recently-selected edge whose end state is the current state as the current transition and a beginning state of the current transition as the current state;
(p) returning to step (m).

67. The method of claim 57, further comprising:
(e2) if the first and second strongly connected components are equivalent, (j) determining if a kth residue for the end state of the current transition has been defined;
(j1) if the kth residue for the end state of the current transition has not been defined, (k) defining the kth residue for the end state of the current transition as the current residue; and
(l) repeating the method beginning with step (b) using the end state of the current transition as the current state.

68. The method of claim 67, further comprising, (j2) if the kth residue for the end state of the current transition has been defined, (m) determining if the kth residue for the end state of the current transition is equal to the current residue, wherein, if the kth residue for the end state of the current transition is not equal to the current residue, the finite-state transducer is not determinizable.

69. The method of claim 67, further comprising:
(j2) if the kth residue for the end state of the current transition has been defined, (m) determining if the kth residue for the end state of the current transition is equal to the current residue;
(m1) if the kth residue for the end state of the current transition is equal to the current residue, (n) determining if there are any unselected transitions extending from the current state;
(n1) if there are any unselected transitions extending from the current state, (o) repeating the method beginning with step (b); and
(n2) if there are no unselected transitions extending from the current state, (p) determining if the current state is the initial state, wherein, if the current state is the start state, every transition in the composed finite-state transducer whose end state is cycle-accessible meets one of the first and second residue conditions.

70. The method of claim 69, further comprising:
(q) if the current state is not the initial state, selecting a most-recently-selected edge whose end state is the current state as the current transition and a beginning state of the current transition as the current state; and
(r) returning to step (n).

* * * * *